US012665998B2

(12) United States Patent
Hirata et al.

(10) Patent No.: US 12,665,998 B2
(45) Date of Patent: Jun. 23, 2026

(54) AIR FLOATING VIDEO INFORMATION DISPLAY SYSTEM AND STEREO SENSING APPARATUS USED THEREIN

(71) Applicant: Maxell, Ltd., Kyoto (JP)

(72) Inventors: Koji Hirata, Kyoto (JP); Koji Fujita, Kyoto (JP); Toshinori Sugiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 79 days.

(21) Appl. No.: 18/691,060

(22) PCT Filed: Aug. 8, 2022

(86) PCT No.: PCT/JP2022/030330
§ 371 (c)(1),
(2) Date: Mar. 12, 2024

(87) PCT Pub. No.: WO2023/037813
PCT Pub. Date: Mar. 16, 2023

(65) Prior Publication Data
US 2025/0150572 A1 May 8, 2025

(30) Foreign Application Priority Data
Sep. 13, 2021 (JP) ................................. 2021-148657

(51) Int. Cl.
H04N 13/322 (2018.01)
G01S 17/08 (2006.01)
(Continued)

(52) U.S. Cl.
CPC ........... H04N 13/322 (2018.05); G01S 17/08 (2013.01); G01S 17/86 (2020.01); G02B 30/56 (2020.01); H04N 13/398 (2018.05)

(58) Field of Classification Search
CPC .... H04N 13/322; H04N 13/398; G01S 17/08; G01S 17/86; G01S 17/87; G02B 30/56;
(Continued)

(56) References Cited

U.S. PATENT DOCUMENTS

2011/0181949 A1* 7/2011 Hashikawa .......... H04N 13/346
359/463
2011/0235017 A1* 9/2011 Iwasaki ................ H04N 25/133
250/226
(Continued)

FOREIGN PATENT DOCUMENTS

CN 109085603 A 12/2018
JP 2011-199798 A 10/2011
(Continued)

OTHER PUBLICATIONS

International Search Report of PCT/JP2022/030330 dated Oct. 25, 2022.

*Primary Examiner* — Asmamaw G Tarko
(74) *Attorney, Agent, or Firm* — MATTINGLY & MALUR, PC

(57) ABSTRACT

An air floating video display system contributes to Sustainable Development Goals 3, 9 and 11. The air floating video display system includes a video display apparatus configured to display a video, a light source apparatus, and a retroreflector configured to reflect a video light from the video display apparatus to display an air floating video that is a real image in air by the reflected light. The light source apparatus includes optical means configured to reduce a divergence angle of a light from a point or surface light source and a reflection surface configured to reflect the light from the light source to propagate it to the video display apparatus, and a part of the divergence angle of the light flux emitted from the light source is adjusted by a shape and
(Continued)

surface roughness of the reflection surface provided on the light source.

6 Claims, 32 Drawing Sheets

(51) Int. Cl.
  *G01S 17/86*        (2020.01)
  *G02B 30/56*        (2020.01)
  *H04N 13/398*      (2018.01)

(58) Field of Classification Search
  CPC .......... G02B 7/40; G02B 30/00; G03B 13/36; G06F 3/01
  USPC ................................... 348/51, 345 E, 13.059
  See application file for complete search history.

(56) References Cited

U.S. PATENT DOCUMENTS

| | | | | |
|---|---|---|---|---|
| 2013/0093670 | A1* | 4/2013 | Iwai | G06F 3/017 |
| | | | | 345/156 |
| 2015/0279283 | A1* | 10/2015 | Nakao | G09G 5/026 |
| | | | | 345/697 |
| 2017/0195024 | A1* | 7/2017 | Vo | G06Q 10/0833 |
| 2019/0227489 | A1* | 7/2019 | Tokuchi | G06V 40/113 |
| 2019/0280145 | A1* | 9/2019 | Natsuaki | H10F 30/225 |
| 2019/0285904 | A1* | 9/2019 | Kim | G09F 19/12 |
| 2020/0388396 | A1 | 12/2020 | Lindvall | |
| 2021/0173218 | A1* | 6/2021 | Hamano | H04N 13/128 |
| 2021/0190917 | A1* | 6/2021 | Matsuura | G01S 17/87 |
| 2022/0011437 | A1* | 1/2022 | Koyama | G01S 7/4861 |
| 2022/0388396 | A1* | 12/2022 | Hirata | B60K 35/60 |

FOREIGN PATENT DOCUMENTS

| | | | | | |
|---|---|---|---|---|---|
| JP | 2012-137779 | A | | 7/2012 | |
| JP | 2019-510199 | A | | 4/2019 | |
| JP | 2019-128722 | A | | 8/2019 | |
| JP | 2019-159193 | A | | 9/2019 | |
| JP | 2020-09790 | A | | 1/2020 | |
| JP | 2021-099278 | A | | 7/2021 | |
| WO | 2011/155192 | A1 | | 12/2011 | |
| WO | WO-2017125984 | A1 | * | 7/2017 | .......... H04N 13/30 |
| WO | 2019/087676 | A1 | | 5/2019 | |
| WO | 2020/195465 | A1 | | 10/2020 | |
| WO | 2021/079741 | A1 | | 4/2021 | |

* cited by examiner ( A )

( B )

VIDEO DISPLAY
APPARATUS

VIDEO DISPLAY

VIDEO CONTROLLER

VIDEO SIGNAL
RECEIVER
(WIRED)
(WIRELESS)

EXTERNAL PC ( A )

( B )                                                      ( C )

( A )

( B )

( A )

( B )

( A )

( B )

OPERATION OF
SELECTING PART OF
AIR FLOATING VIDEO

OPERATION OF
LEAVING FROM PART
OF AIR FLOATING
VIDEO (A)

(B)

OPERATION OF
SELECTING PART OF
AIR FLOATING VIDEO

OPERATION OF
LEAVING FROM
PART OF
AIR FLOATING VIDEO

TOF LIGHT SOURCE LIGHT λ₁

INCIDENT ANGLE φ

REFLECTANCE OF GLASS TO P-POLARIZED LIGHT AND S-POLARIZED LIGHT ( A )

( B )

VIEWING POSITION

PANEL SURFACE

LEFT

LOWER PART

Normal(θ=0deg.)

θB

θL

θT

θR

UPPER PART

RIGHT

ANGULAR CHARACTERISTICS OF CONTRAST
(VERTICAL DIRECTION)

Brightness (back light) cd/m^2

14000
12000
10000
8000
6000
4000
2000
0

-70 -60 -50 -40 -30 -20 -10  0  10  20  30  40  50  60  70

LOWER SIDE                    θ(°)                    UPPER SIDE

CONVENTIONAL
LIGHT SOURCE
(WIDE DIVERGENCE
ANGLE)

ANGULAR CHARACTERISTICS OF CONTRAST
(LEFT–RIGHT DIRECTION)

( a )

( b )

( a )

( b )

( 1 )

( 2 )

( 1 )

( 2 )

( 1 )

( 2 )　　　　　　　　　　　　　　　( 3 )

( a )

Y AXIS

X AXIS ( b )

( c )

( a )

( b )

( A )

( B )

AIR FLOATING VIDEO INFORMATION DISPLAY SYSTEM AND STEREO SENSING APPARATUS USED THEREIN

TECHNICAL FIELD

The present invention relates to an air floating video information display system and a stereo sensing apparatus used therein.

BACKGROUND ART

As an air floating information display system, a video display apparatus configured to display a video directly toward outside and a display method for displaying a video as a space screen have already been known. Further, for example, Patent Document 1 discloses a detection system for reducing erroneous detection of operations on an operation plane of a displayed space image.

RELATED ART DOCUMENTS

Patent Documents

Patent Document 1: Japanese Unexamined Patent Application Publication No. 2019-128722

SUMMARY OF THE INVENTION

Problems to be Solved by the Invention

However, as the air floating video information display system and the method for highly accurate three-dimensional operation of the space image in the above-mentioned prior art, the optimization technique for design including a light source of a video display apparatus to be a video source of an air floating video has not been considered.

An object of the present invention is to provide a method for highly accurate three-dimensional operation of a displayed space image with high visibility (visual resolution and contrast) and a technique capable of displaying a favorable video with reduced erroneous detection in an air floating information display system or an air floating video display apparatus.

Means for Solving the Problems

In order to solve the problem described above, for example, the configuration described in claims is adopted. Although this application includes a plurality of means for solving the above problem, an air floating video display apparatus as one example thereof will be presented below. An air floating video display apparatus as an example of this application includes a video display apparatus configured to display a video, a light source apparatus, and a retroreflector configured to reflect a video light from the video display apparatus to display an air floating video that is a real image in air by the reflected light. The light source apparatus includes optical means configured to reduce a divergence angle of a light from a point or surface light source and a reflection surface configured to reflect the light from the light source to propagate it to the video display apparatus, and a part of the divergence angle of the light flux emitted from the light source is adjusted by a shape and surface roughness of the reflection surface provided on the light source. A first ranging apparatus in which a plurality of TOF (Time Of Flight) systems each having a light source and a light receiver are arranged in a matrix and with which a plurality of divided areas of a space including the air floating video are sensed by a light from the light source of each TOF system is provided, and the light source light of the TOF system is emitted toward the air floating video.

Effects of the Invention

According to the present invention, it is possible to realize an air floating information display system or an air floating video display apparatus capable of favorably displaying air floating video information and having a three-dimensional sensing function with reduced erroneous detection. Other problems, configurations, and effects will become apparent in the following description of embodiments.

DETAILED DESCRIPTION OF PREFERRED EMBODIMENTS

Figure 1:
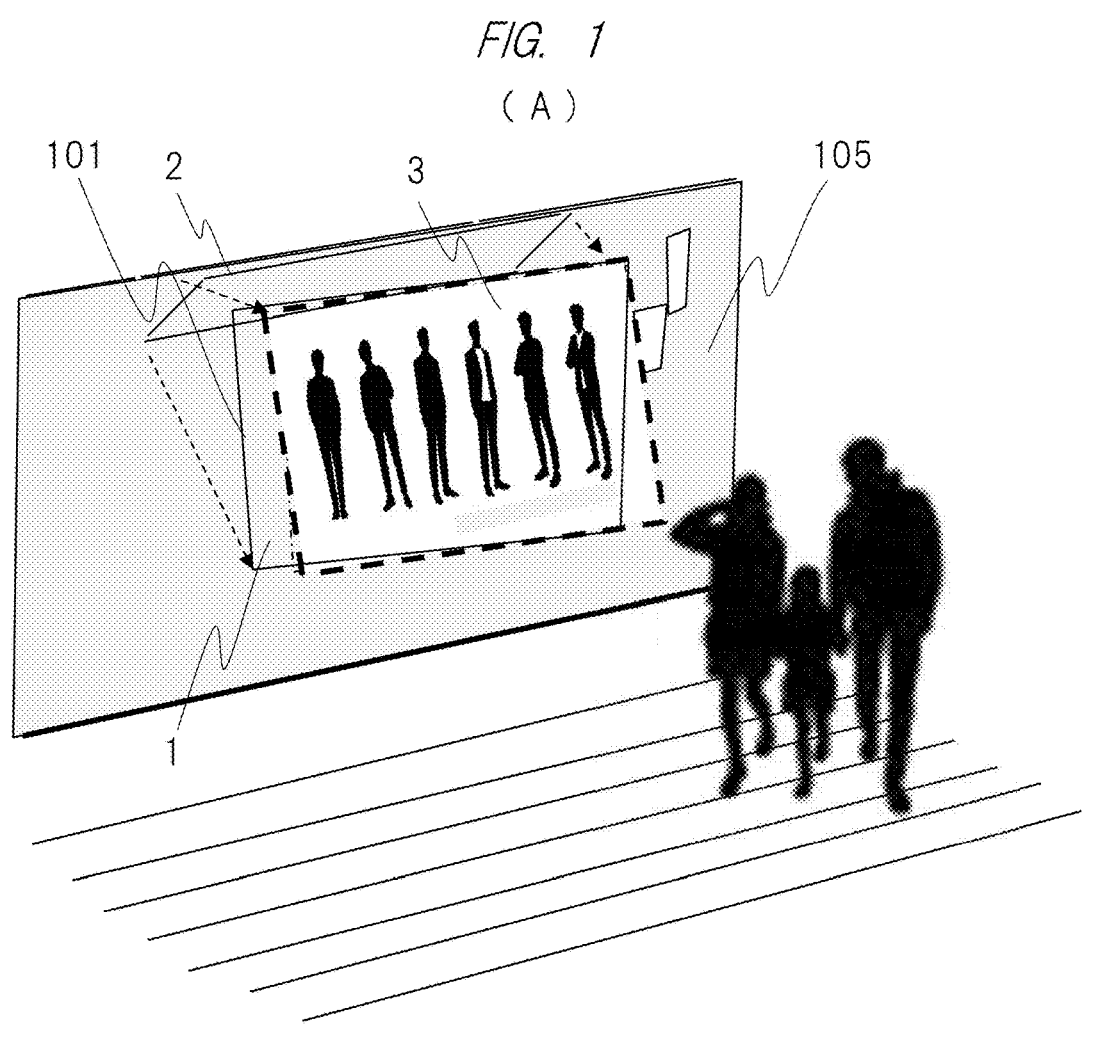
FIG. 1 is a diagram showing an example of usage form of an air floating video information display system according to one embodiment of the present invention.

Hereinafter, embodiments of the present invention will be described in detail with reference to the drawings. Note that the present invention is not limited to the contents of the embodiments (hereinafter, referred to as "present disclosure") described below. The present invention covers the scope of the technical ideas described in the spirit of the invention and the claims or the equivalent thereof. Further, the configurations of the embodiments (examples) described below are merely an example, and various changes and corrections can be made by those skilled in the art within the scope of the technical ideas disclosed in this specification.

In addition, in the drawings for describing the present invention, components having the same or similar function are denoted by the same reference characters and named differently as appropriate, and repetitive description of the function thereof will be omitted in some cases. Also, in the following description of the embodiments, a video floating in the air is expressed by the term "air floating video". Instead of this term, expressions such as "image", "space image", "aerial floating video", "air floating optical image of a display image", "aerial floating optical image of a display image", etc. may be used. The term "air floating video" mainly used in the description of the embodiments is used as a representative example of these terms.

The present disclosure relates to, for example, an information display system capable of displaying a video based on video light from a large-area video light source as an air floating video to an inside or an outside of a store (space) by transmitting the video light through a transparent member that partitions a space such as a glass of a show window. Also, the present disclosure relates to a large-scale digital signage system composed by using a plurality of such information display systems.

According to the following embodiments, for example, it is possible to display high-resolution video information above a glass surface of a show window or a light transmitting plate material in a state of floating in the air. At this time, by making the divergence angle of the emitted video light small, that is, an acute angle, and further aligning the video light into a specific polarized wave, only the normal reflected light can be efficiently reflected with respect to the retroreflector. Therefore, the light utilization efficiency can be increased, the ghost image which is generated in addition to the main air floating image and is a problem int the conventional retroreflection system can be suppressed, and a clear air floating video can be obtained.

Also, with the apparatus including the light source of the present disclosure, it is possible to provide a novel and highly usable air floating video information display system capable of significantly reducing power consumption. Further, according to the technique of the present disclosure, it is also possible to provide an in-vehicle air floating video information display system capable of displaying a so-called unidirectional air floating video which can be visually recognized outside the vehicle through a shield glass including a wind shield, a rear glass, and a side glass of a vehicle.

Figure 2:
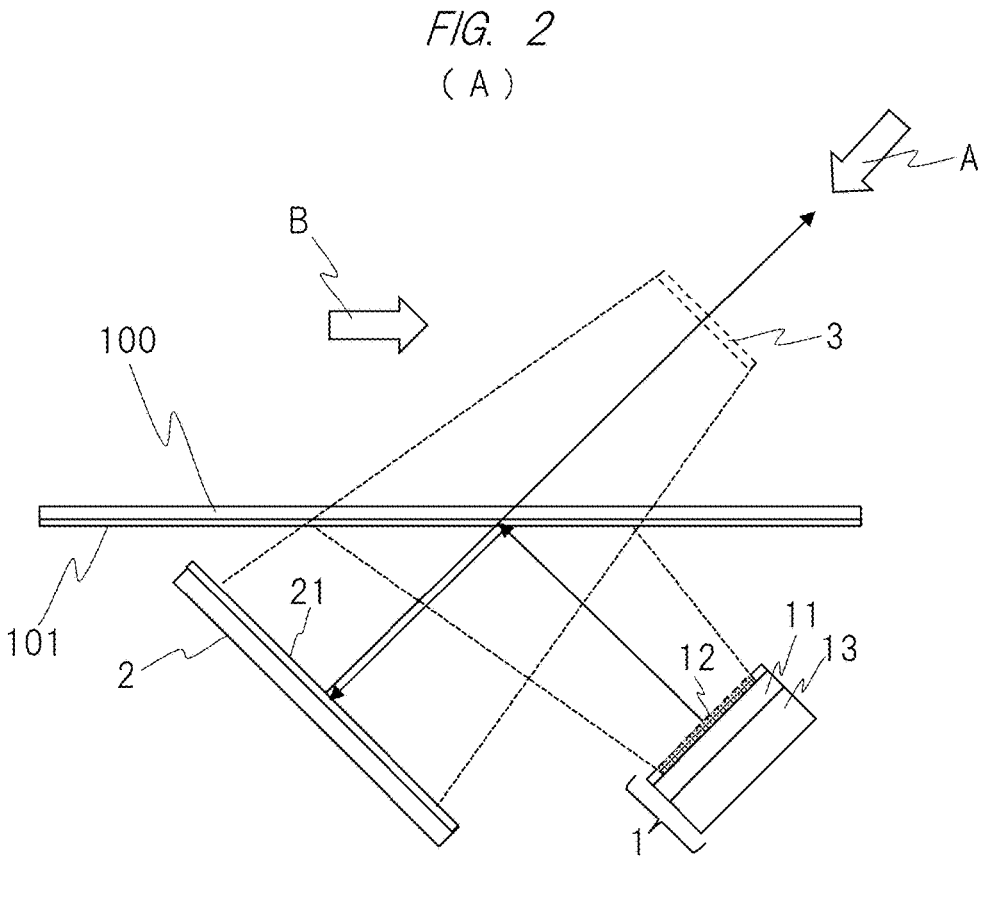
FIG. 2 is a diagram showing a configuration example of a main part of the air floating video information display system and a retroreflection portion according to one embodiment of the present invention.
Figure 2:
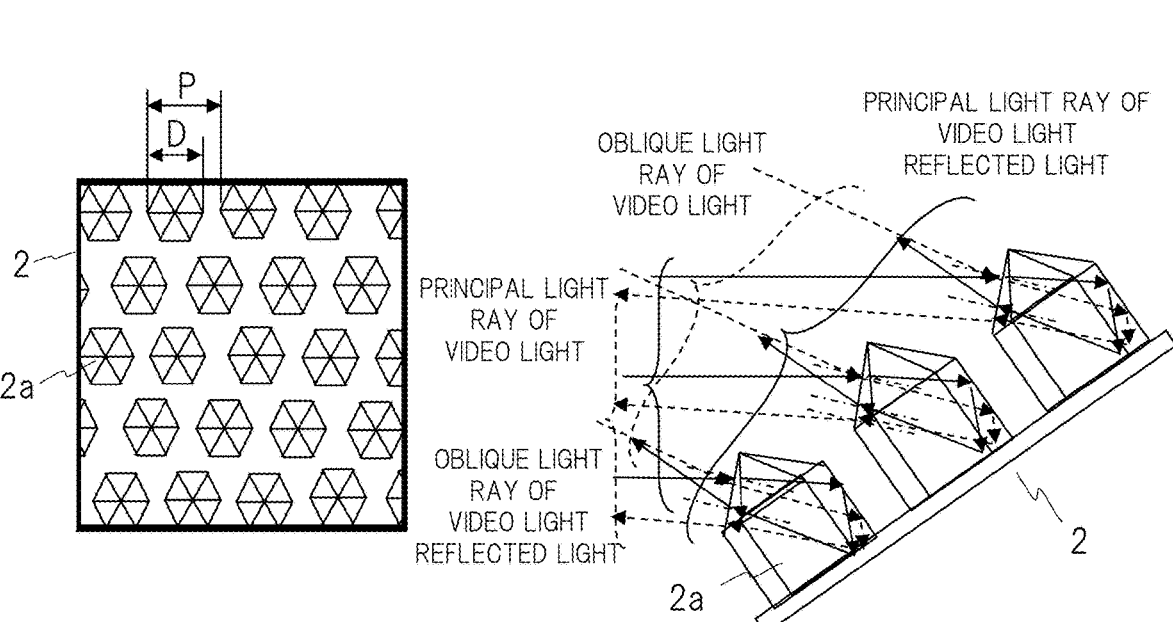

On the other hand, in the conventional air floating video information display system, an organic EL panel or a liquid crystal display panel (liquid crystal panel or display panel) is combined with a retroreflector as a high-resolution color display video source. In the air floating video display apparatus according to the conventional technique, since video light is diffused at a wide angle, ghost images are generated by the video light obliquely entering a retroreflector 2$a$ as shown in FIG. 2(C) in addition to the reflection light normally reflected by the retroreflector which is the first embodiment composed of polyhedrons shown in FIG. 2, thereby deteriorating the image quality of the air floating video. Further, in the air floating video display apparatus according to the conventional technique, multiple ghost images corresponding to the number of reflection surfaces are generated in addition to the normal air floating video as shown in FIG. 2. Therefore, the ghost image similar to the air floating video is viewed by a person other than a viewer, and there is a significant problem in terms of security.

First Configuration Example of Air Floating Video Information Display System

FIG. 1(A) is a diagram showing an example of usage form of an air floating video information display system according to the present disclosure. Also, FIG. 1(A) is a diagram for describing an overall configuration of the air floating video information display system according to the present embodiment. Referring to FIG. 1(A), for example, a space is partitioned by a show window (referred to also as "window glass") 105 which is a light transmitting member such as glass in a store or the like. With the air floating video information display system of the present disclosure (hereinafter, referred to also as "present system"), the floating video can be displayed in one direction to the outside of the store (space) through such a transparent member.

Specifically, in the present system, light of a specific polarized wave with narrow-angle directional characteristics is emitted from a video display apparatus (display apparatus) 1 as a video light flux, once enters a retroreflector 2, is retroreflected and passes through the window glass 105, thereby forming an aerial image (air floating image 3) which is a real image on the outside of the store. In FIG. 1(A), an inner side of the transparent member (here, window glass) 105 (inside of the store) is illustrated as a far side and an outer side of the window glass 105 (for example, sidewalk) is illustrated as a near side. On the other hand, it is also possible to form an aerial image at a desired position in the store by reflecting the video light flux with a reflection means configured to reflect a specific polarized wave provided on the window glass 105.

FIG. 1(B) is a block diagram showing a configuration of the video display apparatus 1 described above. The video display apparatus 1 includes a video display configured to display an original image of an aerial image, a video controller configured to convert an input video in accordance with the resolution of a panel, and a video signal receiver configured to receive a video signal.

The video signal receiver among these is configured to handle signals input via a wired input interlace such as HDMI (High-Definition Multimedia Interface (registered trademark)) and signals input via a wireless communication such as Wi-Fi (Wireless Fidelity (registered trademark)). Also, the video signal receiver can function independently as a video receiver/display. Further, the video signal receiver can also display video information from a tablet, a smartphone, and the like. In addition, a processor (arithmetic processing unit) such as a stick PC can be connected to the video signal receiver as needed. In such a case, the capability of calculation processing, video analysis processing, and the like can be provided as the entire video signal receiver.

FIG. 2 is a diagram showing a configuration example of a main part of the air floating video information display system and a retroreflection portion according to the present disclosure. The configuration of the air floating video information display system will be described more specifically with reference to FIG. 2. As shown in FIG. 2(A), the video display apparatus 1 which diverges video light of a specific polarized wave at a narrow angle is provided in the oblique direction of a transparent plate 100 having a light transmitting property (hereinafter, referred to as "transparent member") such as glass. The video display apparatus 1 includes a liquid crystal display panel 11 and a light source apparatus 13 configured to generate light of a specific polarized wave having narrow-angle diffusion characteristics.

The video light of a specific polarized wave from the video display apparatus 1 is reflected by a polarization separator 101 provided on the transparent member 100 and having a film selectively reflecting the video light of a specific polarized wave (in the drawing, the polarization separator 101 is formed in a sheet shape and is adhered to the transparent member 100), and enters the retroreflector 2. A λ/4 plate 21 is provided on the video light incident surface of the retroreflector. The video light passes through the λ/4 plate 21 twice, that is, when the video light enters the retroreflector and when the video light is emitted from the retroreflector, whereby the video light is subjected to polarization conversion from a specific polarized wave to the other polarized wave.

Here, since the polarization separator 101 which selectively reflects the video light of a specific polarized wave has a property of transmitting the polarized light of the other polarized wave subjected to the polarization conversion, the video light of the specific polarized wave after the polarization conversion passes through the polarization separator 101. The video light that has passed through the polarization separator 101 forms the air floating video 3, which is a real image, on the outside of the transparent member 100.

Note that the light that forms the air floating video 3 is a set of light rays converging from the retroreflector 2 to the optical image of the air floating video 3, and these light rays go straight even after passing through the optical image of the air floating video 3. Therefore, the air floating video 3 is a video having high directivity, unlike diffused video light formed on a screen by a general projector or the like.

Therefore, in the configuration of FIG. 2, when a user visually recognizes the aerial floating video 3 from the direction of an arrow A, the aerial floating video 3 is visually recognized as a bright video. However, when another person visually recognizes the video from the direction of an arrow B, the aerial floating video 3 cannot be visually recognized as a video at all. These characteristics are very suitable for use in a system that displays a video requiring high security or a highly confidential video that is desired to be kept secret from a person facing the user.

Note that, depending on the performance of the retroreflector 2, the polarization axes of the video light after reflection are not aligned in some cases. In this case, a part of the video light whose polarization axes are not aligned is reflected by the polarization separator 101 described above and returns to the video display apparatus 1. The part of light is reflected again on the video display surface of the liquid crystal display panel 11 constituting the video display apparatus 1, so that a ghost image is generated and the image quality of the air floating image is deteriorated in some cases.

Therefore, in the present embodiment, an absorptive polarizing plate 12 is provided on the video display surface of the video display apparatus 1. The video light emitted from the video display apparatus 1 is transmitted through the absorptive polarizing plate 12, and the reflected light returning from the polarization separator 101 is absorbed by the absorptive polarizing plate 12, whereby the re-reflection can be suppressed. Thus, according to the present embodiment using the absorptive polarizing plate 12, it is possible to prevent or suppress the deterioration in image quality due to the ghost image of an air floating image.

The polarization separator 101 described above may be formed of, for example, a reflective polarizing plate or a metal multilayer film that reflects a specific polarized wave.

Then, FIG. 2(B) shows a surface shape of a retroreflector manufactured by Nippon Carbide Industries Co., Inc. used in this study as the typical retroreflector 2. The light ray that enters regularly arranged hexagonal columns is reflected by the wall surfaces and bottom surfaces of the hexagonal columns and emitted as retroreflected light in a direction corresponding to the incident light, and an air floating video which is a real image is displayed based on the video displayed on the video display apparatus 1. The resolution of the air floating image largely depends on the outer shape D and pitch P of the retroreflection portions of the retroreflector 2 shown in FIG. 2(B), in addition to the resolution of the liquid crystal display panel 11. For example, when a 7-inch WUXGA (1920×1200 pixels) liquid crystal display panel is used, even if one pixel (one triplet) is about 80 μm, one pixel of the air floating image is about 300 μm if the diameter D of the retroreflection portion is 240 μm and the pitch is 300 μm, for example. Therefore, the effective resolution of the air floating video is reduced to about ⅓. Thus, in order to make the resolution of the air floating video equal to the resolution of the video display apparatus 1, it is desired that the diameter and the pitch of the retroreflection portions are close to one pixel of the liquid crystal display panel. On the other hand, in order to suppress the occurrence of moire caused by the retroreflector and the pixels of the liquid crystal display panel, it is preferable to design each pitch ratio so as not to be an integral multiple of one pixel. Further, the shape is preferably arranged such that any one side of the retroreflection portion does not overlap with any one side of one pixel of the liquid crystal display panel.

On the other hand, in order to manufacture the retroreflector at a low cost, the retroreflector may be molded by using the roll press method. Specifically, this is a method of shaping the arranged retroreflection portions onto a film, in which the retroreflector 2 having a desired shape is obtained by forming a reverse shape of the portion to be shaped on a roll surface, applying an ultraviolet curable resin on a fixing base material, shaping a necessary portion by passing the resin between rolls, and curing the resin by irradiation with ultraviolet rays.

Figure 3:
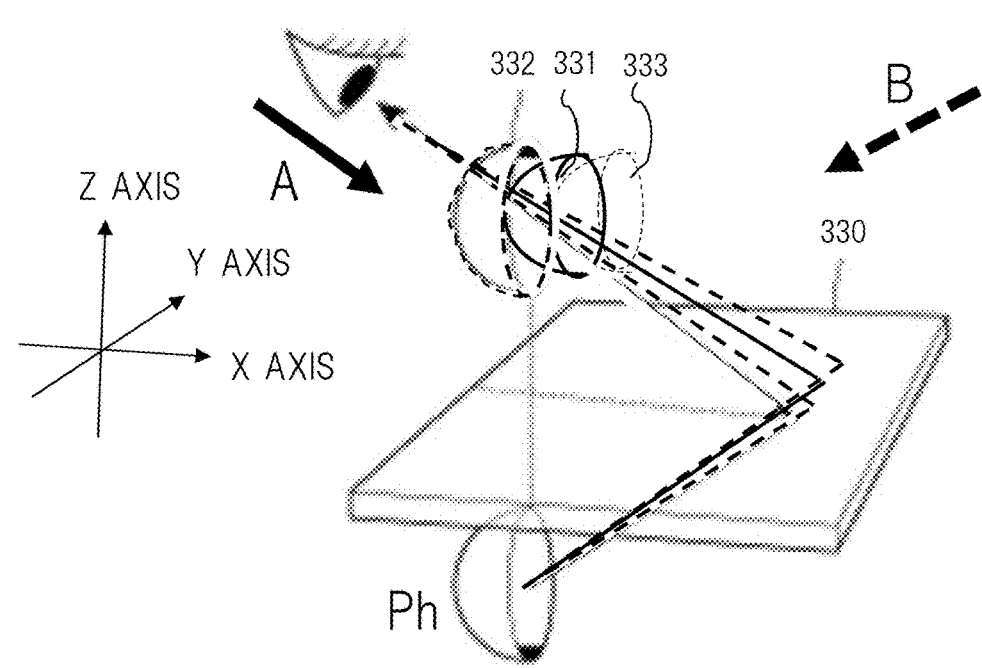
FIG. 3 is a diagram showing another configuration example of the main part of the air floating video information display system and the retroreflection portion according to one embodiment of the present invention.
Figure 3:
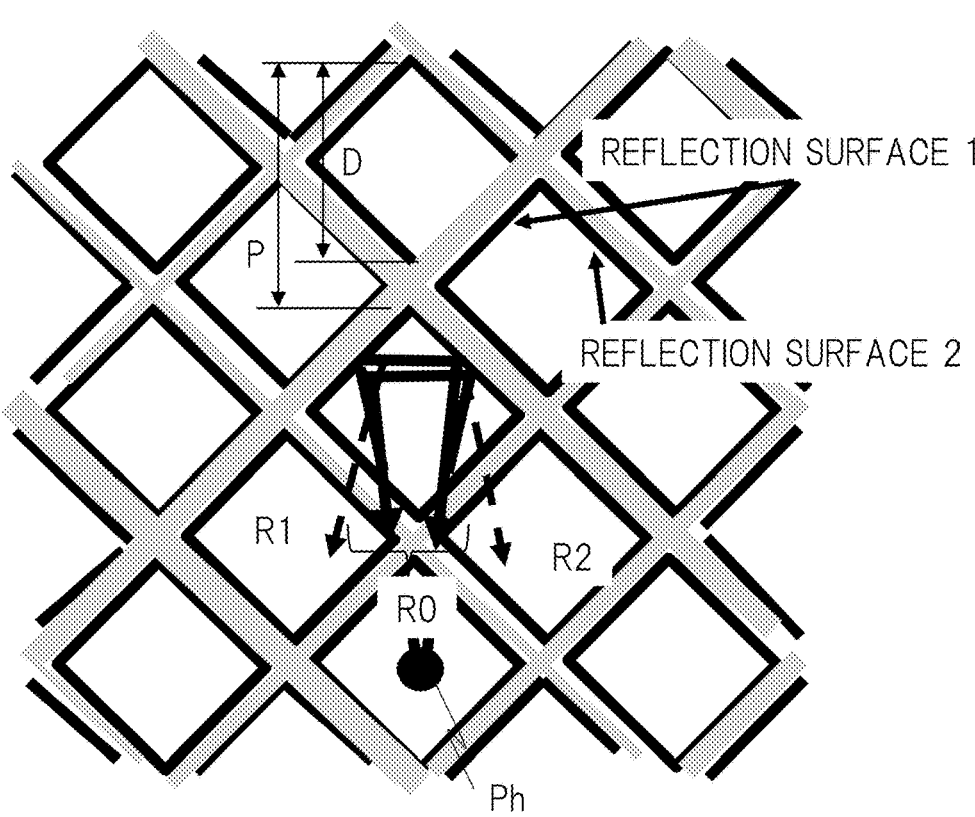

Next, FIG. 3(B) shows a surface shape for describing an operation principle of a retroreflector manufactured by Asukanet Co., Ltd. used in this study as another typical retroreflector 330. The light ray that enters regularly arranged four-sided structure is reflected by two wall surfaces of the four-sided structure and emitted as retroreflected light in a direction corresponding to the incident light, and an air floating video 331 (see FIG. 3(A)) which is a real image is displayed based on an object Ph. The resolution of the air floating image also largely depends on the outer shape D and pitch P of the retroreflection portions like the first retroreflector described above. For example, when a 7-inch WUXGA (1920×1200 pixels) liquid crystal display panel is used, even if one pixel (one triplet) is about 80 μm, one pixel of the air floating image is about 150 μm if the diameter D of the retroreflection portion is 120 μm and the pitch is 150 μm, for example. Therefore, the effective resolution of the air floating video is reduced to about ½. Here, in order to make the resolution of the air floating video equal to the resolution of the video display apparatus 1, it is desired that the diameter and the pitch of the retroreflection portions are close to one pixel of the liquid crystal display panel. On the other hand, in order to suppress the occurrence of moire caused by the retroreflector and the pixels of the liquid crystal display panel, it is preferable to design each pitch ratio so as not to be an integral multiple of one pixel as described above. Further, the shape is preferably arranged such that any one side of the retroreflection portion does not overlap with any one side of one pixel of the liquid crystal display panel.

Note that the light that forms the air floating video 331 is a set of light rays converging from the retroreflector 330 to the optical image of the aerial floating video 331, and these light rays go straight even after passing through the optical image of the aerial floating video 331. Therefore, the air floating video 331 is a video having high directivity, unlike diffused video light formed on a screen by a general projector or the like.

In the configuration of FIG. 3(A) and FIG. 3(B), when a user visually recognizes the air floating video 331 from the direction of an arrow A, the air floating video 331 is visually recognized as a bright video. However, when another person visually recognizes the video from the direction of an arrow B, the air floating video 331 cannot be visually recognized as a video at all. These characteristics are very suitable for use in a system that displays a video requiring high security or a highly confidential video that is desired to be kept secret from a person facing the user, like the aerial floating video using the first retroreflector described above.

Note that, in the second retroreflector 330, as shown in FIG. 3(B), the reflected object light enters the retroreflector 330 as R0 from one side, is reflected by two reflection surfaces provided on the four surfaces constituting wall the retroreflector 330, and forms the air floating image, which is a real image, on the other side. At this time, ghost images 332 and 333 shown in FIG. 3(A) are formed by extraordinary lights R1 and R2 generated by the two reflection surfaces. This causes a deterioration in the image quality of the air floating image.

As described above, ghost images are formed in accordance with the number of reflection surfaces in the first retroreflector, and ghost images are formed only in two specific directions depending on the incident angle of the object light in the second retroreflector. Therefore, the second retroreflector is less affected by ghost images and can display high-quality space images. For this reason, the air floating video display apparatus using the above-described second retroreflector will be described below.

<Technical Means for Reducing Ghost Images>

In order to realize an air floating video display apparatus capable of displaying a high-quality air floating video with reduced ghost images, specifically, a video light control sheet is preferably provided on a light emission surface of a liquid crystal panel serving as a video display element such that the divergence angle of the video light from the liquid crystal panel is controlled to bend the video light in a desired direction. Further, a video light control sheet is provided on a light ray emission surface or a light ray incident surface of the retroreflector these surfaces such that the extraordinary lights R1 and R2 that form ghost images are absorbed.

Figures 4, 5:
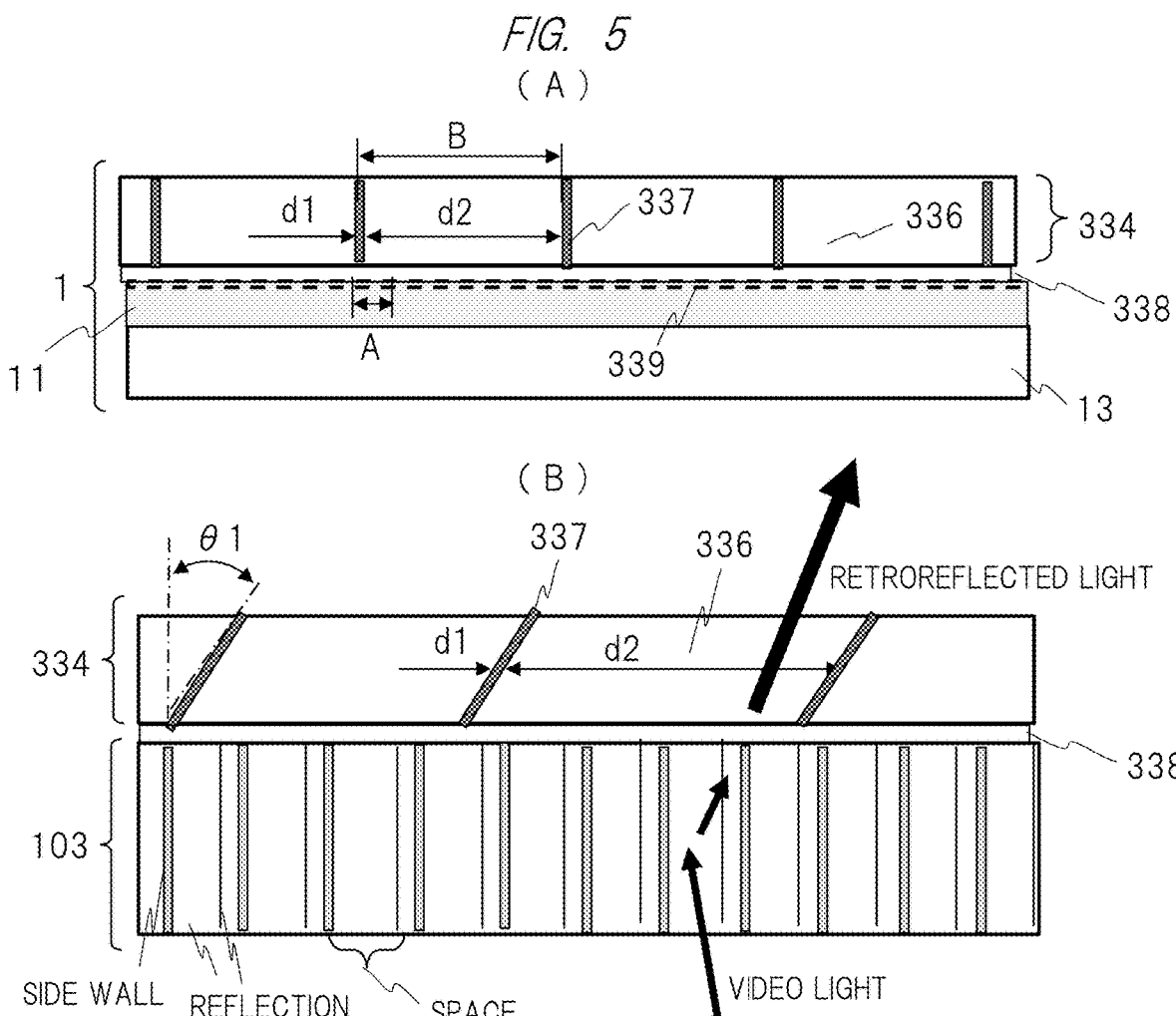
FIG. 4 is a diagram showing an arrangement of a member for blocking extraordinary light ray generated by retroreflection according to one embodiment of the present invention.
FIG. 5 is a cross-sectional view showing the arrangement of the member for blocking extraordinary light ray generated by retroreflection according to one embodiment of the present invention.

FIG. 4 shows a specific method of applying a video light control sheet 334 to an air floating video display apparatus. The video light control sheet 334 is provided on the emission surface of the liquid crystal panel 11 which is a video display element. At this time, in order to reduce moire caused by the interference due to the pixels of the liquid crystal panel 11 and the pitch of the transmitting portions and the light absorbing portions of the video light control sheet 334, the two methods shown in (1) and (2) below are effective.

(1) The vertical stripes made up of transmitting portions and light absorbing portions of the video light control sheet 334 are arranged so as to be inclined at an angle of θ0 with respect to the pixel arrangement of the liquid crystal panel 11.

(2) When the pixel size of the liquid crystal panel 11 is A and the pitch of the vertical stripes of the video light control sheet 334 is B, the ratio thereof (B/A) is selected so as not to be an integral multiple.

Since one pixel of the liquid crystal panel is made up of pixels of three colors R, G, and B arranged in parallel and is generally square, it is not possible to suppress the above-mentioned occurrence of moire over the entire screen. Therefore, it was determined through experiments that the inclination θ0 shown in (1) should be optimized within the range of 5 degrees to 25 degrees such that the occurrence position of moire can be intentionally shifted to a place where the air floating video is not displayed. Although the reduction of moire has been described using a liquid crystal panel, since both the retroreflector 103 and the video light control sheet 334 are stripe-shaped structures, the large moire with a low frequency and a long wavelength that occurs between the retroreflector 103 and the video light control sheet 334 and can be visually recognized can be reduced by optimally inclining the video light control sheet 334 with a focus on the X axis as shown in FIG. 4.

FIG. 5(A) is a vertical cross-sectional view of the video display apparatus 1 of the present invention in which the video light control sheet 334 is arranged on the video light emission surface of the liquid crystal panel 11. The video light control sheet 334 is configured by alternately arranging light transmitting portions 336 and light absorbing portions 337, and is adhered and fixed to the video light emission surface of the liquid crystal panel 11 by an adhesive layer 338.

Furthermore, when a 7-inch WUXGA (1920×1200 pixels) liquid crystal display panel is used as the video display apparatus 1 as described above, even if one pixel (one triplet) (A in the drawing) is about 80 μm, it is possible to obtain the sufficient transmitting property and control the diffusion characteristics of the video light from the video display apparatus to be the cause of the extraordinary light, so that ghost images formed on both sides of the air floating image can be reduced, if the pitch B of the video light control sheet 334 is 340 μm (for example, made up of 300 μm of the transmitting portion d2 and 40 μm of the light absorbing portion d1). At this time, if the thickness of the video control sheet is set to ⅔ or more of the pitch B shown in FIG. 5(A), the ghost reduction effect can be greatly improved.

FIG. 5(B) is a vertical cross-sectional view of the retrore-flector of the present disclosure in which the video light control sheet 334 is arranged on the video light emission surface of the retroreflector 103. The video light control sheet 334 is configured by alternately arranging the light transmitting portions 336 and the light absorbing portions 337, and is arranged to be inclined at an inclination angle θ1 in accordance with the emission direction of the retrore-flected light. As a result, the extraordinary light generated due to the above-mentioned retroreflection can be absorbed, and the normal reflected light can be transmitted without loss. When a 7-inch WUXGA (1920×1200 pixels) liquid crystal display panel is used, even if one pixel (one triplet) (A in the drawing) is about 80 μm, it is possible to obtain the sufficient transmitting property and control the diffusion characteristics of the video light from the video display apparatus to be the cause of the extraordinary light in the retroreflector, so that ghost images formed on both sides of the air floating image can be reduced, if the pitch B of the retroreflection portion is 420 μm (for example, made up of 400 μm of the transmitting portion d2 and 20 μm of the light absorbing portion d1.

Meanwhile, since the above-mentioned video light con-trol sheet 334 also has a function of preventing external light from entering the air floating video display apparatus, it leads to the improvement in reliability of the component parts. For example, a viewing angle control film (VCF) manufactured by Shin-Etsu Polymer Co., Ltd. is suitable as this video light control sheet, and since the structure thereof is a sandwich structure in which transparent silicone and black silicone are alternately arranged and synthetic resin is provided on a light incident/emission surface, the same effects as the external light control film of the present embodiment can be expected.

<Technical Means for Sensing Air Floating Video>

A sensing technique for operating an air floating video in a pseudo manner such that the viewer (operator) is bidirec-tionally connected to the information system via an air floating video display apparatus will be described below. FIG. 6(A) is a principle diagram for describing a first sensing technique. The air floating video FI is divided into a plurality of areas, twelve areas in this case, and a first ranging apparatus 340 in which TOF (Time of Flight) systems corresponding to the respective areas are incorpo-rated is provided. A near-infrared LED (Light Emitting Diode) serving as a light source is made to emit light in synchronization with the signal of the system. On the light emission side of the LED, an optical element for controlling the divergence angle and a highly sensitive avalanche diode with picosecond time resolution as a light receiving element are provided as a pair, and twelve pairs thereof are arranged in four columns and three rows so as to correspond to the twelve areas. The LED as a light source emits light in synchronization with the signal from the system, and the phase (Δt in FIG. 8A) is shifted by the time it takes for the light to reflect from an object to be measured (tip of the viewer's finger) to return to the light receiving element.

Figure 8A:
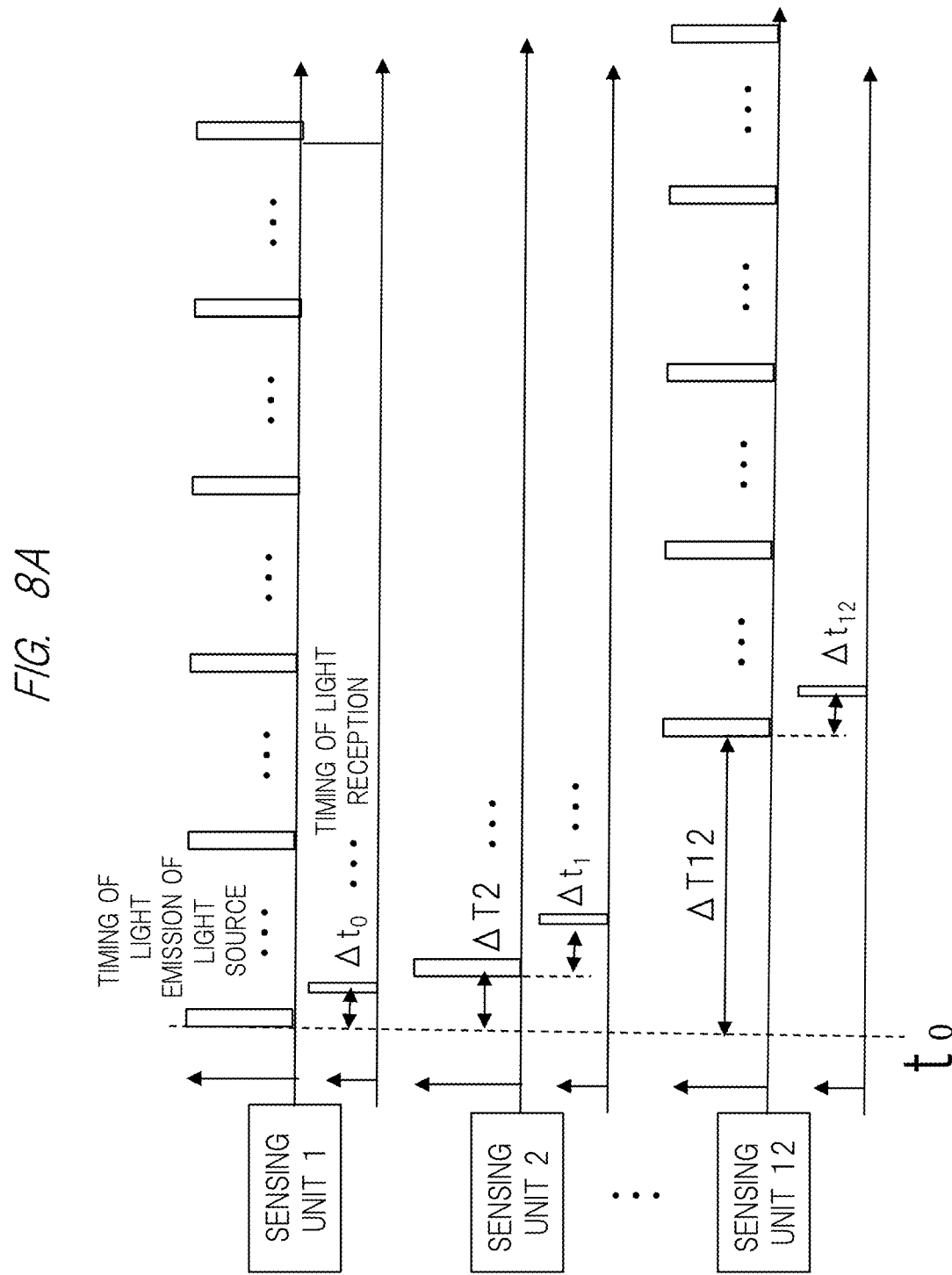
FIG. 8A is an explanatory diagram for describing an operation of the sensing apparatus used in the air floating video information display system.
Figure 8B:
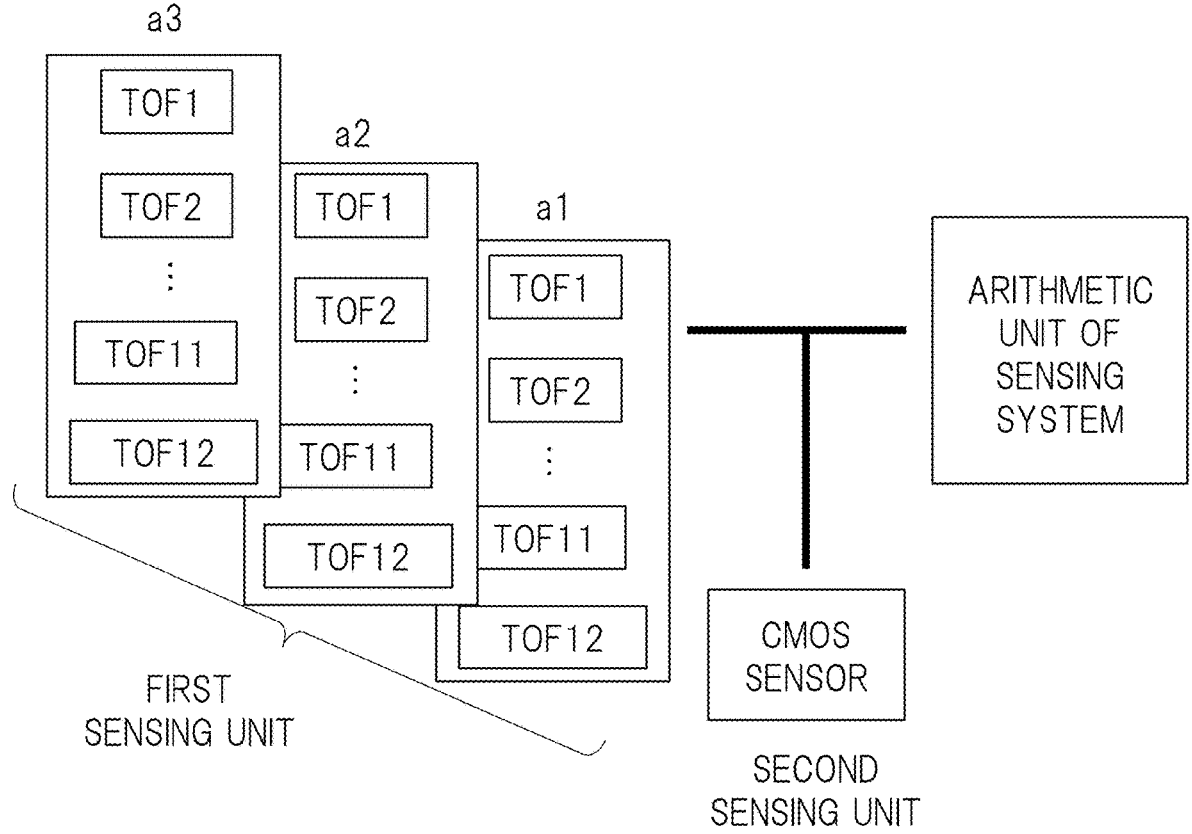
FIG. 8B is an explanatory diagram for describing the operation of the sensing apparatus used in the air floating video information display system.

In the present embodiment, sensing units 1 to 12 in FIG. 8A are described as an example in association with TOFs 1 to 12 in FIG. 8B. The arithmetic unit of the sensing system receives the signal from the system and the signal generated by the avalanche diode serving as the light receiving unit, and determines the distance to the object by calculating the phase shift based on the received signals. Meanwhile, the direction of movement of the object can be obtained as the system by recognizing which of the twelve areas the object has passed through in each measurement layer (a3 to a1) and calculating the moving time for each measurement layer by the method described above. FIG. 8A shows the timing of light emission of the LED and the timing of light reception of the light receiving element for each of the twelve mea-surement areas. By delaying the timing of light emission of the LED for each area, individual data are standardized.

When a viewer (operator) actually brings his or her finger closer to the air floating video FI for bidirectionally con-necting to the information system via the air floating video display apparatus, the contact position with the air floating video FI is obtained through the calculation processing from the moving direction of the finger and the time difference of the finger crossing each sensing plane based on a first sensing signal S1 detected in a specific area in a first sensing plane a3 farthest from the air floating video FI, a second sensing signal S2 detected in a specific area of a second sensing plane a2, and a third sensing signal S3 detected in a specific area of a third sensing plane a1. In order to obtain more accurate position information, by setting a sensing plane a0 at a position further away from the air floating video FI, the passage of the finger through the air floating video FI is detected as an end signal, and the contact point with the air floating video is obtained as three-dimensional coordinates based on the coordinates thereof and the two sensing signals described above.

Next, a second sensing technique will be described. As shown in the lower part of FIG. 6(B), when the viewer moves the finger backward after touching the desired coordinates (position) of the air floating video, the third sensing signal S3 detected on the third sensing plane a1, the second sensing signal S2 detected on the second sensing plane a2, and the first sensing signal S1 detected on the first sensing plane a3 are sequentially transmitted to the processing circuit of the sensing system for calculation processing, whereby the system recognizes that the viewer's finger has left the specific coordinates of the air floating video.

A highly-accurate sensing technique for operating an air floating video in a pseudo manner such that the viewer (operator) is bidirectionally connected to the information system via the air floating video display apparatus will be described below.

FIG. 7(A) is a principle diagram for describing the second sensing technique. The difference from the first sensing technique shown in FIG. 6(A) is that a second ranging apparatus 341 is provided in addition to the first ranging apparatus 340 to realize a more accurate system. As described above, the first ranging apparatus 340 incorporates TOF (Time of Flight) systems corresponding to the respective divided areas (twelve areas in the embodiment) of the air floating video FI.

Meanwhile, the second ranging apparatus 341 is a two-dimensional image sensor, and an aspect ratio of a ¼ inch CMOS sensor for use in a sensing camera is generally 3:4. Therefore, in the present embodiment, the first ranging apparatus 340 also divides the sensing area into three areas vertically and four areas horizontally. In addition, although sufficient resolution power can be obtained even with a resolution of about one million pixels, since there is no need to provide RGB color separation filters unlike normal camera systems, the size reduction and higher sensitivity can be achieved even if the number of pixels is the same as conventional. In addition, in the configuration of the present embodiment, since the sensitivity to near-infrared light is high, the object (tip of the viewer's finger) to be measured is irradiated with the light source light of the TOF system of the first ranging apparatus 340 at a timing determined for each area, and detection accuracy is greatly improved.

The system described above is shown as a block diagram in FIG. 8B. In the example of FIG. 8B, a first sensing unit is provided as an example of the first ranging apparatus 340. Also, a second sensing unit having a CMOS sensor is provided as an example of the second ranging apparatus 341. Further, an arithmetic unit of a sensing system that performs arithmetic operations based on the sensing results of the first sensing unit and the second sensing unit is provided. In the example of this drawing, for example, there are twelve TOF sensors (TOF1 to TOF12 shown in FIG. 8B), each of the sensing planes a1, a2, and a3 is divided into twelve areas, and any one of the divided areas is sensed. The areas located at the corresponding position but having different depths in the sensing planes a1, a2, and a3 may be sensed by the same TOF sensor. In this case, the space including the sensing planes a1, a2, and a3 is divided into three areas vertically and four areas horizontally, that is, into twelve areas in total, and each of the divided areas is sensed by the corresponding TOF sensor. In this way, highly accurate stereo sensing can be realized with a small number of TOF sensors. Note that the space including the sensing planes a1, a2, and a3 may be divided into three areas at the depth positions corresponding to the sensing planes a1, a2, and a3 in addition to the vertical division into three areas and the horizontal division into four areas, and thirty six TOF sensors in total may be provided so as to correspond to the thirty six divided areas in total.

As shown in FIG. 7(B), in the air floating video display apparatus using the second sensing technique, when a viewer (operator) brings his or her finger closer to the air floating video FI for bidirectionally connecting to the information system, in addition to the three-dimensional information provided by the first ranging apparatus 340 described above, the planar resolution power of the sensing plane b3 of the second ranging apparatus 341 corresponding to the sensing plane a3 farthest from the air floating video FI can be increased in accuracy in accordance with the resolution of the used CMOS sensor. Similarly, since the sensing plane b2 corresponds to the sensing plane a2 and the sensing plane b1 corresponds to the sensing plane a1, it is possible to realize a sensing system in which the resolution power in the planar direction is significantly improved. At this time, the moving direction of the object (tip of the viewer's finger) is obtained by calculating the contact position with the air floating video FI from the time difference of the object crossing each sensing plane.

In order to obtain more accurate position information, by setting a sensing plane a0 at a position further away from the air floating video FI, the passage of the finger through the air floating video FI is detected as an end signal, and the contact point with the air floating video can be obtained as more accurate three-dimensional coordinates based on the coordinates thereof and the two sensing signals described above. In addition, if the frame rate of the CMOS sensor is increased from $1/20$ seconds to $1/30$ seconds or $1/120$ seconds, the resolution power is greatly improved in addition to the detection accuracy in the planar direction because the amount of plane information captured per unit time increases. At this time, the position information obtained by the first sensing technique is organized by a synchronization signal supplied from the information system.

Furthermore, as shown in the lower part of FIG. 7(B), when the viewer moves the finger backward after touching the desired coordinates (position) of the air floating video, the third sensing signal S3 detected on the third sensing plane a1, the second sensing signal S2 detected on the second sensing plane a2, and the first sensing signal S1 detected on the first sensing plane a3 are sequentially transmitted to the processing circuit of the sensing system for calculation processing, whereby the system recognizes that the viewer's finger has left the specific coordinates of the air floating video, like the first sensing technique described above.

Figure 9:
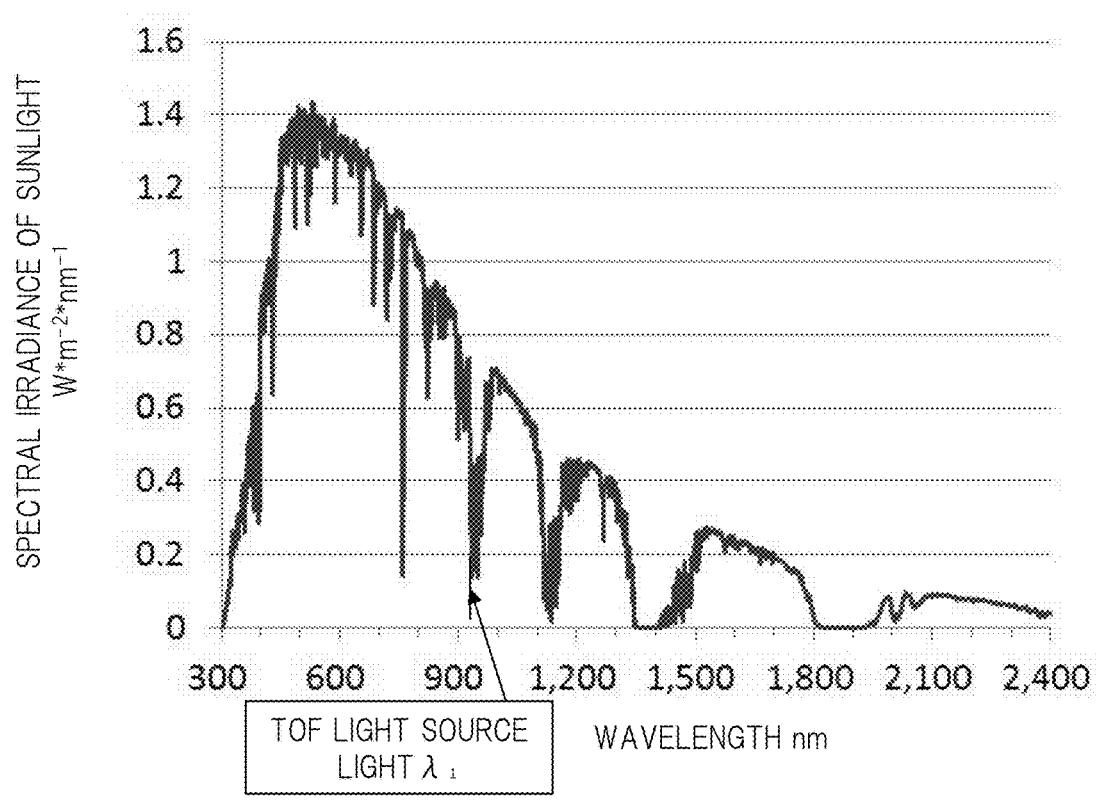
FIG. 9 is a characteristic diagram showing the spectral irradiance of sunlight.

As the LED light source used in the TOF sensor described above, the near-infrared light that prevents the accuracy decrease of the ranging apparatus due to external light (sunlight) and has high light energy in the range exceeding the visible light range (380 (nm) to 780 (nm)) that cannot be seen with the naked eye is preferably used. For example, it is preferable to use the light of 920 (nm) which has less energy in the spectral irradiance of sunlight shown in FIG. 9.

Second Configuration Example of Air Floating Video Information Display System

Figure 11:
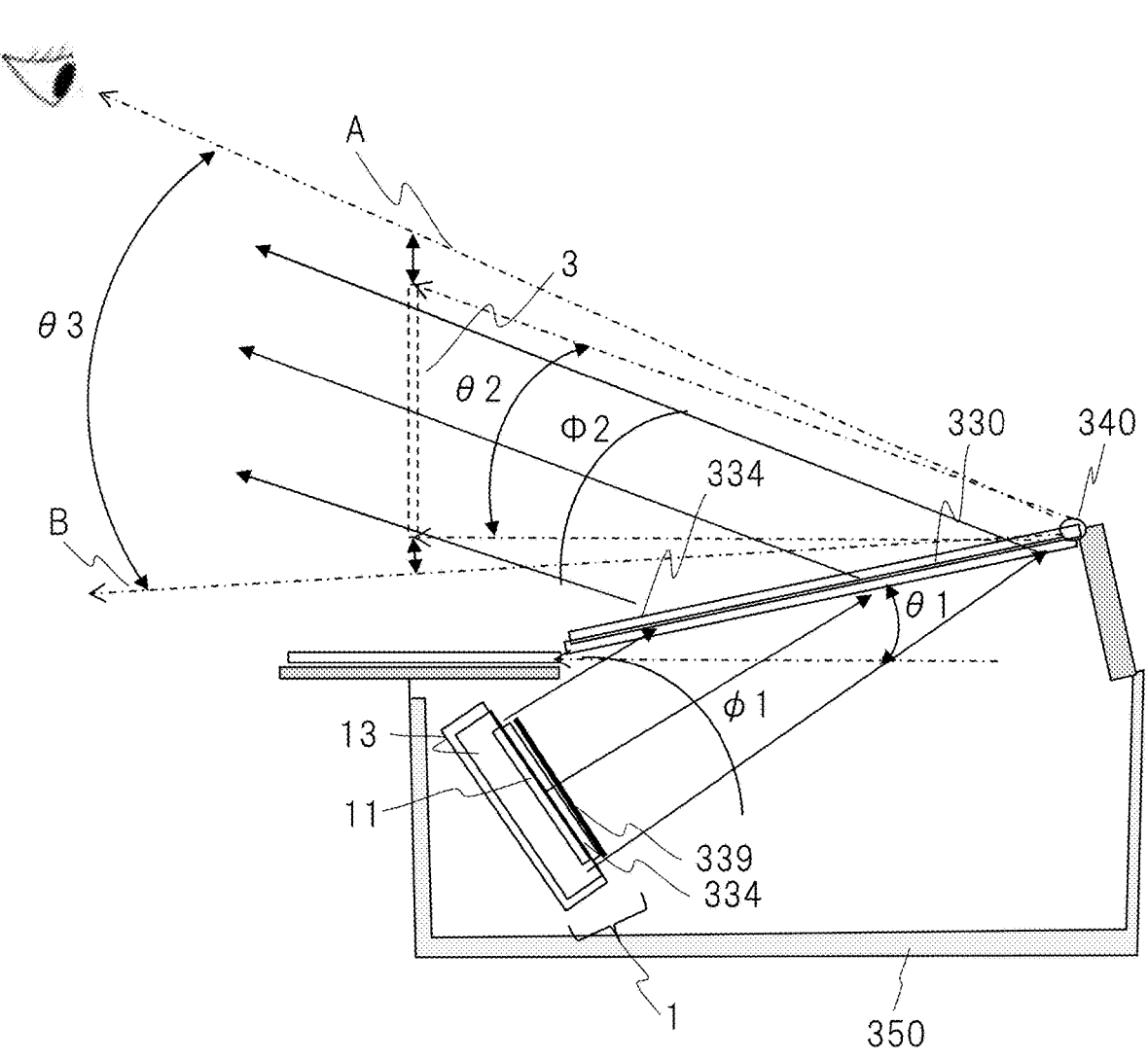
FIG. 11 is a diagram showing a configuration of a main part of the air floating video information display system according to one embodiment of the present invention.

FIG. 11 is a diagram showing a configuration of a main part of the air floating video information display system according to one embodiment of the present invention. This air floating video information display system is suitable when a viewer observes an air floating video from obliquely above. The video display apparatus 1 includes the liquid crystal display panel 11 as a video display element and the light source apparatus 13 configured to generate light of a specific polarized wave having narrow-angle diffusion characteristics. Any liquid crystal display panel such as a small liquid crystal display panel with a screen size of about 5 inches or a large liquid crystal display panel with a screen size of over 80 inches may be used as the liquid crystal display panel 11.

The video light from the liquid crystal display panel 11 is emitted toward the retroreflector (retroreflection portion or retroreflection plate) 330. The light with a narrow divergence angle described later from the light source apparatus 13 enters the liquid crystal panel to generate a video light flux φ1 with a narrow divergence angle, and the vide light flux enters the retroreflector 330 to obtain the air floating video 3. The air floating video 3 is formed at a symmetrical position of the video display apparatus 1 with the retroreflector 330 as a symmetrical plane. In order to eliminate the ghost image generated at this time and obtain the high-quality air floating video 3, the video light control sheet 334 is preferably provided on the emission side of the liquid crystal panel 11 to control the diffusion characteristics in unnecessary directions.

Figure 10:
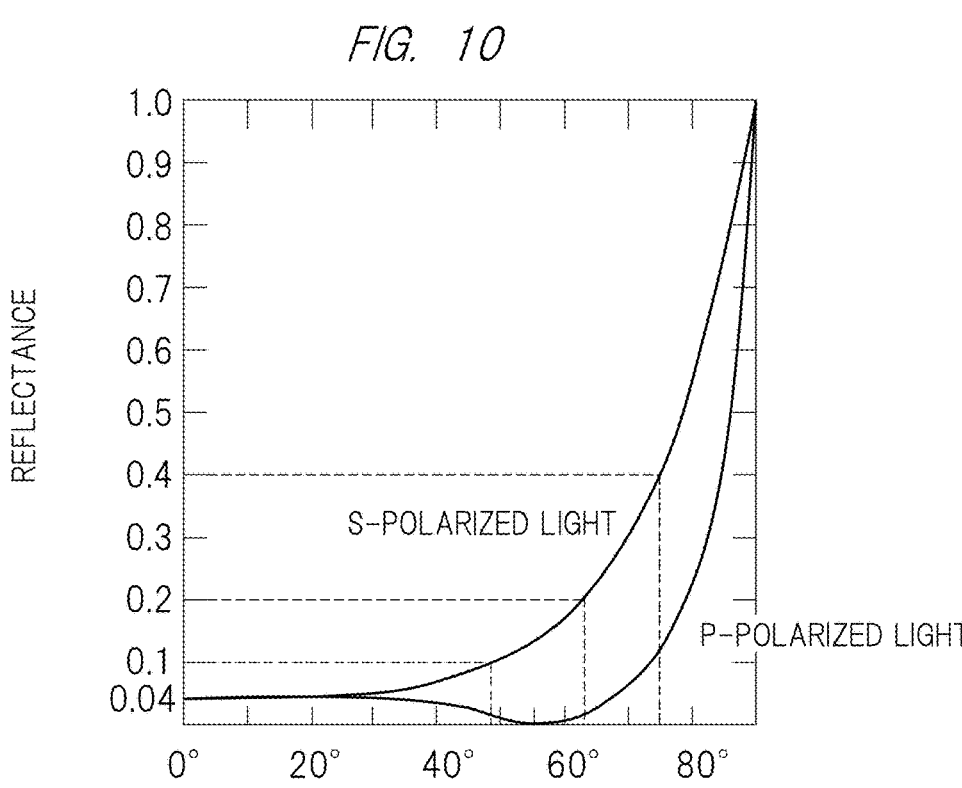
FIG. 10 is a characteristic diagram showing reflection characteristics of polarized light entering a medium with a refractive index of 1.5 with respect to a light ray incident angle.

Furthermore, as shown in FIG. 10, S-polarized light is preferably used for the video light from the liquid crystal panel 11 because the reflectance on a reflection member such as a retroreflector can be increased in principle. On the other hand, when a viewer uses polarized sunglasses, there is a problem in that the air floating image is reflected or absorbed by the polarized sunglasses. As a countermeasure against this, it is preferable to provide a change cancellation element 339 that optically converts a part of the video light of a specific polarized wave into the other polarized wave to obtain natural light in a pseudo manner. With such a configuration, even when the viewer is wearing polarized sunglasses, the viewer can favorably view the air floating video.

Examples of commercially available depolarization elements include Cosmoshine SRF (manufactured by TOYOBO Co., Ltd.) and depolarization adhesive (manufactured by NAGASE & CO., LTD.). In the case of Cosmoshine SRF (manufactured by TOYOBO Co., Ltd.), reflection at the interface can be reduced and brightness can be improved by applying an adhesive onto the image display apparatus. Further, in the case of depolarization adhesive, it can be used by bonding a colorless transparent plate and an image display apparatus via the depolarization adhesive. In addition, as shown in FIG. 11, the video light control sheet 334 is provided also on the video emission surface of the retroreflector 330, and ghost images generated on both sides of the normal image of the air floating video 3 due to unnecessary light are eliminated by the video light control sheet 334. In the present embodiment, the retroreflector 330 is inclined (θ1) with respect to the horizontal axis, and the air floating video 3 is generated substantially perpendicularly to the horizontal axis.

Figure 6:
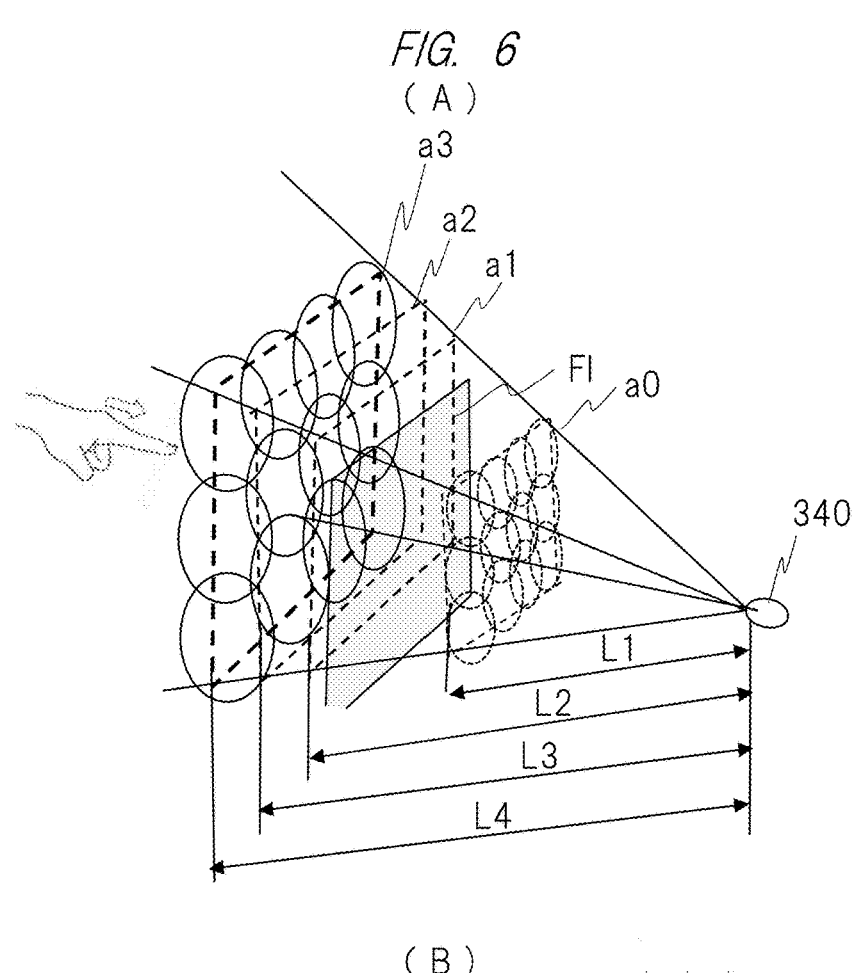
FIG. 6 is an explanatory diagram for describing a function of a sensing apparatus used in the air floating video information display system.
Figure 6:
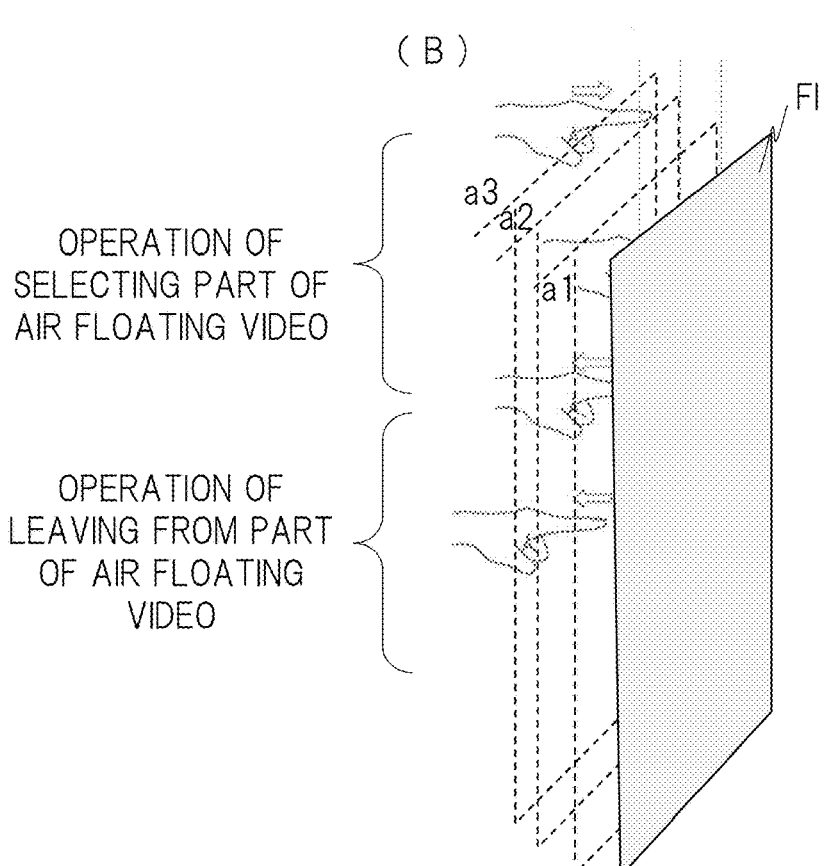
Figure 7:
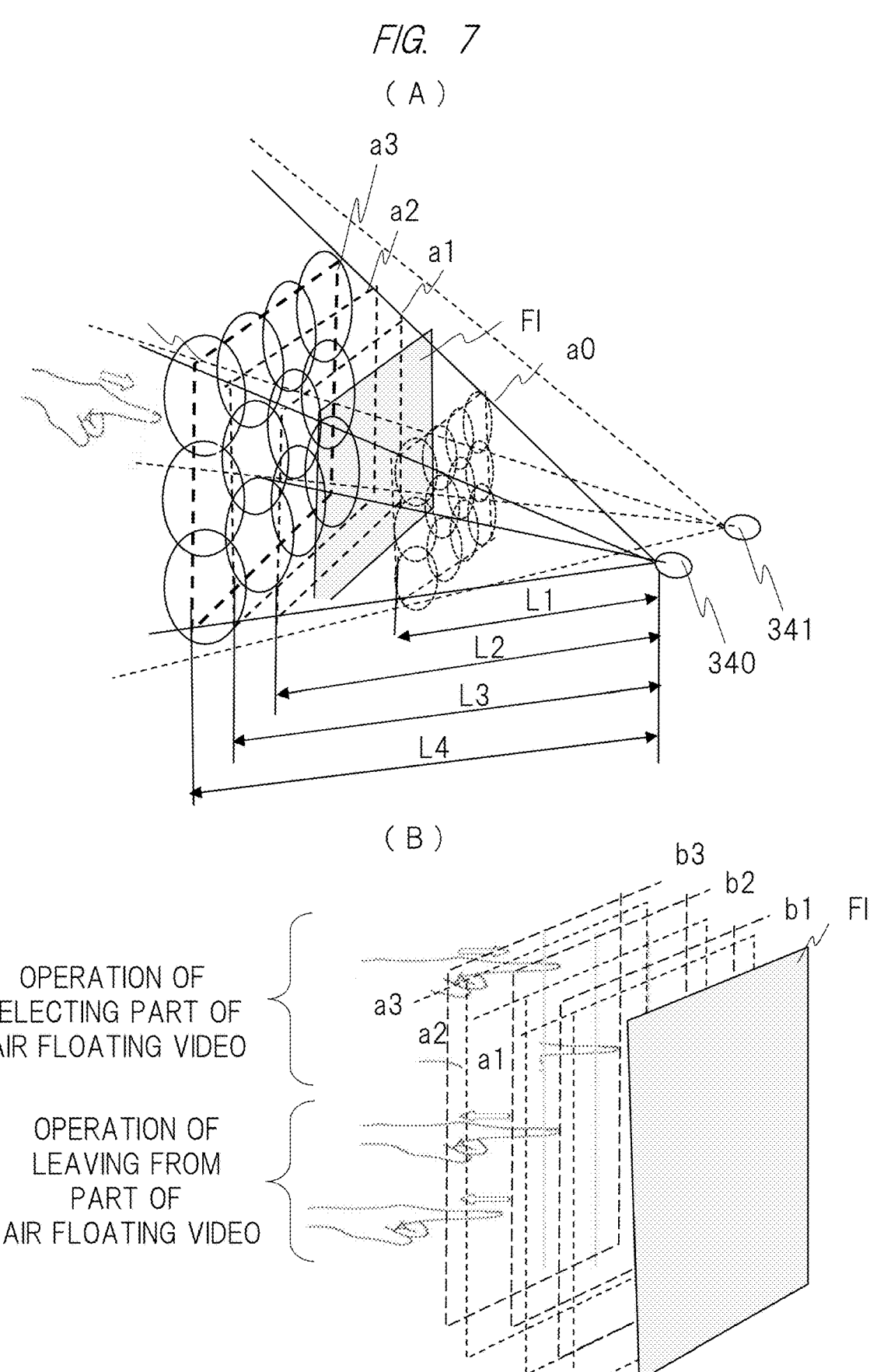
FIG. 7 is an explanatory diagram of the principle of a three-dimensional sensing system used in the air floating video information display system.

Further, in the present embodiment, the first ranging apparatus 340 is mounted as shown in FIG. 11 to provide the system with which the viewer can access the air floating video. At this time, it is preferable to select the mounting position of the ranging apparatus 340 and the viewing angle θ3 as appropriate so as to be able to sufficiently cover the size of the air floating video. As shown in FIG. 6 and FIG. 7, since the ranging system divided for a plurality of areas is used, the TOF sensor of the ranging apparatus 340 can enhance the resolution power for each sensing area. Furthermore, the second sensing technique using a CMOS sensor (the second ranging apparatus 341 is not shown in FIG. 11) can also be used together, and the detection accuracy can be further improved in this case.

In addition, in the present embodiment, since a light source that diverges visible light with narrow-angle directional characteristics is used and the first ranging apparatus and the second ranging apparatus are arranged on the main body side, it is possible to eliminate the influence of the video light forming the air floating video on the sensing accuracy.

Figure 12:
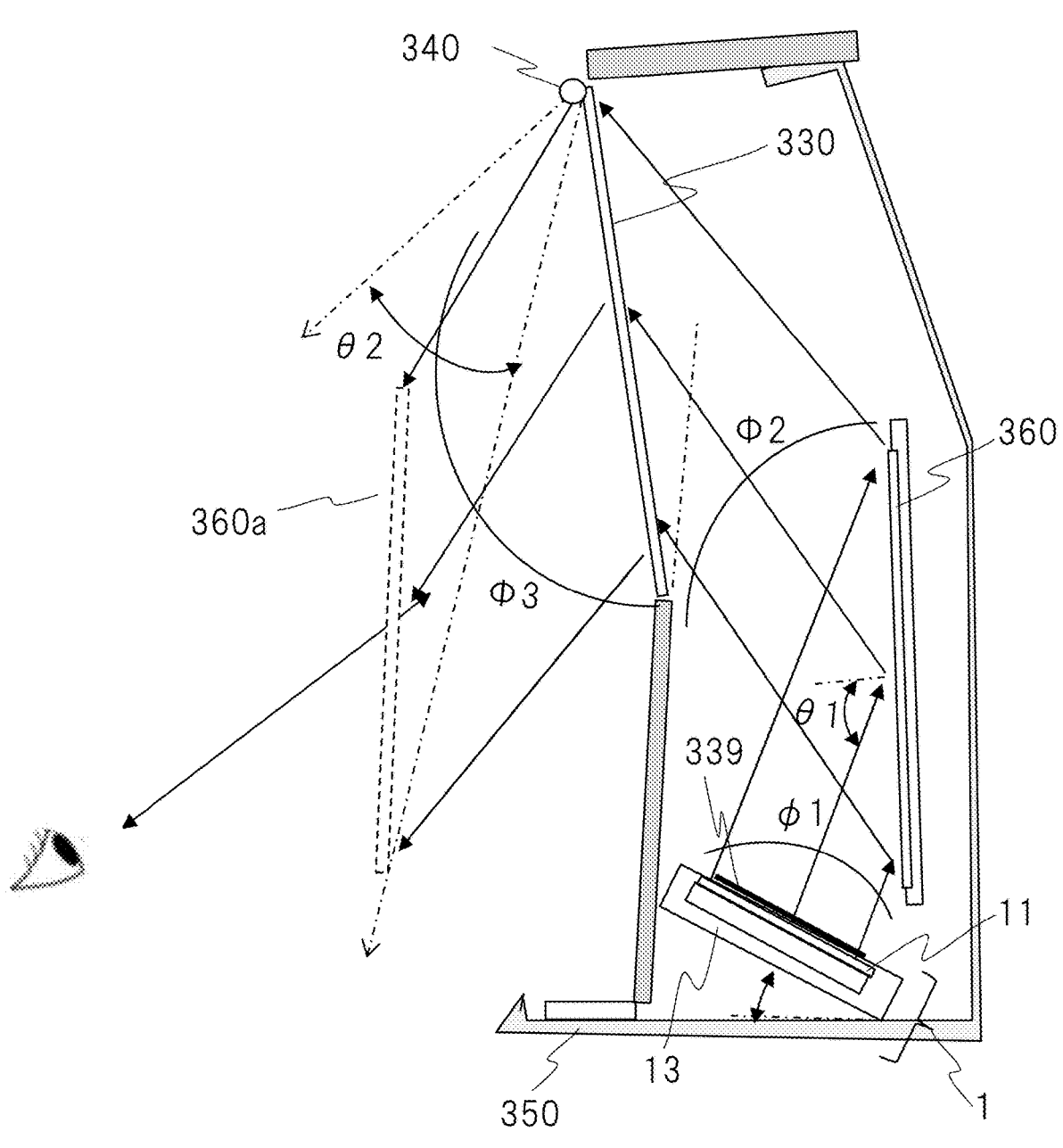
FIG. 12 is a diagram showing a configuration of a main part of another air floating video information display system according to one embodiment of the present invention.

Third Configuration Example of Air Floating Video Information Display System FIG. 12 is a diagram showing another example of the air floating video information display system. This air floating video information display system is suitable when a viewer observes an air floating video from obliquely below. The video display apparatus 1 includes the liquid crystal display panel 11 as a video display element and the light source apparatus 13 configured to generate light of a specific polarized wave having narrow-angle diffusion characteristics.

The liquid crystal display panel 11 may be composed of a liquid crystal display panel of selected size from a small-sized liquid crystal display panel having a screen size of about 5 inches to a large-sized liquid crystal display panel having a screen size exceeding 80 inches. The video light from the liquid crystal display panel 11 is turned back by a light path turning mirror (referred to also as "turning mirror") 360 and is emitted toward the retroreflector (retroreflection portion or retroreflection plate) 330. The light with a narrow divergence angle described later from the light source apparatus 13 is made to enter the liquid crystal panel 11 to generate a video light flux φ1 with a narrow divergence angle, and the video light flux φ1 is made to enter the retroreflector 330 to form an air floating video. The air floating video is formed at a symmetrical position of the video display apparatus 1 with the retroreflector 330 as a symmetrical plane. In the present embodiment, the distance from the video display apparatus 1 to the retroreflector 330 can be extended by interposing the turning mirror 360, so that the air floating video can be formed at a position away from the retroreflector 330. Furthermore, as will be described below, the present embodiment has also an effect of enlarging the air floating video in the vertical direction.

A turning mirror reflected image 360a will be described with reference to FIG. 12. In the present embodiment, the turning mirror 360 is arranged so as to be inclined with respect to the video light flux φ1 from the video display apparatus 1 and the incident angle θ1 of the video light is made larger than 45 degrees, whereby the enlarged turning mirror reflected image 360a can be obtained. For example, if the turning mirror 360 is arranged such that the incident angle of light is 60 degrees, the vertical dimension of the recognized video of the turning mirror reflected image 360a is magnified approximately twice the vertical dimension of the video displayed on the liquid crystal panel. In this case, it goes without saying that the brightness of the secondary video source is reduced to ½. Further, it goes without saying that the same magnifying effect can be obtained even when the turning mirror 360 is inclined in the depth direction of FIG. 12. Meanwhile, it is preferable to perform image processing such as conversion of the aspect ratio of the image such that the displayed video can be viewed without any visual problems even when the pixels are stretched in the vertical direction.

In order to obtain the high-quality air floating video 3 by eliminating the ghost image generated in the air floating video 3, the video light control sheet 334 may be provided on the emission side of the liquid crystal display panel 11 to control the diffusion characteristics in unnecessary directions like the second embodiment. On the other hand, by providing the video light control sheet 334 also on the video light emission surface of the retroreflector 330, ghost images generated on both sides of the normal image of the air floating video 3 due to unnecessary light may be eliminated. By inclining (θ1) the retroreflection sheet 330 with respect to the horizontal axis, the air floating video 3 can be generated substantially perpendicularly to the horizontal axis. The ranging apparatus 340 is mounted to provide the system with which the viewer can access the air floating video. It is preferable to select the mounting position of the ranging apparatus 340 and the viewing angle θ3 as appropriate so as to be able to sufficiently cover the size of the air floating video 3.

Figure 13:
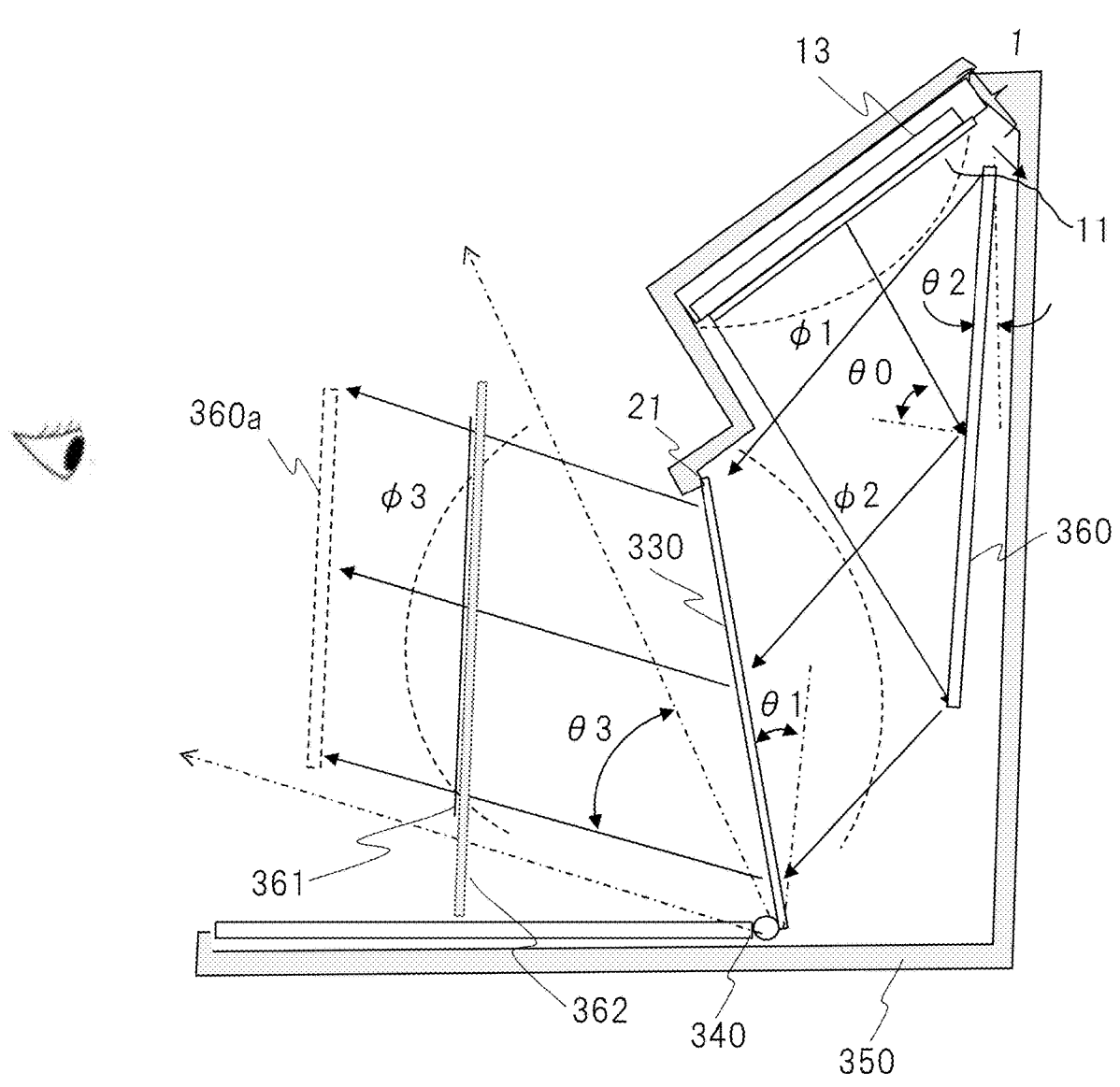
FIG. 13 is a diagram showing a configuration of a main part of another air floating video information system according to one embodiment of the present invention.

Fourth Configuration Example of Air Floating Video Information Display System FIG. 13 is a diagram showing another example of the air floating video information display system. This air floating video information display system is suitable when a viewer observes an air floating video from obliquely above. The video display apparatus 1 includes the liquid crystal display panel 11 as a video display element and the light source apparatus 13 configured to generate light of a specific polarized wave having narrow-angle diffusion characteristics. The liquid crystal display panel 11 may be composed of a liquid crystal display panel of selected size from a small-sized liquid crystal display panel having a screen size of about 5 inches to a large-sized liquid crystal display panel having a screen size exceeding 80 inches. The video light from the liquid crystal display panel 11 is turned back by the light path turning mirror 360 and is emitted toward the retroreflector (retroreflection portion or retroreflection plate) 330. The light with a narrow divergence angle described later from the light source apparatus 13 is made to enter the liquid crystal panel 11 to generate a video light flux φ1 with a narrow divergence angle, and the video light flux φ1 is made to enter the retroreflector 330 to form an air floating image. The air floating image is formed at a symmetrical position of the video display apparatus 1 with the retroreflector 330 as a symmetrical plane. In the present embodiment, the distance from the video display apparatus 1 to the retroreflector 330 can be extended by interposing the turning mirror 360 like the third embodiment, so that the air floating video can be formed at a position away from the retroreflector 330. Furthermore, as will be described below, the present embodiment has also an effect of enlarging the air floating video 3 in the vertical direction.

The turning mirror reflected image 360a will be described with reference to FIG. 13. The turning mirror 360 is arranged so as to be inclined by θ2 with respect to the video light flux φ1 from the video display apparatus 1 and the incident angle θ0 of the video light is made larger than 45 degrees, whereby the enlarged turning mirror reflected image 360a can be obtained. For example, if the turning mirror 360 is arranged such that the incident angle of light is 60 degrees, the vertical dimension of the recognized video of the turning mirror reflected image 360a is magnified approximately twice the vertical dimension of the video displayed on the liquid crystal panel. At this time, it is preferable to perform image processing such as conversion of the aspect ratio of the image such that the displayed video can be viewed without any visual problems even when the pixels are stretched in the vertical direction.

In the configuration of the fourth embodiment, the video display apparatus 1 is arranged above the air floating video 3. As a result, it is possible to realize a system configuration in which the video light rays enter the retroreflector 330 obliquely from above. Further, in order to form the air floating video 3 almost perpendicularly to the set housing, the retroreflector 330 can be arranged so as to be inclined (θ1) with respect to the bottom surface of the set housing. As a result, it is possible to prevent the deterioration in image quality of the air floating video 3 caused by the external light entering the housing through the retroreflector 330. In order to obtain the high-quality air floating video 3 by eliminating the ghost image generated in the air floating video 3, the video light control sheet 334 may be provided on the emission side of the liquid crystal display panel 11 to control the diffusion characteristics in unnecessary directions like the second embodiment. On the other hand, by providing the video light control sheet 334 also on the video light emission surface of the retroreflector 330, ghost images generated on both sides of the normal image of the air floating video 3 due to unnecessary light may be eliminated. By arranging the above-described structure inside the housing 350, it is possible to prevent the generation of ghost images due to external light entering the retroreflector 330.

In the present embodiment, as in the three air floating video information display systems described above, the ranging apparatus 340 is mounted to provide the system with which the viewer can access the air floating video 3. It is preferable to select the mounting position of the ranging apparatus 340 and the viewing angle θ3 as appropriate so as to be able to sufficiently cover the size of the air floating video. Further, a capacitive touch panel 361 is arranged between the air floating video 3 and the retroreflector 330 by fixing it with a support member 362. By using the third sensing technique using the capacitive touch panel 361 together with the first sensing technique, the detection accuracy can be further improved. It is preferable to select the mounting position of the ranging apparatus 340 and the viewing angle θ3 as appropriate so as to be able to sufficiently cover the size of the air floating video 3. Similarly, it is preferable to select the size and the mounting position of the capacitive touch panel 360 as appropriate so as to be able to sufficiently cover the air floating video.

A projection capacitive type is adopted as the capacitive touch panel that captures highly accurate position information. In this case, transparent electrodes ITO (Y-axis direction) with a minute line-to-line distance and transparent electrodes (copper thin film) with a minute line-to-line distance are patterned on both surfaces of a transparent glass substrate by photolithoetching, thereby manufacturing the capacitive touch panel. In this capacitive touch panel, when an object (tip of the viewer's finger) approaches the above-mentioned transparent glass substrate, the change in electrostatic capacitance can be detected by each of the X-axis electrodes and the Y-axis electrodes to obtain relative coordinates of the object, and higher resolution power can be obtained as the above-mentioned line-to-line distance of the transparent electrodes is shorter. Also, with the capacitive touch panel, multi-point detection is possible, which enables the simultaneous input with a plurality of fingers.

<Method of Displaying Air Floating Video>

Figure 14:
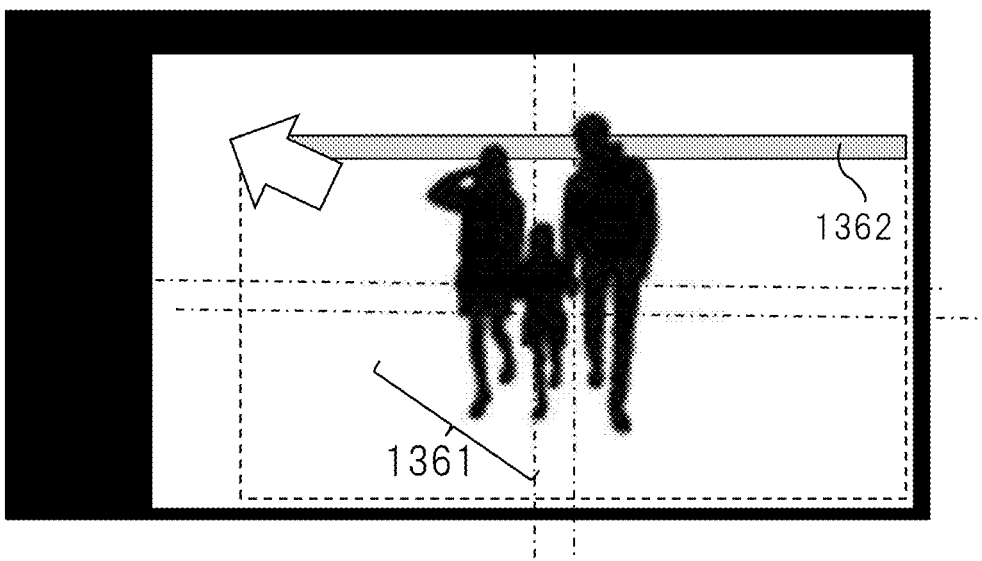
FIG. 14 is a diagram showing an example of an effective video display on the air floating video information display system according to an embodiment of the present invention.

The inventors have studied a display method with which a viewer of the air floating video can strongly perceive the air floating video displayed by the air floating video information display system described above as the stereoscopic video apparently floating in the air. FIG. 14(A) and FIG. 14(B) show the results thereof.

FIG. 14(A) shows the first video display technical means. As shown in FIG. 14(A), it is preferable that the air floating video uses about 80% of the video display region of the video display apparatus 1 and a non-display (black display) region is surely secured in at least a part of a peripheral portion. As a result, it was found that the viewer perceives the sharpness of the aerial floating video from the brightness ratio between the black display region (portion) and the video display region (portion).

Also, in the display method, as the effective use of the location apart from the center of the screen, the center of the video is arranged to be shifted from the center of the panel. For example, by gradually moving a video 1361 from the lower right of the screen to the upper left of the screen (see white arrow in FIG. 14(A)), the sense of floating of the video can be enhanced. In addition, by gradually increasing the magnification ratio of the video 1361 along with the movement to make the video 1361 look closer, the sense of floating of the video can be enhanced. On the other hand, by gradually moving the video 1361 in the direction opposite to the white arrow in FIG. 14(A), that is, from the upper left of the screen to the lower right of the screen, the sense of depth can be enhanced. Also, by gradually decreasing the magnification ratio of the video 1361 along with the movement to make the video 1361 look more distant, the sense of floating of the video can be enhanced.

Next, FIG. 14(B) shows the second video display technical means. Also in this case, as in the first video display technical means, it is preferable that the air floating video uses about 80% of the video display region of the video display apparatus 1 and a non-display (black display) region is surely secured in at least a part of a peripheral portion. Alternatively, as shown in FIG. 14(B), a video 1362 serving as a reference in the depth direction when the observer views the air floating video may be added. The video 1362 shown in FIG. 14(B) has a fixed position and a fixed size even when the video 1361 moves, for example, in the direction of the white arrow in FIG. 14(B). By displaying such a fixed video 1362, the video 1361 appears to be displayed in front relative to the rear video 1362 (in other words, the reference video), and the sense of floating of the video 1361 in the air floating video is greatly improved.

Further, it was found through experiments that the viewer perceived the sharpness of the aerial floating video from the brightness ratio between the black display region (portion) and the video display region (portion) of the aerial floating video. More specifically, it was obtained through experiments that, in order to visually recognize the aerial floating video as a clear video, a brightness of 1000 (nt) or more was required when enjoying the air floating video in a normal living room, a brightness of 2000 (nt) or more was required in a living room with external light, and a brightness of about 6000 (nt) was required outdoors. Furthermore, it is also desirable that the absolute brightness of the black display region (portion) is low, and the sharpness of the video is expressed as the contrast ratio shown in the following equation.

Contrast ratio=brightness of 100% white display video/brightness of black display video Then, it was found through experiments that the contrast ratio value was desirably 500 or more. For this reason, the inventors have developed a light source apparatus for a liquid crystal panel with a narrow divergence angle having a polarization conversion function as will be described later, thereby realizing the lower power consumption while ensuring the high brightness and high contrast.

<Performance of Liquid Crystal Panel>

Figures 17, 18:
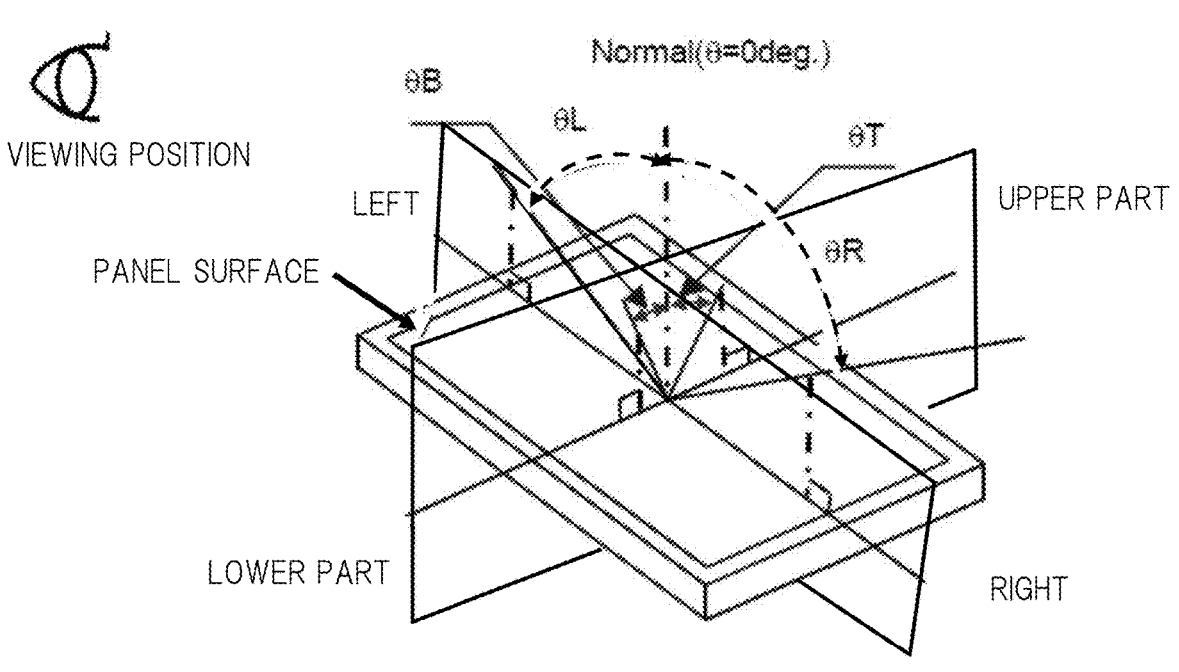
FIG. 17 is a diagram showing a coordinate system for measuring visual characteristics of a liquid crystal panel.
FIG. 18 is a diagram showing angular characteristics of brightness (vertical direction) of a general liquid crystal panel.

By the way, in a general TFT (Thin Film Transistor) liquid crystal panel, brightness and contrast performance differ depending on the light emission direction and the mutual characteristics of the liquid crystal and the polarizing plate. In the evaluation in the measurement environment shown in FIG. 17, the characteristics of the brightness and the viewing angle in the vertical direction of the panel are excellent at an angle slightly deviated (+5 degrees in the present embodiment) from the emission angle perpendicular to the panel surface (emission angle of 0 degrees) as shown in FIG. 11. This is because the characteristics of twisting the light in the vertical direction of the liquid crystal does not become 0 degrees when the applied voltage is maximum.

Figure 19:
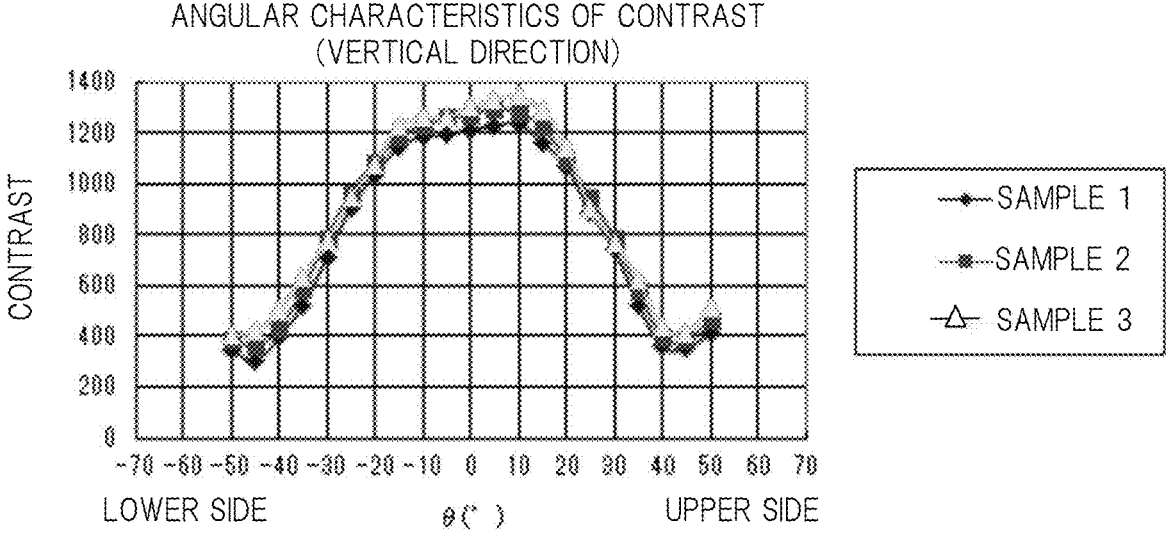
FIG. 19 is a diagram showing angular characteristics of contrast (vertical direction) of a general liquid crystal panel.

On the other hand, the contrast performance in the vertical direction is excellent in the range of −15 degrees to +15 degrees in FIG. 19 showing the results measured using samples 1 to 3, and the best characteristics can be obtained in the range of ±10 degrees centered 5 degrees when combined with the brightness characteristics.

Figure 20:
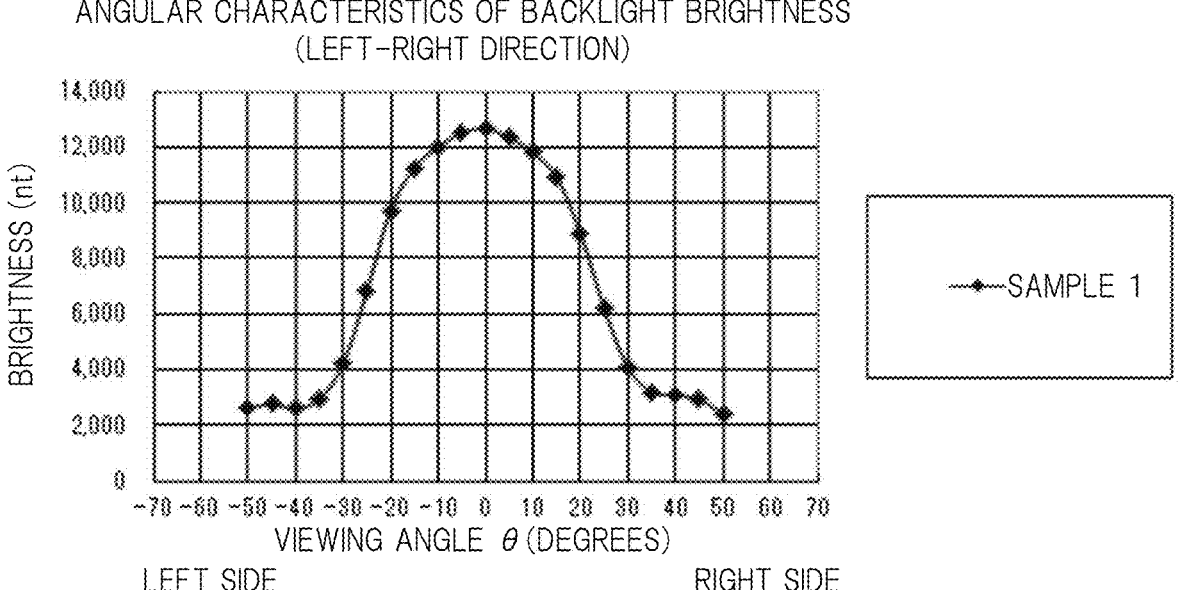
FIG. 20 is a diagram showing angular characteristics of brightness (left-right direction) of a general liquid crystal panel.

In addition, as shown in FIG. 20, the characteristics of the brightness and the viewing angle in the left-right direction of the panel are excellent at the emission angle perpendicular to the panel surface (emission angle of 0 degree). This is because the characteristics of twisting the light in the left-right direction of the liquid crystal becomes 0 degrees when the applied voltage is maximum.

Figure 21:
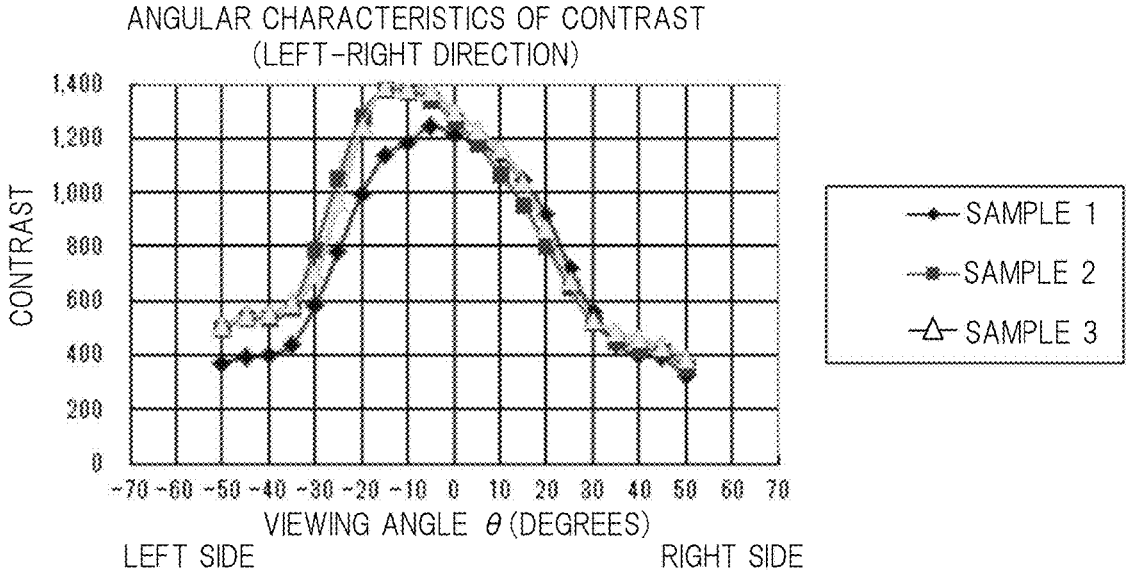
FIG. 21 is a diagram showing angular characteristics of contrast (left-right direction) of a general liquid crystal panel.

Similarly, the contrast performance in the left-right direction is excellent in the range of −5 degrees to −10 degrees in FIG. 21 showing the results measured using samples 1 to 3, and the best characteristics can be obtained in the range of ±5 degrees centered around −5 degrees when combined with the brightness characteristics. Therefore, as to the emission angle of the video light emitted from the liquid crystal panel, by making the light enter the liquid crystal panel from the direction capable of obtaining the best characteristics by a light flux direction converter 204 provided on a light guide 203 of the light source apparatus 13 described above and performing the light modulation with a video signal, the image quality and performance of the video display apparatus 1 can be improved.

In order to make the most of the brightness and contrast characteristics of the liquid crystal panel as a video display element, the incident light from the light source to the liquid crystal panel is set within the above-mentioned range, whereby the image quality of the air floating video can be improved.

<Control Method of Light Source Light>

In the present embodiment, in order to improve the utilization efficiency of a light flux 30 emitted from the light source apparatus 13 and significantly reduce the power consumption, in the video display apparatus 1 including the light source apparatus 13 and the liquid crystal display panel 11, the light from the light source apparatus 13 is made to enter the liquid crystal panel 11 at an incident angle with which the characteristics of the liquid crystal panel 11 are maximized, and then the video light ray subjected to the brightness modulation in accordance with the video signal is emitted toward the retroreflector 330. At this time, the set volume of the air floating video information display system is made small, and the degree of freedom in arrangement of the liquid crystal panel 11 and the retroreflector 330 is enhanced. Furthermore, in order to form the floating video at a desired position and ensure the optimum directivity after the retroreflection, the following technical means is used.

A transparent sheet made of an optical component such as a Fresnel lens or a linear Fresnel lens is provided as a light direction conversion panel on the video display surface of the liquid crystal panel 11, and the emission direction of the light flux entering the retroreflector 330 is controlled while providing high directivity, thereby determining the imaging position of the air floating video. With this configuration, the video light from the video display apparatus 1 can be efficiently delivered to an observer outside the window glass 105 (for example, a sidewalk) with high directivity (straightness) like laser light as shown in FIG. 1. As a result, it is possible to display a high-quality floating video with high resolution and to significantly reduce power consumption of the video display apparatus 1 including the light source apparatus 13.

Example 1 of Video Display Apparatus

Figure 22:
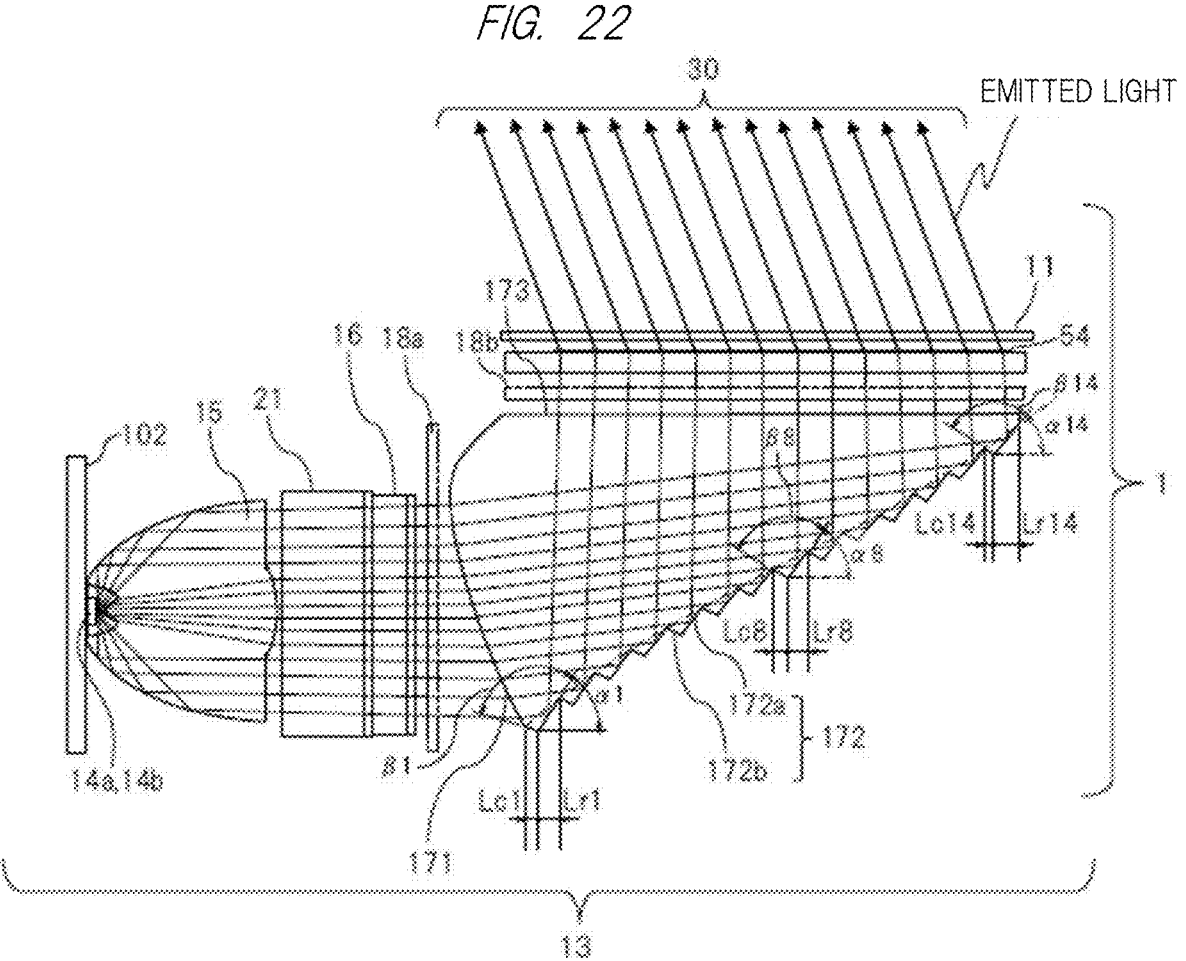
FIG. 22 is a cross-sectional view showing an example of a specific configuration of a light source apparatus.

FIG. 22 shows another example of a specific configuration of the video display apparatus 1. The light source apparatus 13 in FIG. 22 is the same as the light source apparatus in FIG. 23 and others. The light source apparatus 13 is configured by accommodating an LED, a collimator, a synthetic diffusion block, a light guide, and the like in a case made of, for example, plastic, and the liquid crystal display panel 11 is attached to the upper surface thereof. Further, LED (Light Emitting Diode) elements 14a and 14b which are semiconductor light sources and an LED substrate on which a control circuit thereof is mounted are attached to one side surface of the case of the light source apparatus 13, and a heat sink (not shown) which is a member for cooling the heat generated in the LED elements and the control circuit is attached to an outer surface of the LED substrate.

Also, to a frame of the liquid crystal display panel attached to the upper surface of the case, the liquid crystal display panel 11 attached to the frame, an FPC (Flexible Printed Circuits) board 403 (not shown) electrically connected to the liquid crystal display panel 11, and the like are attached. Namely, the liquid crystal display panel 11 which is a liquid crystal display element generates a display video by modulating the intensity of transmitted light based on a control signal from a control circuit (not shown here) constituting an electronic device together with the LED elements 14a and 14b which are solid-state light sources.

Example 1 of Light Source Apparatus in Example 1 of Video Display Apparatus

Subsequently, the configuration of the optical system of the light source apparatus or the like accommodated in the case will be described in detail with reference to FIG. 23(a) and FIG. 23(b) together with FIG. 22. FIG. 22 and FIG. 23 show the LEDs 14a and 14b constituting the light source, and these LEDs are attached at predetermined positions with respect to collimators 15. Note that each of the collimators 15 is formed of, for example, a translucent resin such as acrylic. Further, as shown also in FIG. 23(b), the collimator 15 has a conical convex outer peripheral surface 156 obtained by rotating a parabolic cross section, and the central portion at the top of the collimator 15 (on the side facing the LED substrate) has a concave portion 153 in which a convex portion (that is, a convex lens surface) 157 is formed.

Also, the central portion of the flat surface portion (on the side opposite to the top described above) of the collimator 15 has a convex lens surface 154 protruding outward (or may be a concave lens surface recessed inward). Note that the paraboloid 156 that forms the conical outer peripheral surface of the collimator 15 is set within a range of an angle at which light emitted from the LEDs 14a and 14b in the peripheral direction can be totally reflected inside the paraboloid, or has a reflection surface formed thereon.

Also, each of the LEDs 14a and 14b is arranged at a predetermined position on the surface of the LED substrate 102 which is a circuit board for the LEDs. The LED substrate 102 is arranged and fixed to the collimator 15 such that the LED 14a or 14b on the surface thereof is located at the central portion of the concave portion 153 of the collimator 15.

With such a configuration, of the light emitted from the LED 14a or 14b, in particular, the light emitted upward (to the right in the drawing) from the central portion thereof is condensed into parallel light by the two convex lens surfaces 157 and 154 forming the outer shape of the collimator 15. Also, the light emitted from the other portion toward the peripheral direction is reflected by the paraboloid forming the conical outer peripheral surface of the collimator 15, and is similarly condensed into parallel light. In other words, with the collimator 15 having a convex lens formed at the central portion thereof and a paraboloid formed in the peripheral portion thereof, it is possible to extract substantially all of the light generated by the LED 14a or 14b as parallel light, and to improve the utilization efficiency of the generated light.

Note that a polarization conversion element 21 is provided on the light emission side of the collimator 15. The polarization conversion element 21 may be referred to as a polarization converter. As is apparent also from FIG. 23, the polarization conversion element 21 is configured by combining a columnar translucent member having a parallelogram cross section (hereinafter, referred to as a parallelogram column) and a columnar translucent member having a triangular cross section (hereinafter, referred to as a triangular column), and arranging a plurality of the combinations of the members in an array in parallel to a plane orthogonal to the optical axis of the parallel light from the collimator 15. Further, polarizing beam splitters (hereinafter abbreviated as "PBS films") 211 and reflection films 212 are alternately provided at the interfaces between the adjacent translucent members arranged in an array. Also, a λ/2 phase plate 213 is provided on the emission surface from which light that has entered the polarization conversion element 21 and has passed through the PBS films 211 is emitted.

A rectangular synthetic diffusion block 16 shown also in FIG. 23(a) is further provided on the emission surface of the polarization conversion element 21. Namely, the light emitted from the LED 14a or 14b becomes parallel light by the action of the collimator 15 to enter the synthetic diffusion block 16, and reaches the light guide 17 after being diffused by textures 161 on the emission side.

The light guide 17 is a member made of, for example, a translucent resin such as acrylic and formed in a rod shape having a substantially triangular cross section (see FIG. 23(b)). Also, as is apparent also from FIG. 25, the light guide 17 includes a light guide light incident portion (surface) 171 configured to face the emission surface of the synthetic diffusion block 16 with a first diffusion plate 18a interposed therebetween, a light guide light reflection portion (surface) 172 configured to form an inclined surface, and a light guide light emission portion (surface) 173 configured to face the liquid crystal display panel 11, which is a liquid crystal display element, with a second diffusion plate 18b interposed therebetween.

Figure 23:
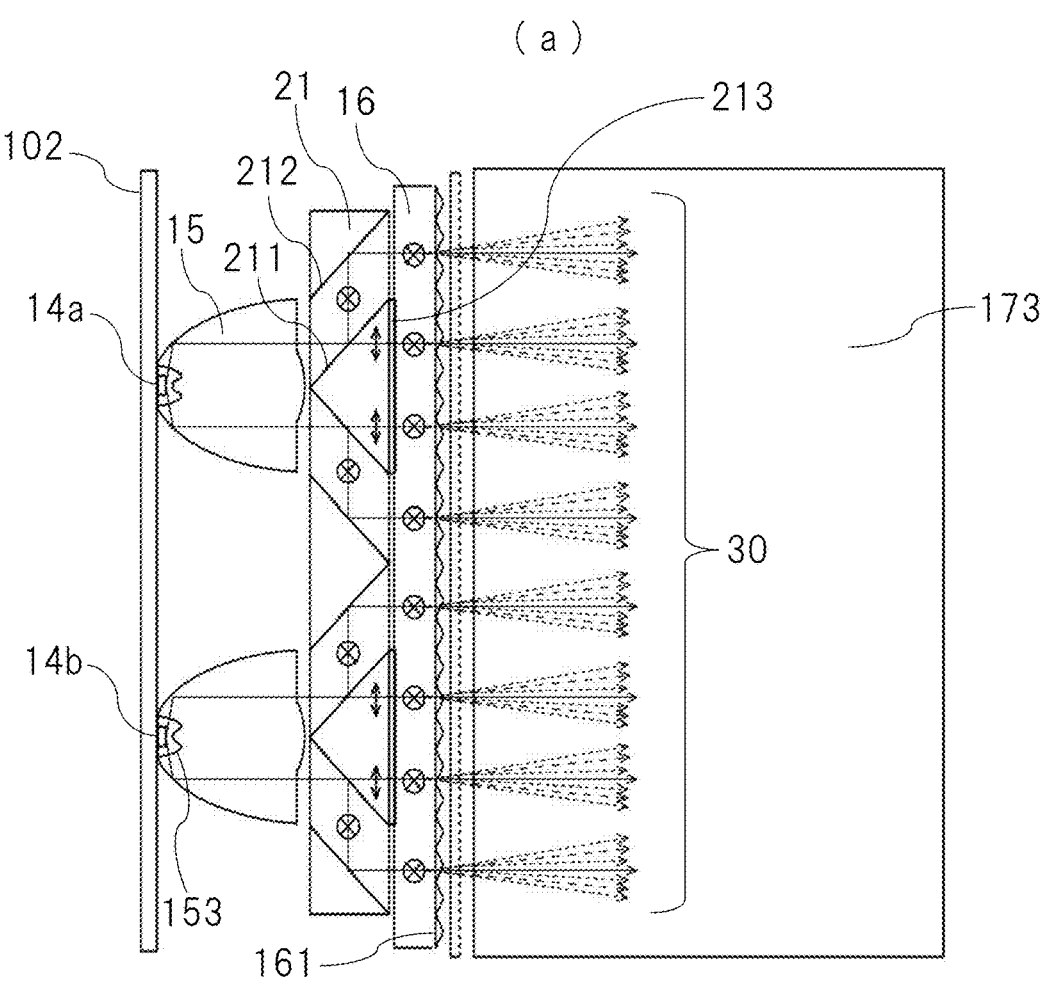
FIG. 23 is a structural diagram showing an example of a specific configuration of the light source apparatus.
Figure 23:
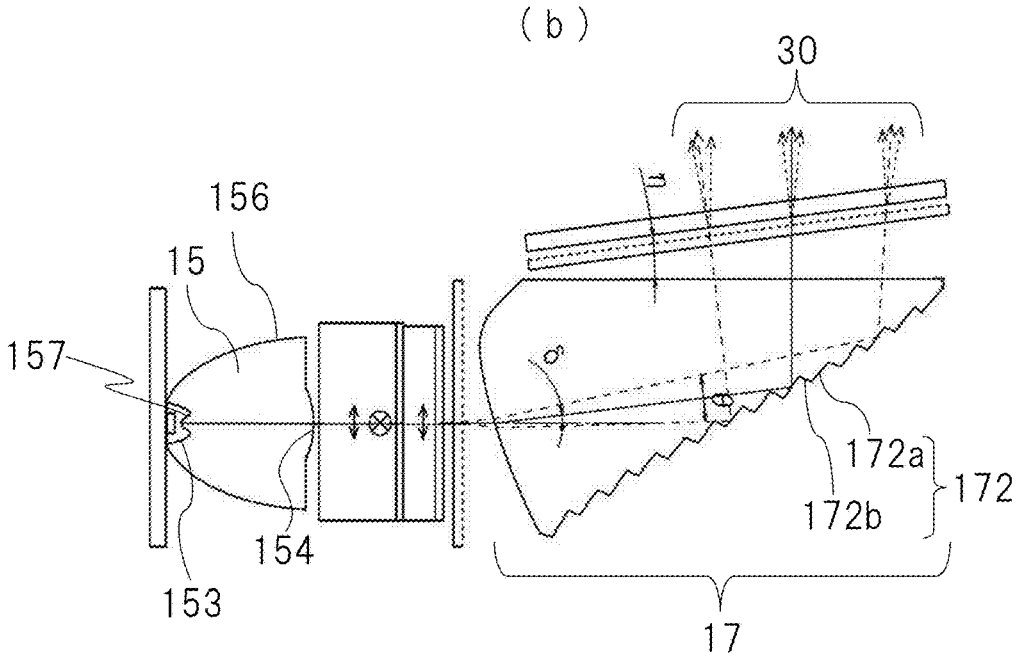

On the light guide light reflection portion (surface) 172 of the light guide 17, as shown also in FIG. 23 which is a partially enlarged view thereof, a large number of reflection surfaces 172a and connection surfaces 172b are alternately formed in a saw-tooth shape. Also, the reflection surface 172a (a line segment rising to the right in the drawing) forms αn (n: natural number, for example, 1 to 130 in this example) with respect to the horizontal plane indicated by the dashed-and-dotted line in the drawing, and αn is here set to 43 degrees or less (however, 0 degrees or more) as an example.

The light guide light incident portion (surface) 171 is formed in a curved convex shape inclined toward the light source side. According to this, after the parallel light from the emission surface of the synthetic diffusion block 16 enters while being diffused through the first diffusion plate 18a, as is apparent also from the drawing, the light reaches the light guide light reflection portion (surface) 172 while being slightly bent (deflected) upward by the light guide light incident portion (surface) 171, and is reflected here to reach the liquid crystal display panel 11 provided on the emission surface on the upper side in the drawing.

With the video display apparatus 1 described above in detail, it is possible to further improve the light utilization efficiency and its uniform illumination characteristics, and at the same time, it is possible to manufacture the video display apparatus 1 including a modularized light source apparatus for S-polarized light in a small size and at a low cost. Note that, in the above description, the polarization conversion element 21 is attached behind the collimator 15, but the present invention is not limited thereto, and the same function and effect can be obtained even when the polarization conversion element 21 is provided in the optical path leading to the liquid crystal display panel 11.

Note that a large number of reflection surfaces 172a and connection surfaces 172b are alternately formed in a saw-tooth shape on the light guide light reflection portion (surface) 172, and the illumination light flux is totally reflected on each reflection surface 172a and directed upward. Further, since a narrow-angle diffusion plate is provided on the light guide light emission portion (surface) 173, the illumination light flux enters the light direction conversion panel 54 for controlling the directional characteristics as a substantially parallel diffused light flux, and then enters the liquid crystal display panel 11 from the oblique direction. In the present embodiment, the light direction conversion panel 54 is provided between the light guide light emission portion (surface) 173 and the liquid crystal display panel 11, but the same effect can be obtained even when the light direction conversion panel 54 is provided on the emission surface of the liquid crystal display panel 11.

Example 2 of Video Display Apparatus

Figure 24:
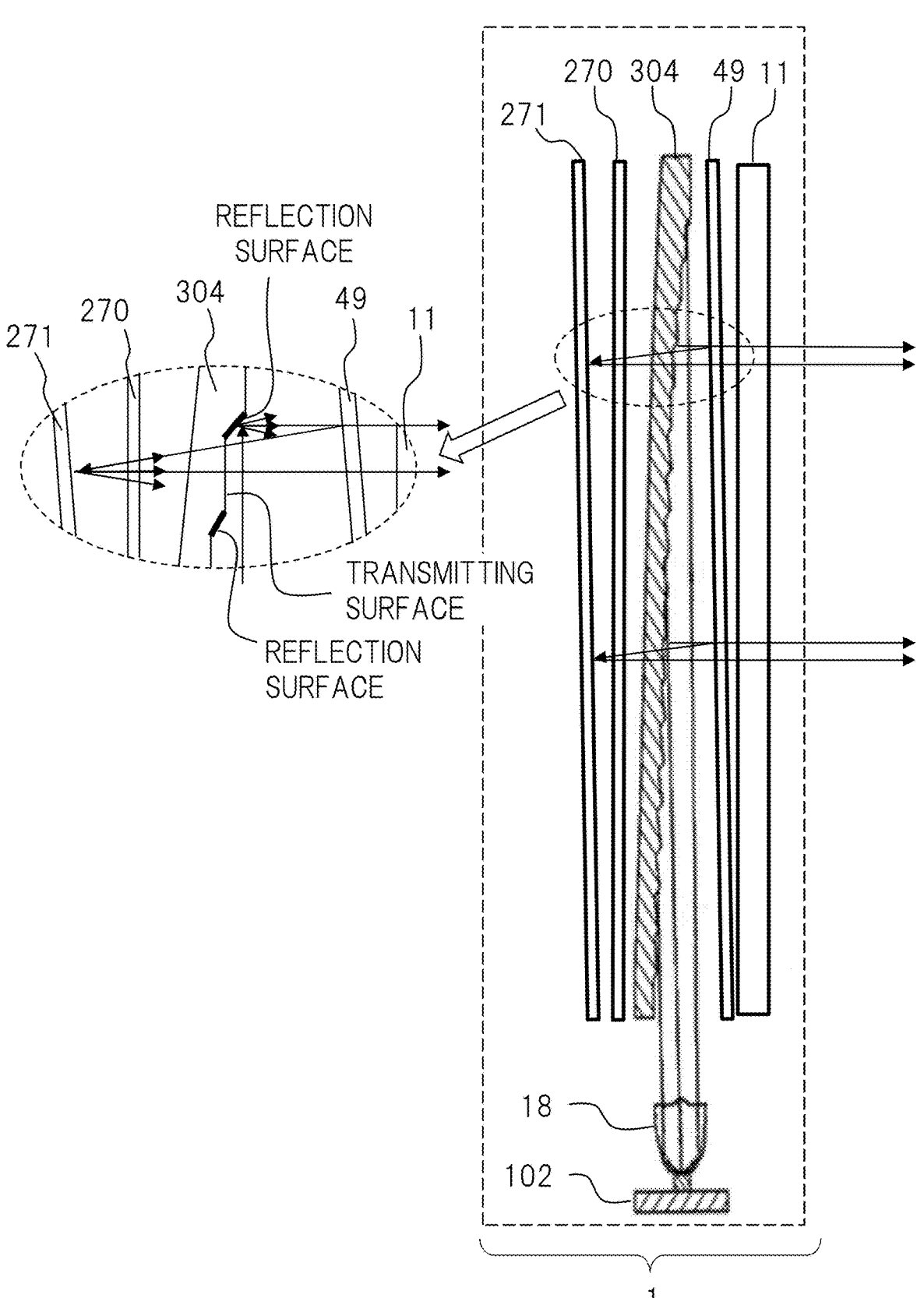
FIG. 24 is a diagram showing an example of a specific configuration of another type of a light source apparatus.

Next, another example of the specific configuration of the video display apparatus 1 (example 3 of video display apparatus) will be described with reference to FIG. 24. The light source apparatus of the video display apparatus 1 converts a divergent light flux of the light from the LED (in which P-polarized light and S-polarized light are mixed) into a substantially parallel light flux by a collimator 18, and the converted light flux is reflected by the reflection surface of the reflective light guide 304 toward the liquid crystal display panel 11. Such reflected light enters the reflective polarizing plate 49 arranged between the liquid crystal display panel 11 and the reflective light guide 304.

The reflective polarizing plate 49 transmits the light of a specific polarized wave (for example, P-polarized light) and allows the transmitted polarized light to enter the liquid crystal display panel 11. The light of the other polarized wave (for example, S-polarized light) is reflected by the reflective polarizing plate and directed toward the reflective light guide 304 again. The reflective polarizing plate 49 is installed to be inclined so as not to be perpendicular to the main light ray of the light from the reflection surface of the reflective light guide 304, and the main light ray of the light reflected by the reflective polarizing plate 49 enters the transmission surface of the reflective light guide 304.

The light that has entered the transmission surface of the reflective light guide 304 passes through the back surface of the reflective light guide 304, passes through a λ/4 plate 270 as a retardation plate, and is reflected by a reflection plate 271. The light reflected by the reflection plate 271 passes through the λ/4 plate 270 again and passes through the transmission surface of the reflective light guide 304. The light that has passed through the transmission surface of the reflective light guide 304 enters the reflective polarizing plate 49 again.

At this time, since the light that enters the reflective polarizing plate 49 again has passed through the λ/4 plate 270 twice, the polarization thereof is converted into a polarized wave (for example, P-polarized light) that can pass through the reflective polarizing plate 49. Therefore, the light whose polarization has been converted passes through the reflective polarizing plate 49 and enters the liquid crystal display panel 11. Regarding the polarization design related to polarization conversion, the polarization may be reversed from that in the above description (the S-polarized light and the P-polarized light may be reversed).

As a result, the light from the LED is aligned into a specific polarized wave (for example, a P-polarized light), enters the liquid crystal panel 11, and is subjected to the brightness modulation in accordance with the video signal, thereby displaying the video on the panel surface. As in the above-described example, a plurality of LEDs constituting the light source are provided (however, only one LED is shown in FIG. 24 due to the vertical cross section), and these LEDs are attached at predetermined positions with respect to the collimators 18.

Note that each of the collimators 18 is formed of, for example, a translucent resin such as acrylic or glass. Further, the collimator 18 may have a conical convex outer peripheral surface obtained by rotating a parabolic cross section. The top of the collimator 18 may have a concave portion in which a convex portion (that is, a convex lens surface) is formed at its central portion. Also, the central portion of the flat surface portion thereof has a convex lens surface protruding outward (or may be a concave lens surface recessed inward). Note that the paraboloid that forms the conical outer peripheral surface of the collimator 18 is set within a range of an angle at which light emitted from the LED in the peripheral direction can be totally reflected inside the paraboloid, or has a reflection surface formed thereon.

Note that each of the LEDs is arranged at a predetermined position on the surface of the LED substrate 102 which is a circuit board for the LEDs. The LED substrate 102 is arranged and fixed to the collimator 18 such that each of the LEDs on the surface thereof is located at the central portion at the top of the conical convex portion (concave portion when there is the concave portion at the top).

With such a configuration, of the light emitted from the LED, in particular, the light emitted from the central portion thereof is condensed into parallel light by the convex lens surface forming the outer shape of the collimator 18. Also, the light emitted from the other portion toward the peripheral direction is reflected by the paraboloid forming the conical outer peripheral surface of the collimator 18, and is similarly condensed into parallel light. In other words, with the collimator 18 having a convex lens formed at the central portion thereof and a paraboloid formed in the peripheral portion thereof, it is possible to extract substantially all of the light generated by the LED as parallel light, and to improve the utilization efficiency of the generated light.

The above configuration is the same as that of the light source apparatus of the video display apparatus shown in FIG. 11, FIG. 12, FIG. 13, and the like. Furthermore, the light converted into substantially parallel light by the collimator 18 shown in FIG. 24 is reflected by the reflective light guide 304. The light of a specific polarized wave of such light passes through the reflective polarizing plate 49 by the action of the reflective polarizing plate 49, and the light of the other polarized wave reflected by the action of the reflective polarizing plate 49 passes through the light guide 304 again. The light is reflected by the reflection plate 271 located at a position opposite to the liquid crystal display panel 11 with respect to the reflective light guide 304. At this time, the polarization of the light is converted by passing through the λ/4 plate 270, which is a retardation plate, twice.

The light reflected by the reflection plate 271 passes through the light guide 304 again and enters the reflective polarizing plate 49 provided on the opposite surface. Since the incident light has been subjected to polarization conversion, it passes through the reflective polarizing plate 49 and enters the liquid crystal display panel 11 with the aligned polarization direction. As a result, all of the light from the light source can be used, and the utilization efficiency of light in geometrical optics is doubled. Further, the degree of polarization (extinction ratio) of the reflective polarizing plate is also multiplied with the extinction ratio of the entire system, so that the contrast ratio of the overall display apparatus is significantly improved by using the light source apparatus of the present embodiment.

Also, by adjusting the surface roughness of the reflection surface of the reflective light guide 304 and the surface roughness of the reflection plate 271, the reflection diffusion angle of light on each reflection surface can be adjusted. It is preferable that the surface roughness of the reflection surface of the reflective light guide 304 and the surface roughness of the reflection plate 271 are adjusted for each design such that the uniformity of the light entering the liquid crystal display panel 11 becomes more favorable.

Note that the λ/4 plate 270 which is the retardation plate in the example described with reference to FIG. 24 does not necessarily have the phase difference of λ/4 with respect to the polarized light that has perpendicularly entered the λ/4 plate 270. In the configuration of FIG. 27, any retardation plate may be used as the λ/4 plate 270 as long as it can change the phase by 90° (λ/2) when the polarized light passes through it twice. Further, the thickness of the retardation plate may be adjusted in accordance with the incident angle distribution of polarized light.

Example 3 of Video Display Apparatus

Figure 25:
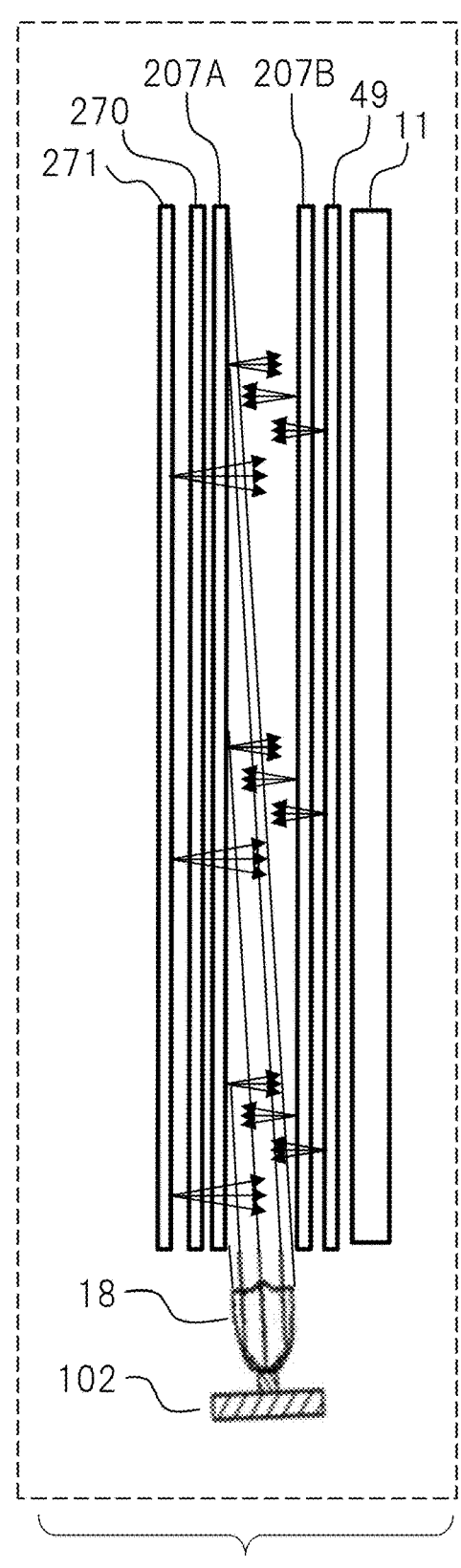
FIG. 25 is a diagram showing another example of a specific configuration of another type of a light source apparatus.

Further, another example (example 4 of video display apparatus) of the configuration of the optical system of the light source apparatus or the like of the display apparatus will be described with reference to FIG. 25. FIG. 25 shows a configuration example in which a diffusion sheet is used instead of the reflective light guide 304 in the light source apparatus in the example 2 of the video display apparatus.

Specifically, two optical sheets (optical sheet 207A and optical sheet 207B) for converting the diffusion characteristics in the vertical direction and the horizontal direction of the drawing are provided on the light emission side of the collimator 18, and the light from the collimator 18 is made to enter between the two optical sheets (diffusion sheets). The one optical sheet may be provided instead of two sheets. When composed of one sheet, the vertical and horizontal diffusion characteristics are adjusted by the fine shapes of the front surface and the back surface of the one optical sheet.

Alternatively, a plurality of diffusion sheets may be used to share the diffusion function. Here, in the example of FIG. 25, it is preferable that the reflection diffusion characteristics by the front surface shapes and the back surface shapes of the optical sheet 207A and the optical sheet 207B are optimally designed with using the number of LEDs, the divergence angle from the LED substrate (optical element) 102, and optical specifications of the collimator 18 as design parameters such that the surface density of the light flux emitted from the liquid crystal display panel 11 is uniform. In other words, the diffusion characteristics are adjusted by the surface shapes of the plurality of diffusion sheets instead of the light guide.

In the example shown in FIG. 25, the polarization conversion is performed in the same manner as in the example 3 of display apparatus described above. Namely, in the example of FIG. 25, the reflective polarizing plate 49 may be configured to have characteristics that reflect the S-polarized light (and transmits the P-polarized light). In that case, of the light emitted from the LED as a light source, the P-polarized light is transmitted and the transmitted light enters the liquid crystal display panel 11. Of the light emitted from the LED as a light source, the S-polarized light is reflected and the reflected light passes through the retardation plate 270 shown in FIG. 25.

Then, the light that has passed through the retardation plate 270 is reflected by the reflection plate 271. The light reflected by the reflection plate 271 is converted into the P-polarized light by passing through the retardation plate 270 again. The light that has been subjected to the polarization conversion passes through the reflective polarizing plate 49 and enters the liquid crystal display panel 11. Note that the λ/4 plate 270 which is the retardation plate in FIG. 25 does not necessarily have the phase difference of λ/4 with respect to the polarized light that has perpendicularly entered the λ/4 plate 270. In the configuration of FIG. 25, any retardation plate may be used as the λ/4 plate 270 as long as it can change the phase by 90° (λ/2) when the polarized light passes through it twice. The thickness of the retardation plate may be adjusted in accordance with the incident angle distribution of polarized light. Also in FIG. 25, regarding the polarization design related to polarization conversion, the polarization may be reversed from that in the above description (the S-polarized light and the P-polarized light may be reversed).

In an apparatus for use in a general TV set, for example, the light emitted from the liquid crystal display panel 11 has similar diffusion characteristics in both the horizontal direction of the screen (display direction corresponding to the X axis of the graph in FIG. 32(A)) and the vertical direction of the screen (display direction corresponding to the Y axis of the graph in FIG. 32(B)) as indicated by the plot curves of "conventional characteristics (X direction)" in FIG. 32(A) and "conventional characteristics (Y direction)" in FIG. 32(B).

Meanwhile, for example, the light flux emitted from the liquid crystal display panel of the present embodiment has diffusion characteristics indicated by the plot curves of "Example 1 (X direction)" in FIG. 32(A) and "Example 1 (Y direction)" in FIG. 32(B).

In one specific example, when the viewing angle at which the brightness becomes 50% (is reduced to about half) of that in front view (angle of 0 degrees) is set to 13 degrees, this is about ⅕ of the diffusion characteristics of the apparatus for use in a general home TV set (62 degrees). Similarly, in the case where the viewing angle in the vertical direction is made uneven between the upper side and the lower side, the reflection angle of the reflective light guide, the area of the reflection surface, and the like are optimized such that the viewing angle on the upper side is suppressed to about ⅓ of the viewing angle on the lower side.

With the setting of the viewing angle and the like described above, the amount of video light toward the viewing direction of the user is significantly increased (improved in terms of brightness of video) as compared with the conventional liquid crystal TV, and the brightness of video becomes 50 times or more.

Figure 32:
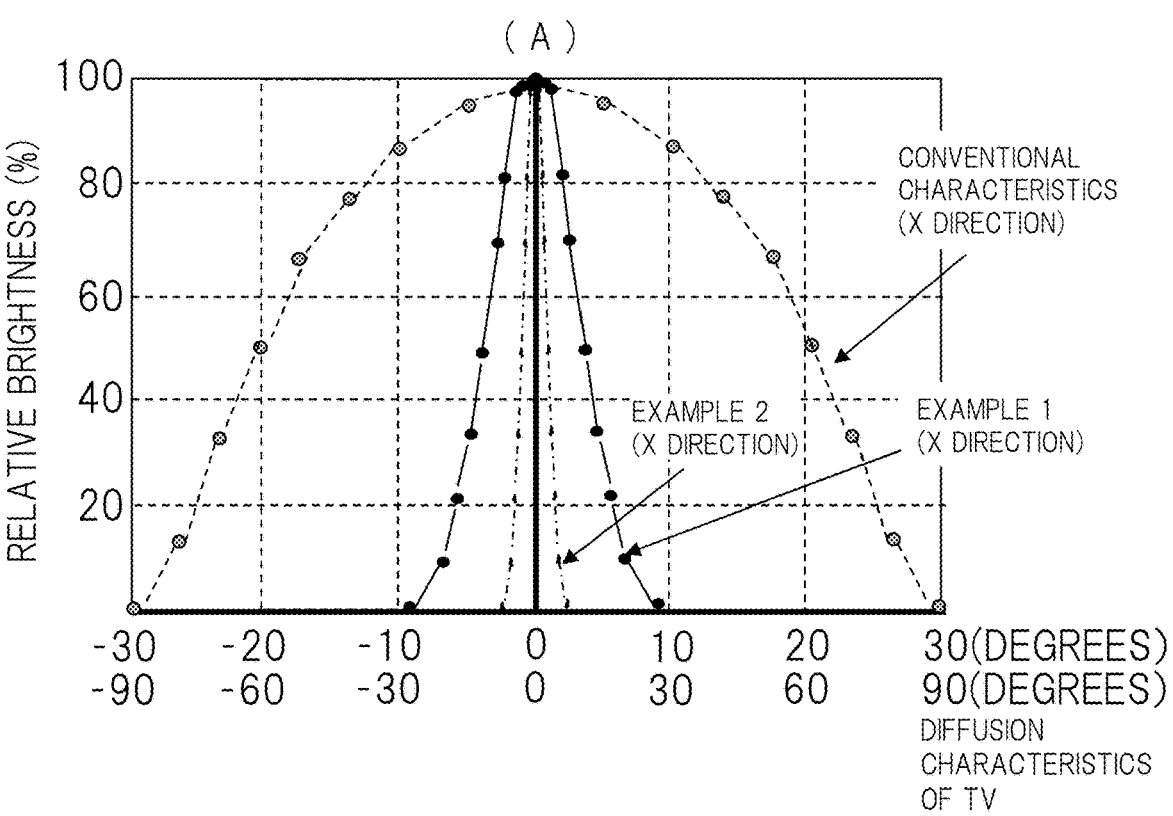
FIG. 32 is a diagram for describing diffusion characteristics of a video display apparatus.
Figure 32:
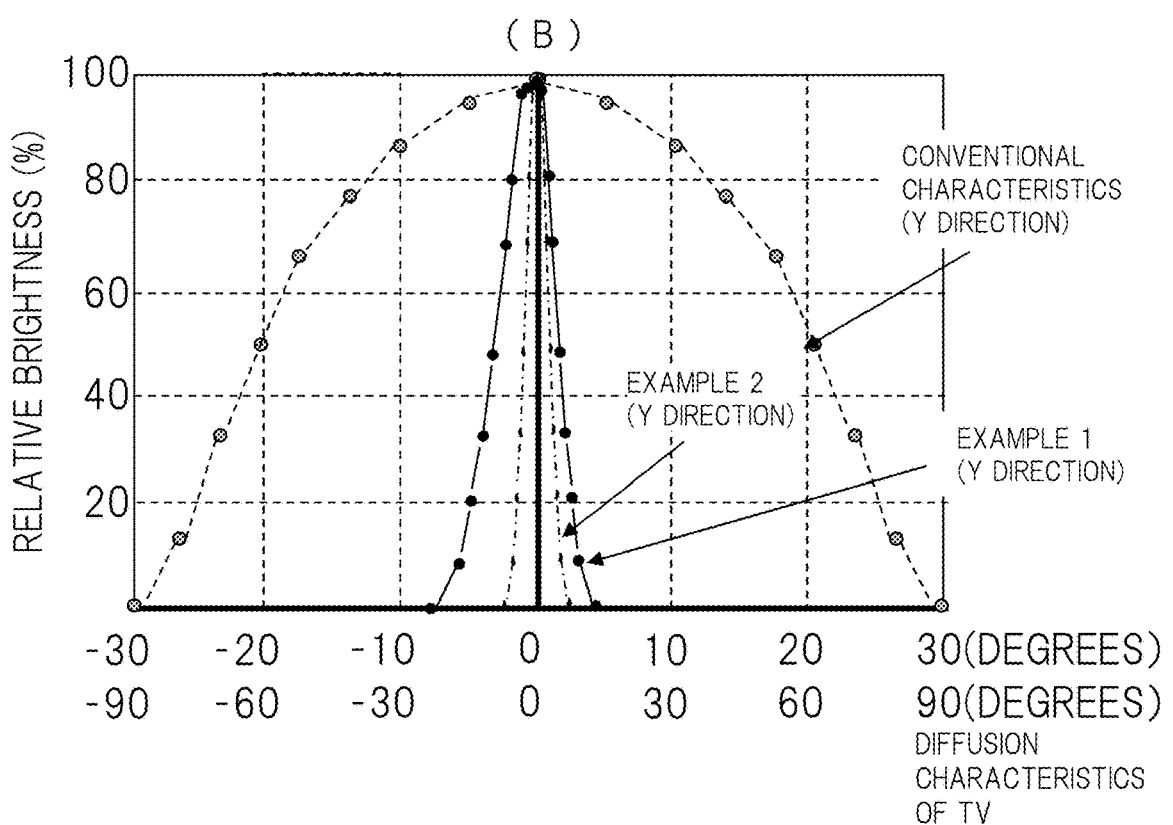

Further, in the case of the viewing angle characteristics shown in "Example 2" in FIG. 32, when the viewing angle at which the brightness becomes 50% (is reduced to about half) of that of the video obtained in front view (angle of 0 degrees) is set to 5 degrees, this is about 1/12 (narrow viewing angle) of the diffusion characteristics of the apparatus for use in a general home TV set (62 degrees). Similarly, in the case where the viewing angle in the vertical direction is made even between the upper side and the lower side, the reflection angle of the reflective light guide, the area of the reflection surface, and the like are optimized such that the viewing angle in the vertical direction is suppressed (narrowed) to about: 1/12 of the conventional viewing angle.

With the setting described above, the brightness of video (amount of light) toward the viewing direction (line of sight direction of the user) is significantly increased as compared with the conventional liquid crystal TV, and the brightness of video becomes 100 times or more.

As described above, by setting the viewing angle to a narrow angle, the amount of light flux toward the viewing direction can be concentrated, so that the utilization efficiency of light is significantly improved. As a result, even if a liquid crystal display panel for use in general TV is used, it is possible to realize a significant improvement in brightness with the same power consumption by adjusting the light diffusion characteristics of the light source apparatus, and to provide the video display apparatus suitable for the information display system for bright outdoor use.

Figure 15:
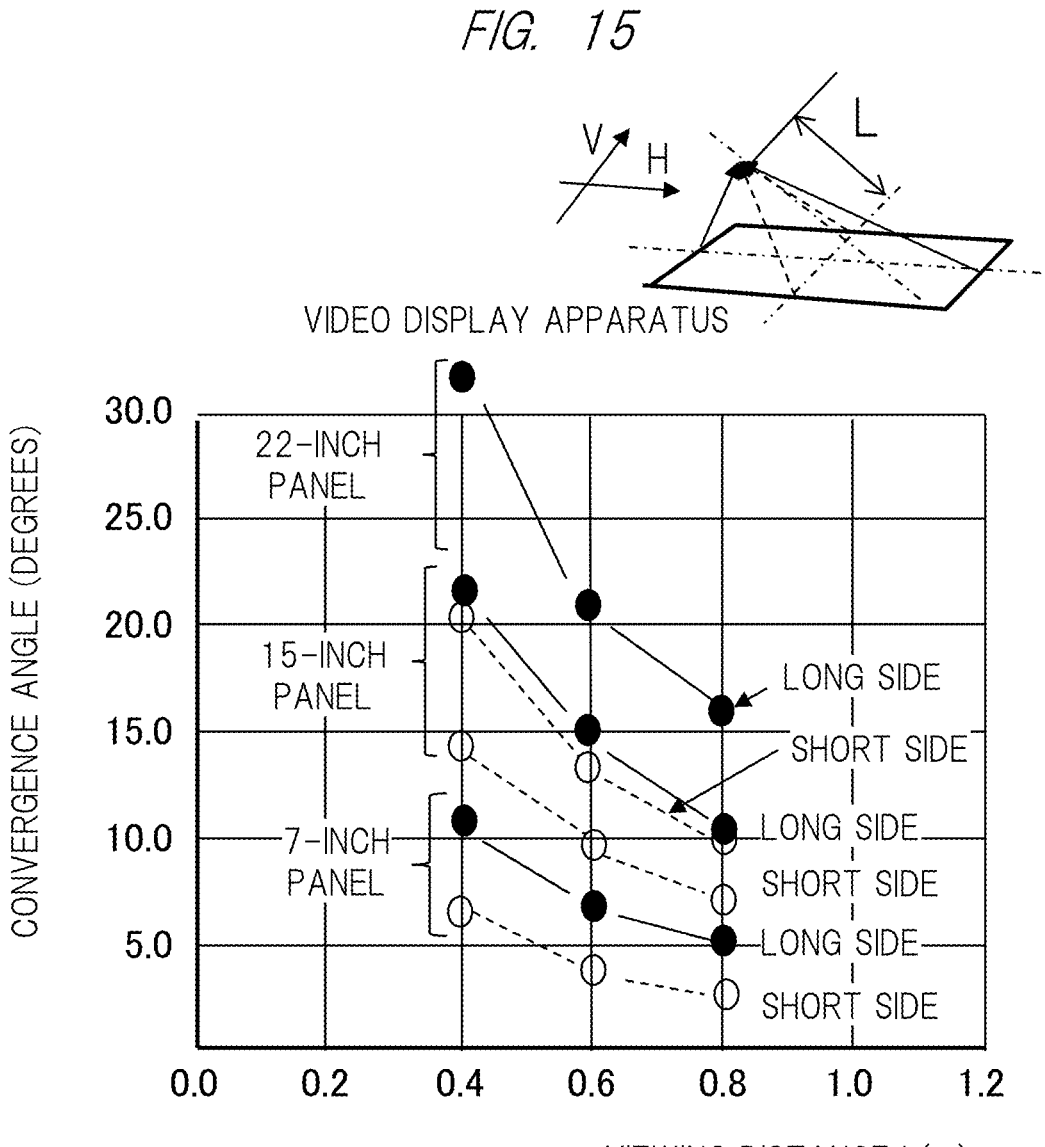
FIG. 15 is an explanatory diagram for describing light source diffusion characteristics of a video display apparatus.

When using a large liquid crystal display panel, the overall brightness of the screen is improved by directing the light in the periphery of the screen inward, that is, toward the viewer who is squarely facing the center of the screen. FIG. 15 shows the convergence angle of the long side and the short side of the liquid crystal panel when the distance L from the liquid crystal display panel to the viewer and the panel size (screen ratio 16:10) of the video display apparatus are used as parameters.

In the drawing shown in the upper part of FIG. 15, the case of viewing the video while using the screen of the liquid crystal display panel as a vertically long screen (hereinafter, referred to also as "vertical use") is assumed. In this case, the convergence angle is preferably set in accordance with the short side of the liquid crystal display panel (see the direction of the arrow V in FIG. 15 as appropriate). As a more specific example, in the case where a 22-inch panel is used vertically and the viewing distance is 0.8 m, the video light from each corner (four corners) of the screen can be effectively projected or output toward the viewer by setting the convergence angle to 10 degrees as indicated by the plot graph in FIG. 15.

Similarly, in the case where a 15-inch panel is used vertically and the viewing distance is 0.8 m, the video light from the four corners of the screen can be effectively directed toward the viewer by setting the convergence angle to 7 degrees. As described above, the overall brightness of the screen can be improved by adjusting the video light in the periphery of the screen so as to be directed to the viewer located at the optimum position to view the center of the screen depending on the size of the liquid crystal display panel and whether the liquid crystal display panel is used vertically or horizontally.

Figure 16:
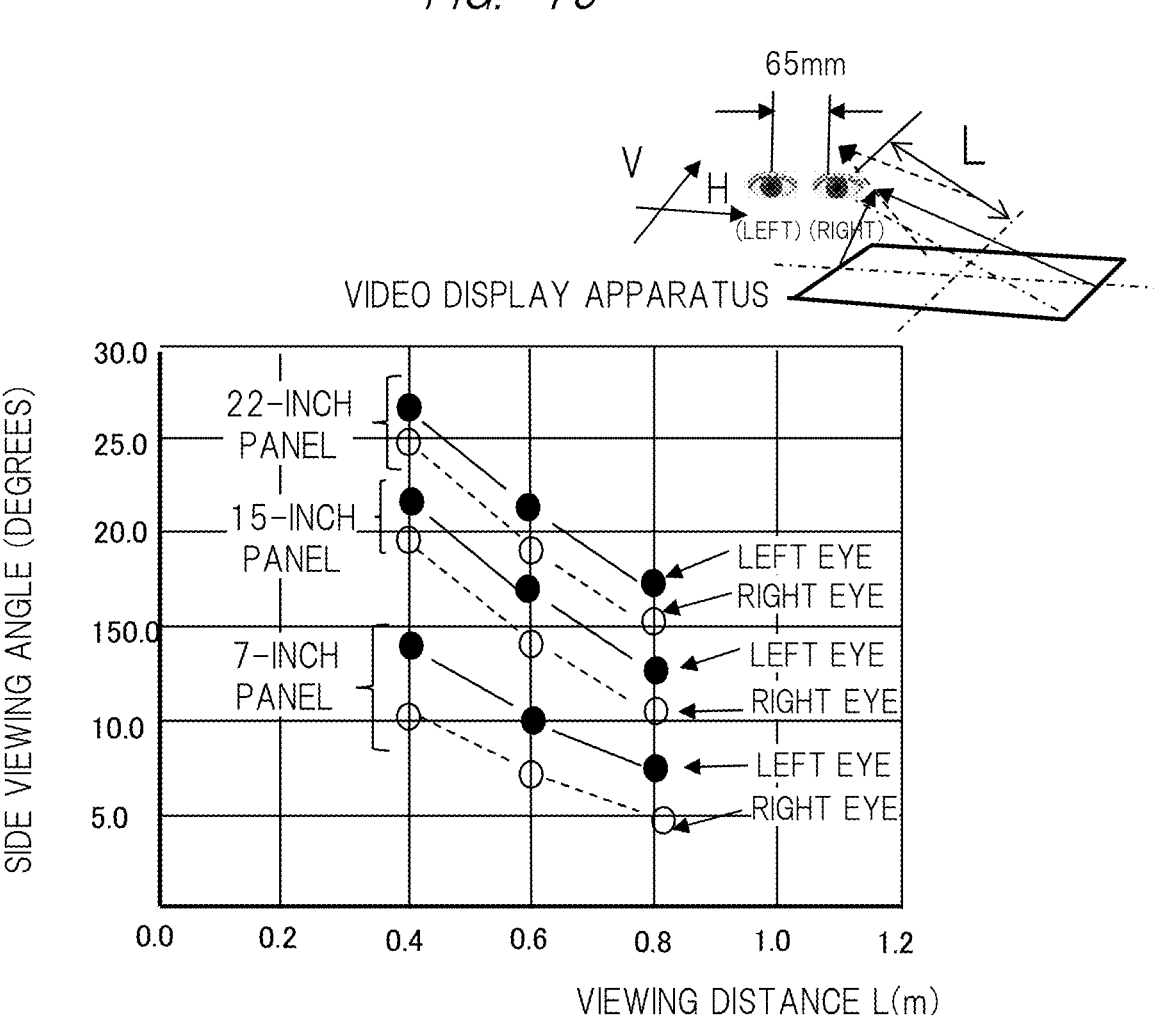
FIG. 16 is an explanatory diagram for describing light source diffusion characteristics of the video display apparatus.

As a basic configuration, as shown in FIG. 16 and others described above, a light flux having narrow-angle directional characteristics is made to enter the liquid crystal display panel 11 by the light source apparatus, and the brightness is modulated in accordance with a video signal, whereby the air floating video obtained by reflecting the video information displayed on the screen of the liquid crystal display panel 11 by the retroreflector is displayed outdoors or indoors through the transparent member 100.

A plurality of other examples of the light source apparatus will be described below. These examples of the light source apparatus may be adopted in place of the light source apparatuses in the above-described video display apparatuses.

As described above, when using a large liquid crystal display panel, the overall brightness of the screen is improved by directing the light in the periphery of the screen inward, that is, toward the viewer who is squarely facing the center of the screen. Meanwhile, the binocular parallax occurs depending on with which of the left eye or the right eye the viewer visually recognizes the video. FIG. 16 shows the convergence angle of the long side and the short side of the liquid crystal display panel obtained based on the positions of the left and right eyes when the distance (viewing distance) L from the liquid crystal display panel to the viewer and the panel size (screen ratio 16:10) of the video display apparatus are used as parameters.

The convergence angle in binocular vision with left and right eyes becomes larger as the panel size becomes smaller. In particular, when using a small panel of 7 inches or smaller, the convergence angle due to binocular parallax is an important requirement. Therefore, in the case of the small panel of 7 inches or smaller, the system is designed such that the video light is directed to the optimum viewing range of the system by increasing the light diffusion characteristics of the light source shown in FIG. 32, providing the light directional characteristics, or the like.

Furthermore, in order to obtain the horizontal and vertical directional characteristics and diffusion characteristics depending on the required specifications of the system, the shape, surface roughness, inclination, and the like of the reflection surface of the light guide of the light source apparatus 13 described above need to be designed optimally.

Example 1 of Light Source Apparatus

Figure 26:
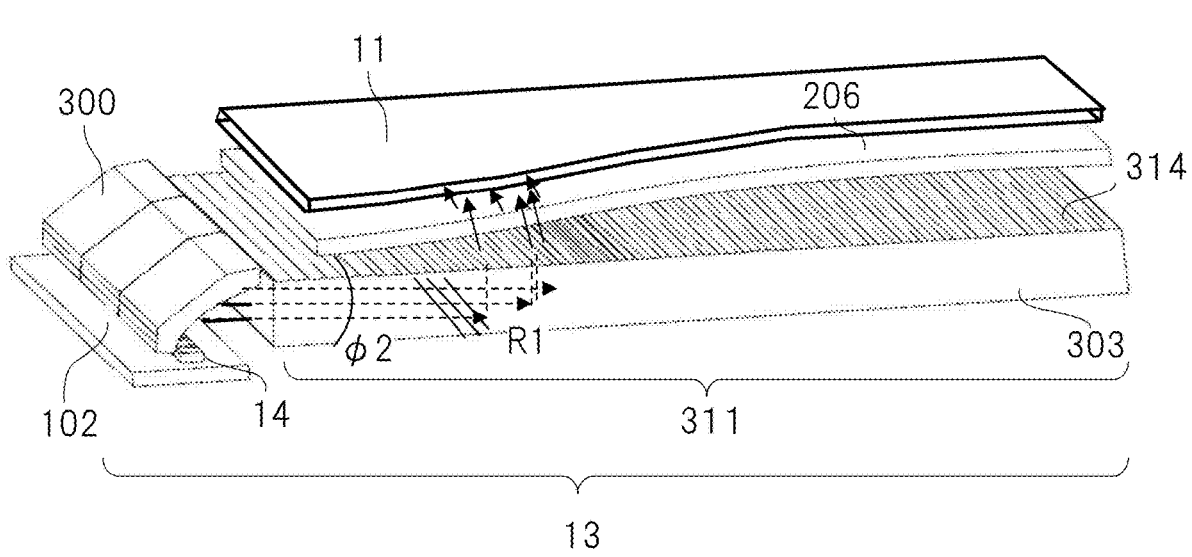
FIG. 26 is a diagram showing another example of a specific configuration of another type of a light source apparatus.
Figure 26:
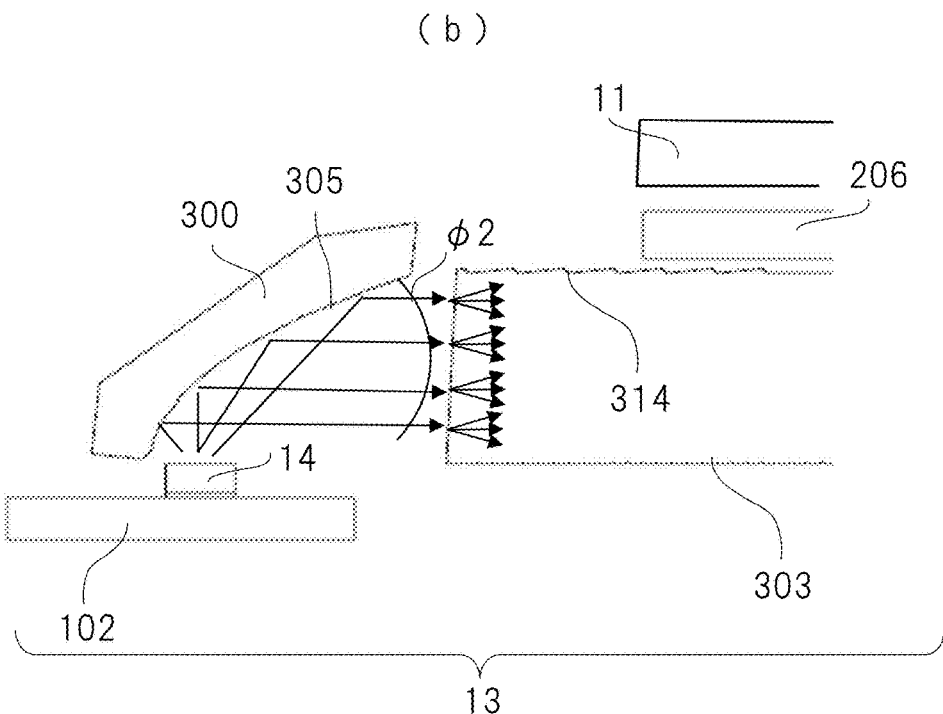

Next, another example of the light source apparatus will be described with reference to FIG. 26(*a*) and FIG. 26(*b*). In FIG. 26(*a*), illustration of the liquid crystal display panel 11 and the diffusion plate 206 are partially omitted for the description of the light guide 311.

FIG. 26 shows the state in which the LEDs 14 constituting the light source are mounted on the substrate 102. The LEDs 104 and the substrate 102 are attached at predetermined positions with respect to a reflector 300.

As shown in FIG. 26(*a*), the LEDs 14 are arranged in a line in a direction parallel to a side (the short side in this example) of the liquid crystal display panel 11 on which the reflector 300 is arranged. In the illustrated example, the reflector 300 is arranged so as to correspond to the arrangement of the LEDs. Note that a plurality of reflectors 300 may be arranged.

In one specific example, the reflector 300 is made of a plastic material. As another example, the reflector 300 may be made of a metal material or a glass material, but since a plastic material is easier to mold, a plastic material is used in the present embodiment.

As shown in FIG. 26(*b*), an inner surface (on the right side in the drawing) of the reflector 300 has a reflection surface (hereinafter, referred to as "paraboloid" in some cases) 305 in the shape obtained by cutting a paraboloid meridionally. The reflector 300 converts the divergent light emitted from the LED 14 into substantially parallel light by reflecting it on the reflection surface 305 (paraboloid), and the converted light is made to enter the end face of the light guide 311. In one specific example, the light guide 311 is a transmissive light guide.

The reflection surface of the reflector 300 has an asymmetrical shape with respect to the optical axis of the light emitted from the LED 14. Further, the reflection surface 305 of the reflector 300 is a paraboloid as described above, and the reflected light flux is converted into substantially parallel light by arranging the LED at the focal point of the paraboloid.

Since the LED 14 is a surface light source, the divergent light from the LED cannot be converted into completely parallel light even if it is placed at the focal point of the paraboloid, but this does not affect the performance of the light source of the present invention. The LED 14 and the reflector 300 are a pair, and in order to ensure the specific performance under the condition of the mounting accuracy of the LED 14 to the substrate 102 of ±40 μm, the number of LEDs to be mounted on the substrate should be no more than 10 at most, and be about 5 in consideration of mass production.

Although the LED 14 and the reflector 300 are partially located close to each other, the temperature rise of the LED can be reduced because heat can be dissipated to the space on the opening side of the reflector 300. Therefore, the reflector 300 made of plastic molding can be used. As a result, the shape accuracy of the reflection surface can be improved by 10 or more times compared with a reflector made of a glass material, and thus the light utilization efficiency can be improved.

On the other hand, a reflection surface is provided on a bottom surface 303 of the light guide 311, and the light from the LED 14 converted into a parallel light flux by the reflector 300 is reflected by the reflection surface and is then emitted toward the liquid crystal display panel 11 arranged to face the light guide 311. As shown in FIG. 26, the reflection surface provided on the bottom surface 303 may have a plurality of surfaces having different inclinations in the traveling direction of the parallel light flux from the reflector 300. Each of the plurality of surfaces having different inclinations may have a shape extending in a direction perpendicular to the traveling direction of the parallel light flux from the reflector 300.

Further, the shape of the reflection surface provided on the bottom surface 303 may be a planar shape. At this time, the light reflected by the reflection surface provided on the bottom surface 303 of the light guide 311 is refracted by a refraction surface 314 provided on the surface of the light guide 311 facing the liquid crystal display panel 11, whereby the light amount and emission direction of the light flux directed toward the liquid crystal display panel 11 are adjusted with high accuracy.

As shown in FIG. 26, the refraction surface 314 may have a plurality of surfaces having different inclinations in the traveling direction of the parallel light flux from the reflector 300. Each of the plurality of surfaces having different inclinations may have a shape extending in a direction perpendicular to the traveling direction of the parallel light flux from the reflector 300. The inclinations of the plurality of surfaces cause the light reflected by the reflection surface provided on the bottom surface 303 of the light guide 311 to be refracted toward the liquid crystal display panel 11. Further, the refraction surface 314 may be a transmission surface.

Note that, when the diffusion plate 206 is provided in front of the liquid crystal display panel 11, the light reflected by the reflection surface is refracted toward the diffusion plate 206 by the plurality of inclinations of the refraction surface 314. Namely, the extending direction of the plurality of surfaces having different inclinations on the refraction surface 314 and the extending direction of the plurality of surfaces having different inclinations on the reflection surface provided on the bottom surface 303 are parallel with each other. By making both extending directions parallel, the angle of light can be adjusted more favorably. On the other hand, the LED 14 is soldered to the metal substrate 102. Therefore, the heat generated by the LED can be dissipated to the air through the substrate.

Further, the reflector 300 may be in contact with the substrate 102, but there may be a space therebetween. When there is a space, the reflector 300 is placed so as to be adhered to the housing. By leaving the space, the heat generated by the LED can be dissipated to the air, and the cooling function can be improved. As a result, the operating temperature of the LED can be reduced, so that light emitting efficiency can be maintained and the lifetime of the LED can be extended.

Another Example 2 of Light Source Apparatus

Next, a configuration of an optical system related to a light source apparatus whose light utilization efficiency is improved by 1.8 times by using polarization conversion as compared with the light source apparatus shown in FIG. 26 will be described in detail with reference to FIG. 27A(1), FIG. 27A(2), FIG. 27B(1), FIG. 27B(2), FIG. 27C, FIG. 27D(1), and FIG. 27D(2). Note that the illustration of a sub-reflector 308 is omitted in FIG. 27A(1).

Figure 27A:
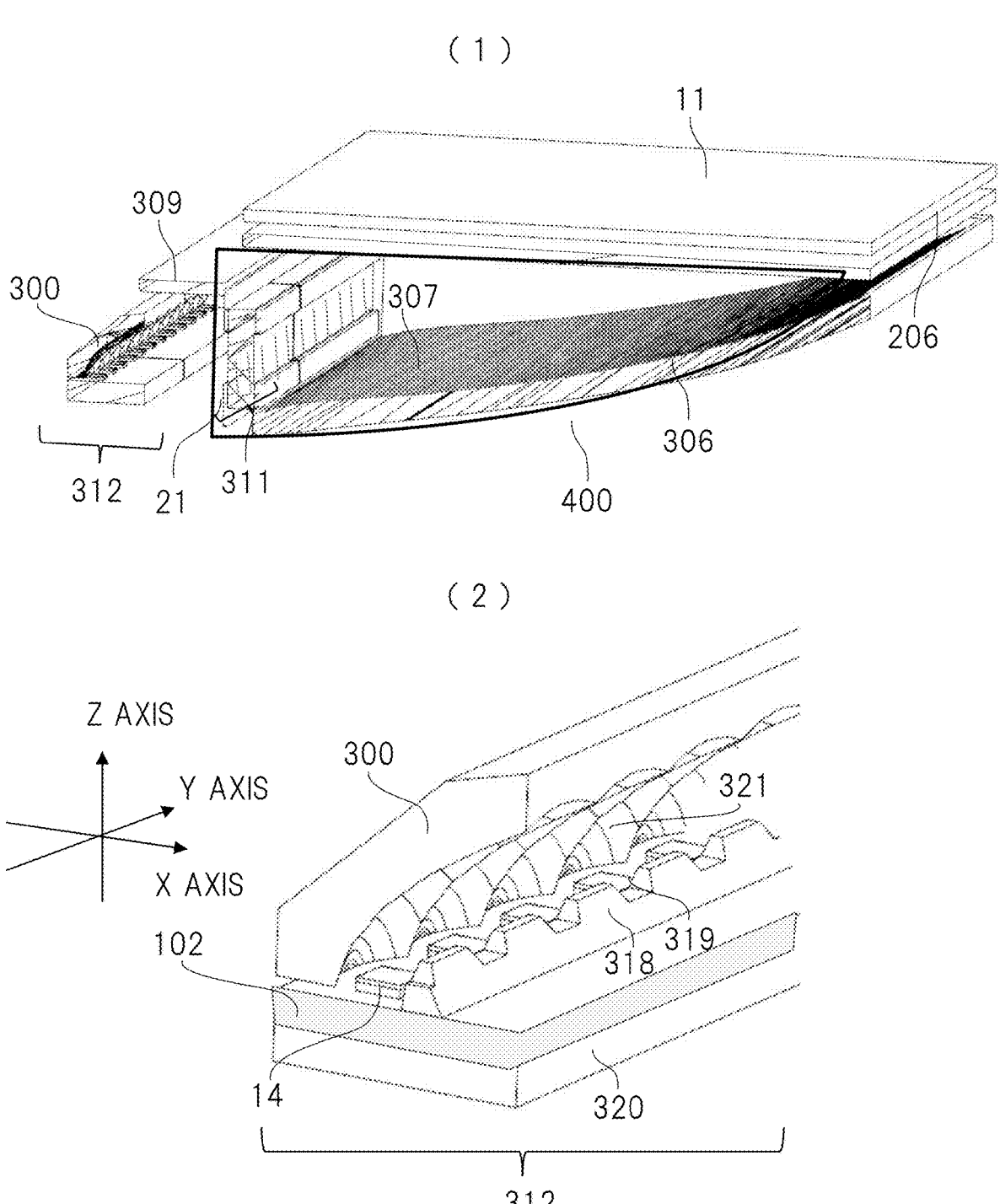
FIG. 27A is a structural diagram showing another example of a specific configuration of another type of a light source apparatus.
Figure 27B:
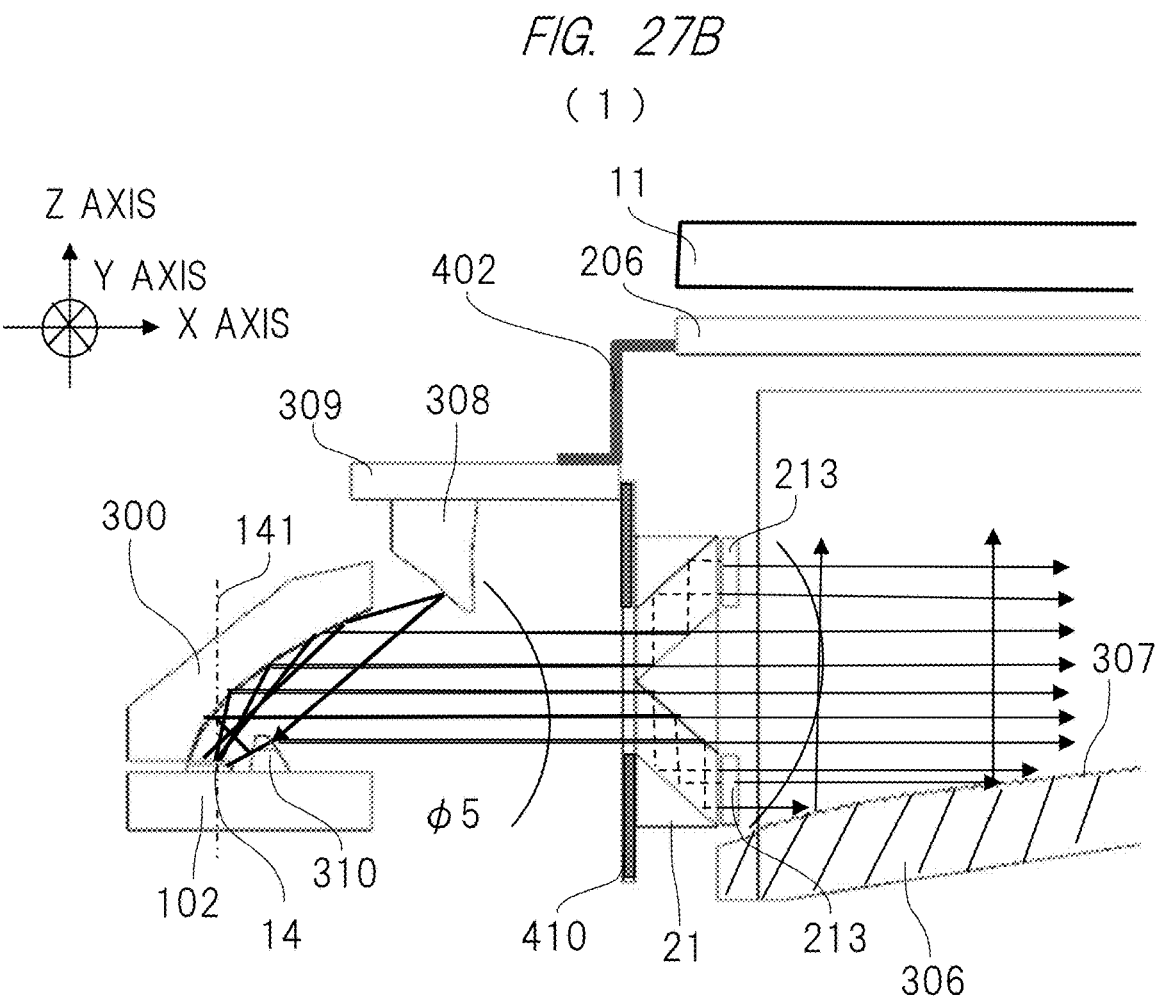
FIG. 27B is a diagram showing an excerpt of another example of a specific configuration of another type of a light source apparatus.
Figure 27B:
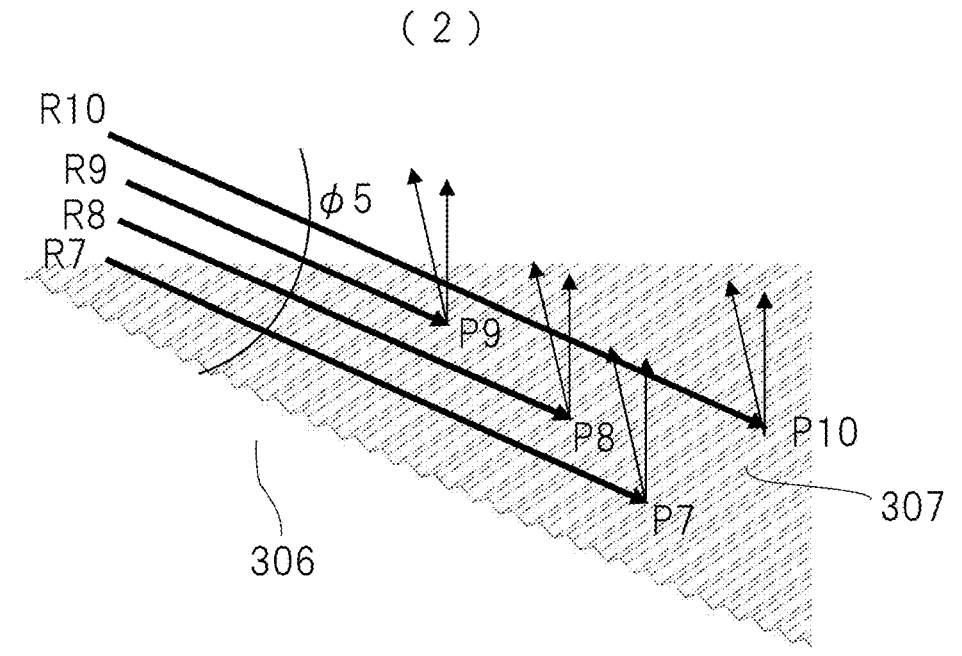
Figure 27C:
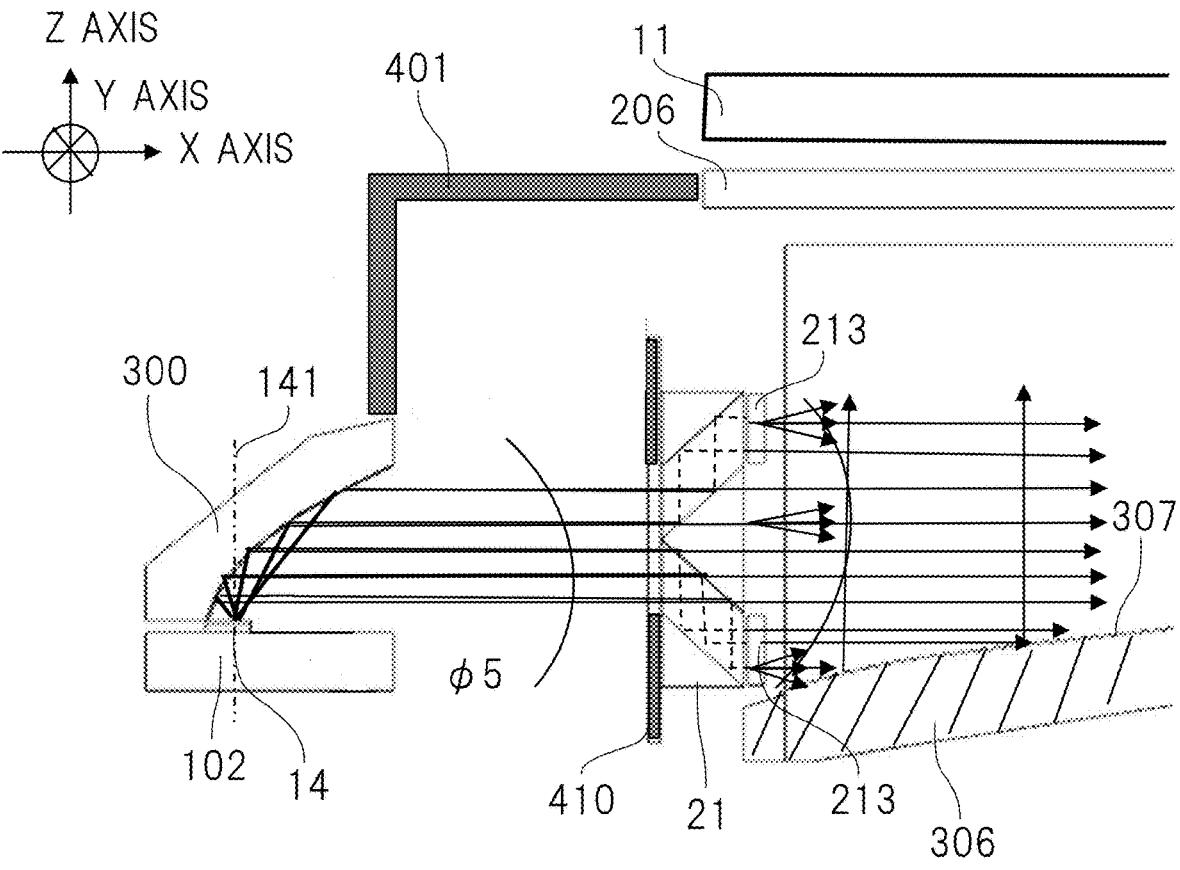
FIG. 27C is a diagram showing an excerpt of another example of a specific configuration of another type of a light source apparatus.

FIG. 27A, FIG. 27B, and FIG. 27C show a state where the LED 14 constituting the light source is attached to the substrate 102, and a pair of the reflector 300 and the LED 14 forms one block and a unit 312 is composed of a plurality of blocks.

Among these, a base material 320 shown in FIG. 27A(2) is the base material of the substrate 102. Since the metal substrate 102 has heat in general, the base material 320 is preferably made of a plastic material or the like in order to insulate the heat of the substrate 102. The material of the reflector 300 and the shape of the reflection surface may be the same as those of the example of the light source apparatus in FIG. 26.

Further, the reflection surface of the reflector 300 may have a shape asymmetrical with respect to the optical axis of the emitted light of the LED 14. The reason for this will be described with reference to FIG. 27A(2). In the present embodiment, the reflection surface of the reflector 300 is a paraboloid as in the example of FIG. 26, and the center of the light emission surface of the LED, which is a surface light source, is placed at the focal point of the paraboloid.

Further, because of the characteristics of the paraboloid, the light emitted from the four corners of the light emission surface also becomes a substantially parallel light flux, and the only difference lies in the emission direction. Therefore, even when the light emitting portion has an area, the amount of light entering the polarization conversion element 21 and the light conversion efficiency are hardly affected as long as the interval between the polarization conversion element disposed at the subsequent stage and the reflector 300 is short.

Further, even when the mounting position of the LED 14 is shifted from the focal point of the corresponding reflector 300 within the X-Y plane, an optical system capable of suppressing the decrease in light conversion efficiency can be realized for the above-mentioned reasons. Furthermore, even when the mounting position of the LED 14 varies in the Z-axis direction, the converted parallel light flux only moves within the Z-X plane, and the mounting accuracy of the LED, which is a surface light source, can be significantly reduced. In the present embodiment as well, the reflector 300 having the reflection surface obtained by cutting a part of a paraboloid meridionally has been described, but the LED may be placed in a part of the reflector obtained by cutting the entire paraboloid as the reflection surface.

On the other hand, as the characteristic configuration in the present embodiment, as shown in FIG. 27B(1) and FIG. 27C, after the divergent light from the LED 14 is reflected by the paraboloid 321 and converted into substantially parallel light, the substantially parallel light is made to enter the end face of the polarization conversion element 21 in the subsequent stage, and is aligned into a specific polarized wave by the polarization conversion element 21. Because of this characteristic configuration in the present invention, the light utilization efficiency is increased by 1.8 times with respect to the example shown in FIG. 26 described above, and a highly efficient light source can be realized.

Note that, at this time, the substantially parallel light obtained by reflecting the divergent light from the LED 14 on the paraboloid 321 is not all uniform. Therefore, the angular distribution of the reflected light is adjusted by the reflection surfaces 307 having a plurality of inclinations, whereby the reflected light can be made to enter the liquid crystal display panel 11 in a direction perpendicular to the liquid crystal display panel 11.

Here, in the arrangement of the example shown in the drawing, the direction of light (principal ray) entering the reflector from the LED and the direction of light entering the liquid crystal display panel are made to be approximately parallel with each other. This arrangement is easy in terms of design and is preferable because air escapes upward and the temperature rise of the LED can be reduced when the heat source is arranged under the light source apparatus.

In addition, as shown in FIG. 27B(1), in order to improve the capture rate of the divergent light from the LED 14, the light flux that cannot be captured by the reflector 300 is reflected by the sub-reflector 308 provided on a light shield-ing plate 309 disposed above the reflector, and is then reflected by an inclined surface of a lower sub-reflector 310 so as to enter the effective region of the polarization conversion element 21 in the subsequent stage, whereby light utilization efficiency is further improved. Namely, in the present embodiment, a part of the light reflected by the reflector 300 is reflected by the sub-reflector 308, and the light reflected by the sub-reflector 308 is reflected by the sub-reflector 310 in the direction toward the light guide 306.

The substantially parallel light flux aligned into a specific polarized wave by the polarization conversion element 21 is reflected by the reflection shape provided on the surface of the reflective light guide 306 toward the liquid crystal display panel 11 disposed to face the light guide 306. At this time, the light amount distribution of the light flux entering the liquid crystal display panel 11 is optimally designed based on the shape and arrangement of the reflector 300 described above and the shape (cross-sectional shape), incli-nation, and surface roughness of the reflection surface of the reflective light guide.

As for the shape of the reflection surface provided on the surface of the light guide 306, the plurality of reflection surfaces are arranged so as to face the emission surface of the polarization conversion element, and the inclination, area, height, and pitch of the reflection surfaces are opti-mized in accordance with the distance from the polarization conversion element 21, whereby the light amount distribu-tion of the light flux entering the liquid crystal display panel 11 is set to a desired value as described above.

By configuring the reflection surface 307 provided on the reflective light guide to have a plurality of inclinations on one plane as shown in FIG. 27B(2), the reflected light can be adjusted more accurately. In addition, as the configuration in which the reflection surface has a plurality of inclinations on one plane, the region to be used as the reflection surface may be a plurality of surfaces, a multifaceted surface, or a curved surface. Furthermore, the more uniform light amount distri-bution is realized by the diffusion function of the diffusion plate 206. As for the light that enters the diffusion plate on the side closer to the LED, a uniform light amount distri-bution is realized by changing the inclination of the reflec-tion surface.

In the present embodiment, the base material of the reflection surface 307 is made of a plastic material such as heat-resistant polycarbonate. Further, the angle of the reflec-tion surface 307 immediately after the emission from the $\lambda/2$ plate 213 changes in accordance with the distance between the $\lambda/2$ plate and the reflection surface.

In the present embodiment as well, although the LED 14 and the reflector 300 are partially located close to each other, the temperature rise of the LED can be reduced because heat can be dissipated to the space on the opening side of the reflector 300. Also, the substrate 102 and the reflector 300 may be arranged upside down from those shown in FIG. 27A, FIG. 27B, and FIG. 27C.

However, if the substrate 102 is placed on the upper side, the substrate 102 is located close to the liquid crystal display panel 11, which makes the layout difficult in some cases. Therefore, the internal configuration of the apparatus will be simplified when the substrate 102 is placed below the reflector 300 (on the side far from the liquid crystal display panel 11) as shown in the drawing.

A light shielding plate 410 may be provided on the light incident surface of the polarization conversion element 21 so as to prevent unnecessary light from entering the optical system at the subsequent stage. With such a configuration, a light source apparatus capable of suppressing temperature rise can be realized. The polarizing plate provided on the light incident surface of the liquid crystal display panel 11 reduces the temperature rise by absorption in the case of the uniformly polarized light flux of the present invention, but the polarization direction is turned at the time of the reflection by the reflective light guide, and a part of the light is absorbed by the polarizing plate on the incident side. Furthermore, the temperature of the liquid crystal display panel 11 also rises due to absorption by the liquid crystal itself and temperature rise due to light entering the electrode pattern, but natural cooling is possible because there is a sufficient space between the reflection surface of the reflective light guide 306 and the liquid crystal display panel 11.

Figure 27D:
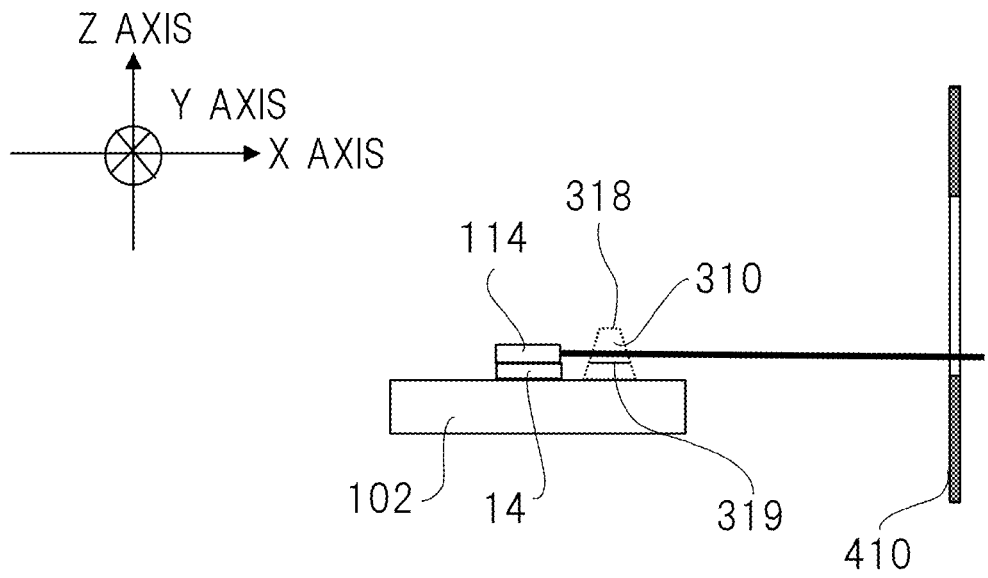
FIG. 27D is a diagram showing an excerpt of another example of a specific configuration of another type of a light source apparatus.

FIG. 27D is a modification of the light source apparatus in FIG. 27B(1) and FIG. 27C. FIG. 27D(1) shows a modification of a part of the light source apparatus in FIG. 27B(1). Since the other configurations are the same as those of the light source apparatus described above with reference to FIG. 27B(1), illustration and repetitive description will be omitted.

First, in the example shown in FIG. 27D(1), the height of a concave portion 319 of the sub-reflector 310 is adjusted to a position lower than a phosphor 114 such that the principal ray of fluorescence output laterally (X-axis direction) from the phosphor 114 (see a straight line extending in a direction parallel to the X axis in FIG. 27D(1)) comes through the concave portion 319 of the sub-reflector 310. Further, the height of the light shielding plate 410 is adjusted to be lower in the Z-axis direction with respect to the position of the phosphor 114 such that the principal ray of fluorescence output laterally from the phosphor 114 enters the effective region of the polarization conversion element 21 without being blocked by the light shielding plate 410.

Further, the reflection surface of the convex portion of the uneven shape at the top of the sub-reflector 310 reflects the light reflected by the sub-reflector 308 in order to guide the light reflected by the sub-reflector 308 to the light guide 306. Therefore, the height of the convex portion 318 of the sub-reflector 310 is adjusted such that the light reflected by the sub-reflector 308 is reflected to enter the effective region of the polarization conversion element 21 at the subsequent stage, whereby the light utilization efficiency can be further improved.

Note that, as shown in FIG. 27A(2), the sub-reflector 310 is arranged to extend in one direction and has an uneven shape. Further, at the top of the sub-reflector 310, unevennesses having one or more concave portions are regularly arranged in one direction. By forming such an uneven shape, the configuration in which the principal ray of fluorescence output laterally from the phosphor 114 enters the effective region of the polarization conversion element 21 can be realized.

Further, the uneven shape of the sub-reflector 310 is regularly arranged at a pitch with which the concave portions 319 are located at the positions of the LEDs 14. Namely, each of the phosphors 114 is regularly arranged along one direction so as to correspond to the arrangement pitch of the concave portions of the unevennesses of the sub-reflector 310. In addition, when the phosphor 114 is included in the LED 14, the phosphor 114 may be expressed as a light emitting portion of a light source.

Moreover, FIG. 27D(2) shows a modification of a part of the light source apparatus in FIG. 27C. Since the other configurations are the same as those of the light source apparatus in FIG. 27C, illustration and repetitive description will be omitted. As shown in FIG. 27D(2), the sub-reflector 310 is not necessarily provided, but the height of the light shielding plate 410 is adjusted to be lower in the Z-axis direction with respect to the position of the phosphor 114 such that the principal ray of fluorescence output laterally from the phosphor 114 enters the effective region of the polarization conversion element 21 without being blocked by the light shielding plate 410 as in FIG. 27D(1).

As to the light source apparatuses in FIG. 27A, FIG. 27B, FIG. 27C, and FIG. 27D, a side wall 400 may be provided as shown in 27A(1) in order to prevent the dust from entering the space between the reflection surface of the reflective light guide 306 and the liquid crystal display panel 11, prevent the generation of stray light to the outside of the light source apparatus, and prevent the stray light from entering the light source apparatus from outside. When the side wall 400 is provided, it is arranged so as to sandwich the space between the light guide 306 and the diffusion plate 206.

The light emission surface of the polarization conversion element 21 that emits the light subjected to the polarization conversion by the polarization conversion element 21 faces a space surrounded by the side wall 400, the light guide 306, the diffusion plate 206, and the polarization conversion element 21. Also, of the inner surface of the side wall 400, the surface that covers the space to which the light is output from the emission surface of the polarization conversion element 21 (the space on the right side from the emission surface of the polarization conversion element 21 in FIG. 27B(1)) from the side surface is provided with a reflection surface having a reflection film or the like. Namely, the surface of the side wall 400 facing the space mentioned above includes a reflection region having a reflection film. Since the above-mentioned part of the inner surface of the side wall 400 is made to be a reflection surface, the light reflected by the reflection surface can be reused as light source light, and the brightness of the light source apparatus can be improved.

Of the inner surface of the side wall 400, the surface that covers the polarization conversion element 21 from the side surface is formed as a surface with low light reflectance (such as a black surface without a reflection film). This is because when reflected light is generated on the side surface of the polarization conversion element 21, light with an unexpected polarization state is generated, which may cause the stray light. In other words, by forming the above-mentioned surface as a surface with low light reflectance, it is possible to prevent or suppress the generation of stray light in a video and light with an unexpected polarization state. Further, holes through which air can pass may be formed in a part of the side wall 400 so as to improve the cooling effect.

Note that descriptions have been given on the assumption that the light source apparatuses in FIG. 27A, FIG. 27B, FIG. 27C, and FIG. 27D use the polarization conversion element 21. However, the polarization conversion element 21 may be omitted from these light source apparatuses. In this case, the light source apparatus can be provided at a lower cost.

Another Example 3 of Light Source Apparatus

Next, the configuration of an optical system related to a light source apparatus using the reflective light guide 304 based on the light source apparatus shown in example 1 of the light source apparatus will be described in detail with reference to FIG. 28A(1), FIG. 28A(2), FIG. 28A(3), and FIG. 28B.

Figure 28A:
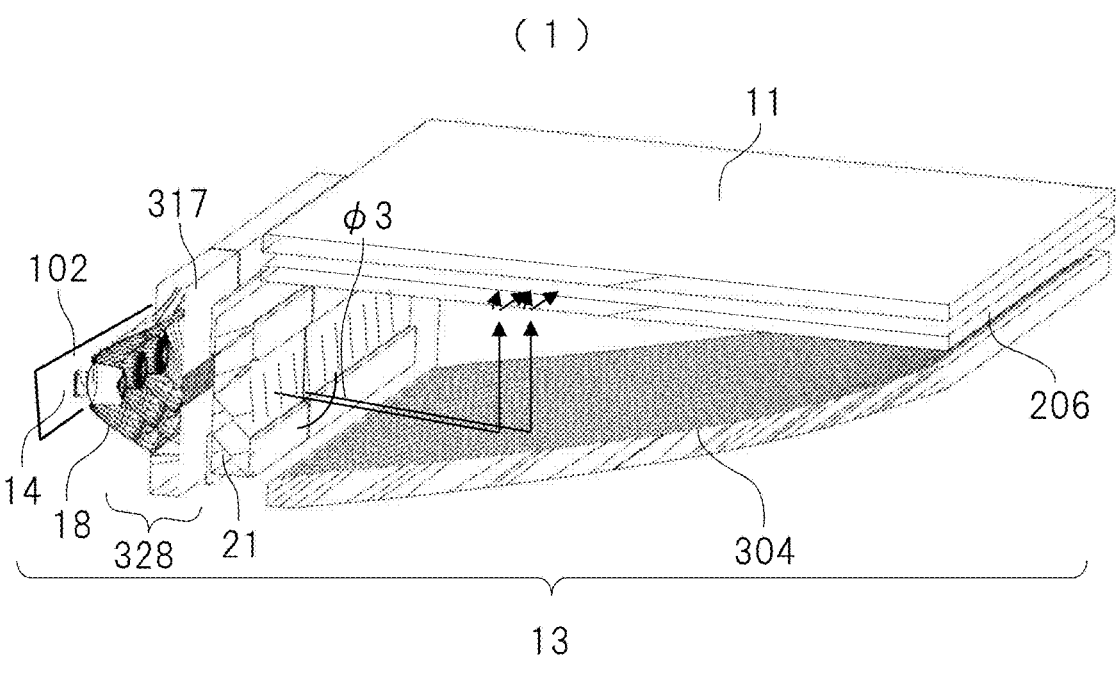
FIG. 28A is a structural diagram showing another example of a specific configuration of another type of a light source apparatus.

FIG. 28A shows a state where the LED 14 constituting the light source is attached to the substrate 102, and a pair of the collimator 18 and the LED 14 forms one block and a unit 328 is composed of a plurality of blocks. Since the collimator 18 of the present embodiment is close to the LED 14, a glass material is used in consideration of heat resistance. The shape of the collimator 18 is similar to the shape described for the collimator 15 in FIG. 17. Furthermore, by providing a light shielding plate 317 at a previous stage of the entrance to the polarization conversion element 21, entrance of unnecessary light into the optical system at the subsequent stage is prevented or suppressed, and temperature rise due to the unnecessary light is reduced.

Since the other configurations and effects of the light source shown in FIG. 28A are the same as those in FIG. 27A, FIG. 27B, FIG. 27C, and FIG. 27D, repetitive description will be omitted. The light source apparatus in FIG. 28A may be provided with the side wall in the same manner as described in FIG. 27A, FIG. 27B, and FIG. 27C. Since the configuration and effects of the side wall have already been described, repetitive description will be omitted.

Figure 28A:
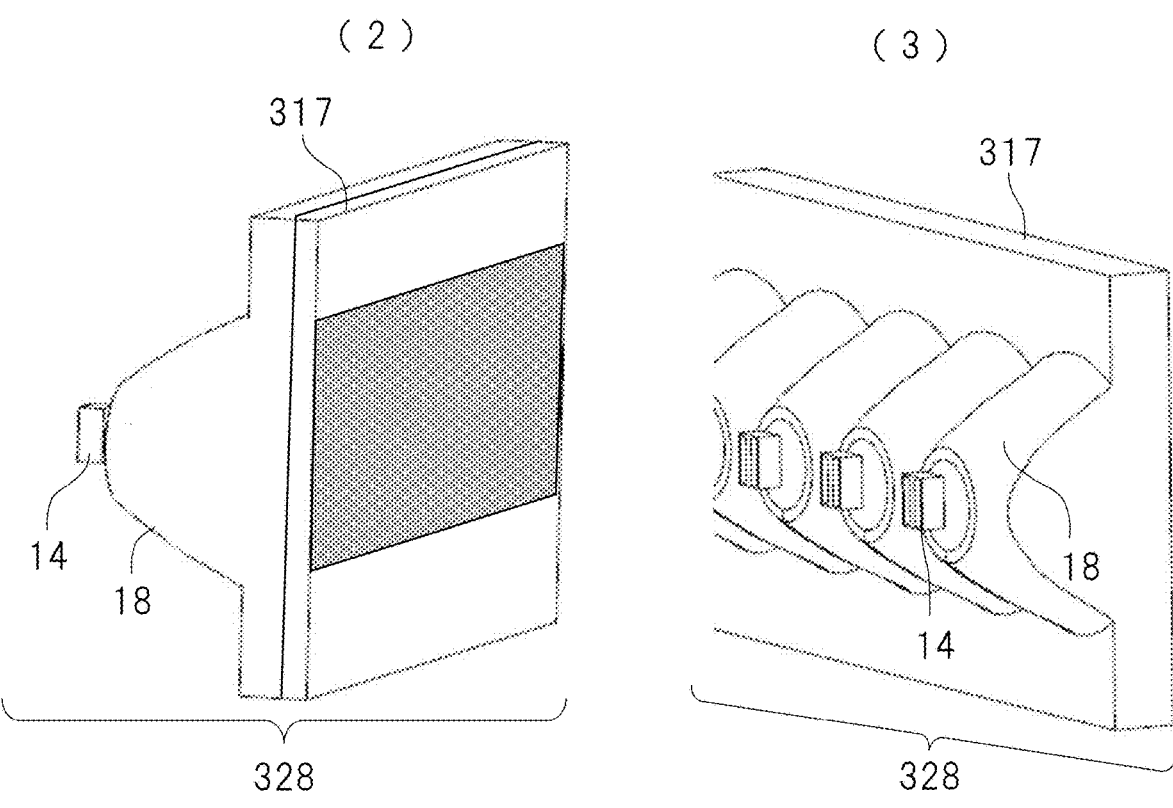
Figure 28B:
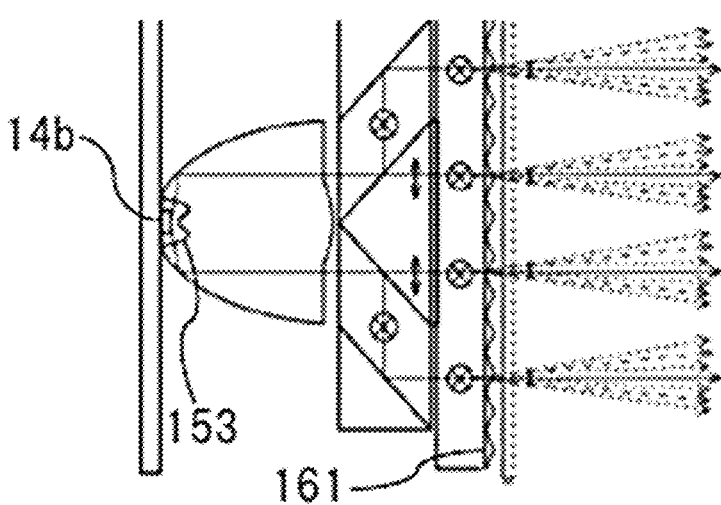
FIG. 28B is a diagram showing another example of a specific configuration of another type of a light source apparatus.

FIG. 28B is a cross-sectional view of FIG. 28A(2). Since the configuration of the light source shown in FIG. 28B is common to a part of the configuration of the light source in FIG. 18 and has already been described in FIG. 18, repetitive description will be omitted.

Another Example 4 of Light Source Apparatus

Subsequently, in the light source apparatus in FIG. 29, a pair of the collimator 18 and the LED 14 used in the light source apparatus shown in FIG. 28 forms one block and the unit 328 is composed of a plurality of blocks. The configuration of the optical system related to the light source apparatus using the LEDs arranged at both ends of the back surface of the liquid crystal display panel 11 and a reflective light guide 504 will be described in detail with reference to FIG. 29(a), FIG. 29(b), and FIG. 29(c).

Figure 29:
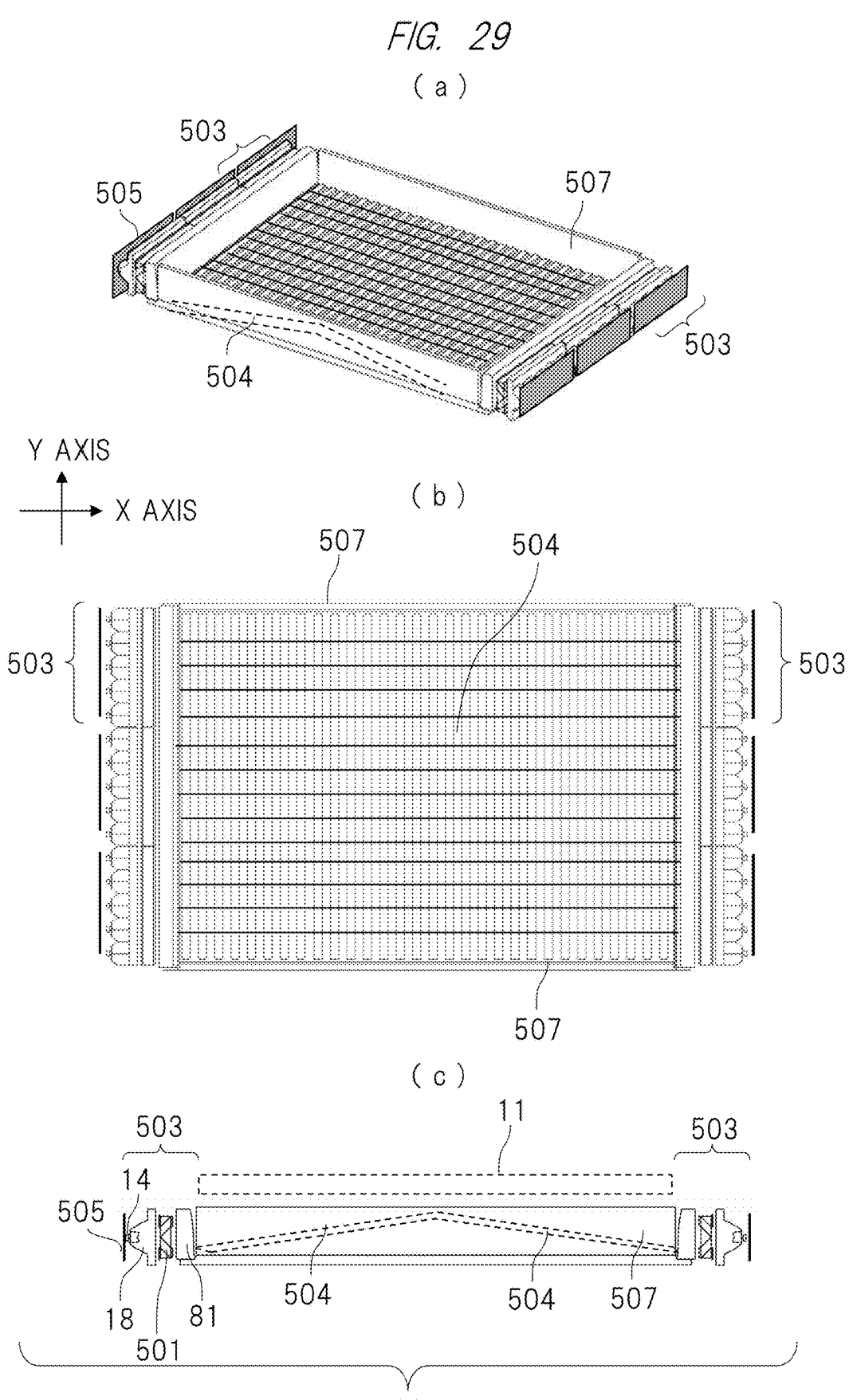
FIG. 29 is a structural diagram showing a surface shape of a light guide diffusion portion of another example of a specific configuration of a light source apparatus.

FIG. 29 shows a state where the LED 14 constituting the light source is attached to a substrate 505, and a pair of the collimator 18 and the LED 14 forms one block and a unit 503 is composed of a plurality of blocks. The units 503 are arranged at both ends of the back surface of the liquid crystal display panel 11 (in the present embodiment, three units are arranged in the short side direction). The light output from the unit 503 is reflected by the reflective light guide 504 and enters the liquid crystal display panel 11 (shown in FIG. 29(c)) arranged to face each other.

As shown in FIG. 29(c), the reflective light guide 504 is divided into two blocks so as to correspond to the units arranged at each end and is arranged such that the central part is the highest. Since the collimator 18 is close to the LED 14, a glass material is used in consideration of heat resistance to the heat generated from the LED 14. The shape of the collimator 18 is similar to the shape described for the collimator 15 in FIG. 17.

The light from the LED 14 enters the polarization conversion element 501 via the collimator 18. The distribution of light entering the reflective light guide 504 at the subsequent stage is adjusted by the shape of an optical element 81. Namely, the light amount distribution of the light flux entering the liquid crystal display panel 11 is optimally designed by adjusting the shape and arrangement of the collimator 18, the shape and diffusion characteristics of the optical element 81, the shape (cross-sectional shape) of the reflection surface of the reflective light guide, the inclination of the reflection surface, and the surface roughness of the reflection surface.

As the shape of the reflection surface provided on the surface of the reflective light guide 504, as shown in FIG. 29(b), a plurality of reflection surfaces are arranged so as to face the emission surface of the polarization conversion element, and the inclination, area, height, and pitch of the reflection surfaces are optimized in accordance with the distance from the polarization conversion element 21. In addition, by dividing the region serving as the same reflection surface (that is, the surface facing the polarization conversion element) into polyhedrons, the light amount distribution of the light flux entering the liquid crystal display panel 11 can be set to a desired value (optimized) as described above.

As to the reflection surface provided on the reflective light guide, one surface (region of reflecting light) is configured to have the shape with multiple inclinations (configured to have different 14 divided inclined surfaces in the X-Y plane in the example of FIG. 29) in the same manner as the reflective light guide described in FIG. 27B, whereby the reflected light can be adjusted more accurately. Further, in order to prevent the light reflected from the reflective light guide from leaking from the side surface of the light source apparatus 13, a light shielding wall 507 is provided, so that the occurrence of light leakage in the direction other than the desired direction (direction toward the liquid crystal display panel 11) can be prevented.

Further, the units 503 arranged on the left and right sides of the reflective light guide 504 in FIG. 29 may be replaced with the light source apparatus in FIG. 27. Namely, the configuration in which a plurality of light source apparatuses (substrate 102, reflector 300, LED 14, and others) shown in FIG. 27 are prepared and the plurality of light source apparatuses are arranged at positions opposite to each other as shown in FIG. 29(a), FIG. 29(b), and FIG. 29(c) is also possible.

Figure 30:
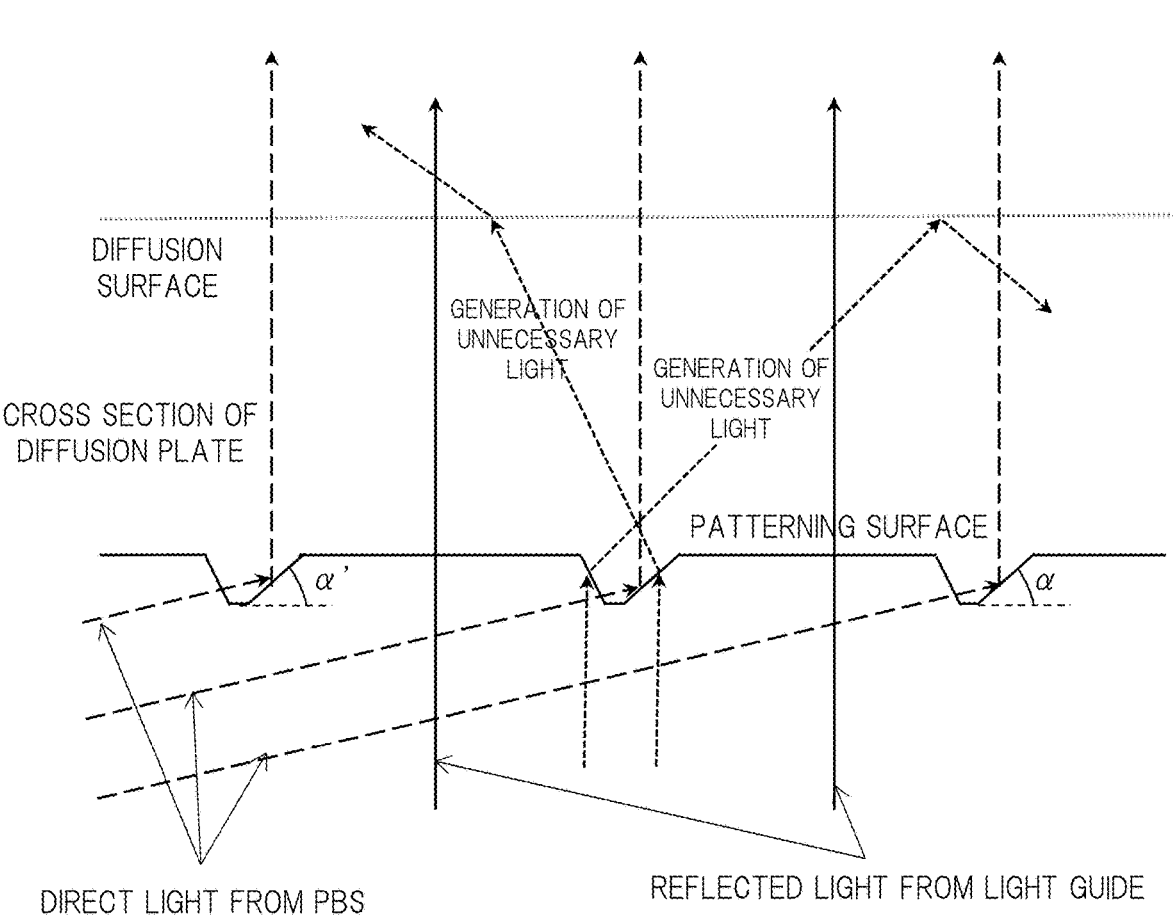
FIG. 30 is an enlarged view showing a surface shape of a light guide diffusion portion of another example of a specific configuration of a light source apparatus.

FIG. 30 is a cross-sectional view showing an example of the shape of the diffusion plate 206. As described above, the divergent light output from the LED is converted into substantially parallel light by the reflector 300 or the collimator 18, converted into a specific polarized wave by the polarization conversion element 21, and then reflected by the light guide. Then, the light flux reflected by the light guide passes through the flat part of the incident surface of the diffusion plate 206 and enters the liquid crystal display panel 11 (see two solid arrows indicating "reflected light from light guide" in FIG. 30).

Further, of the light emitted from the polarization conversion element 21, the divergent light flux is totally reflected on the inclined surface of a protrusion provided on the incident surface of the diffusion plate 206 and enters the liquid crystal display panel 11. In order to totally reflect the light emitted from the polarization conversion element 21 on the inclined surface of the protrusion of the diffusion plate 206, the angle of the inclined surface of the protrusion is changed based on the distance from the polarization conversion element 21. When the angle of the inclined surface of the protrusion on the side far from the polarization conversion element 21 or the LED is $\alpha$ and the angle of the inclined surface of the protrusion on the side close to the polarization conversion element 21 or the LED is $\alpha'$, $\alpha$ is smaller than $\alpha'$ ($\alpha < \alpha'$). With such a setting, it becomes possible to effectively utilize the light flux subjected to the polarization conversion.

<Control Technique of Diffusion Characteristics in Video Display Apparatus>

As a method of adjusting the diffusion distribution of video light from the liquid crystal display panel 11, a lenticular lens is provided between the light source apparatus 13 and the liquid crystal display panel 11 or on the surface of the liquid crystal display panel 11, and the shape of the lens is optimized. Namely, by optimizing the shape of the lenticular lens, the emission characteristics of the video light (hereinafter, referred to also as "video light flux") emitted from the liquid crystal display panel 11 in one direction can be adjusted.

Alternatively or additionally, the arrangement mentioned above may be adjusted by arranging the microlens array in a matrix on the surface of the liquid crystal display panel 11 (or between the light source apparatus 13 and the liquid crystal display panel 11). Namely, by adjusting the arrangement of the microlens array, the emission characteristics of the video light flux emitted from the video display apparatus 1 in the X-axis and Y-axis directions can be adjusted, and as a result, a video display apparatus having the desired diffusion characteristics can be obtained.

The effect achieved by the lenticular lens will be described. As described above, when a lenticular lens with an optimized lens shape is used, the following effects can be obtained. That is, the emission characteristics of the video light flux emitted from the video display apparatus 1 can be adjusted (optimized) through the lenticular lens, and a favorable air floating image can be obtained by transmitting or reflecting the optimized video light flux efficiently by the window glass 105.

As still another configuration example, at the position where the video light emitted from the video display apparatus 1 passes, two lenticular lenses may be arranged in combination or a sheet configured to adjust the diffusion characteristics may be provided by arranging the microlens array in a matrix. With such a configuration of the optical system, the brightness (relative brightness) of the video light in the X-axis and Y-axis directions can be adjusted in accordance with the reflection angle of the video light (reflection angle based on the reflection in the vertical direction as the standard (0 degrees)).

In the present embodiment, by using the lenticular lens described above, excellent optical characteristics that are clearly different from the graph (plot curve) of conventional characteristics can be obtained as shown by the graphs (plot curves) of "Example 1 (Y direction)" and "Example 2 (Y direction)" in FIG. 32(B). Specifically, in the plot curves of Example 1 (Y direction) and Example 2 (Y direction), the brightness (relative brightness) of light by the reflection and diffusion can be enhanced by making the brightness characteristics in the vertical direction steep and changing the balance of the directional characteristics in the vertical direction (positive and negative directions of the Y axis).

Therefore, according to the present embodiment, the video light having a narrow diffusion angle (high straightness) and only a specific polarized component like the video light from the surface-emitting laser video source can be obtained, and the air floating image by the retroreflection can be efficiently delivered to the eyes of the viewer, while suppressing the ghost image that has been generated in the retroreflector in the case of using the video display apparatus according to the conventional technique.

In addition, with the above-described light source apparatus, it is possible to obtain significantly narrow-angle directional characteristics in both the X-axis direction and the Y-axis direction with respect to the diffusion character-istics of the light emitted from the general liquid crystal display and FIG. 32(B) (denoted as panel shown in FIG. 32(A) "conventional characteristics" in the drawings). In the present embodiment, by obtaining the narrow-angle directional characteristics described above, it is possible to realize a video display apparatus that emits a substantially parallel video light flux and emits light of a specific polarized wave in a specific direction.

Figure 31:
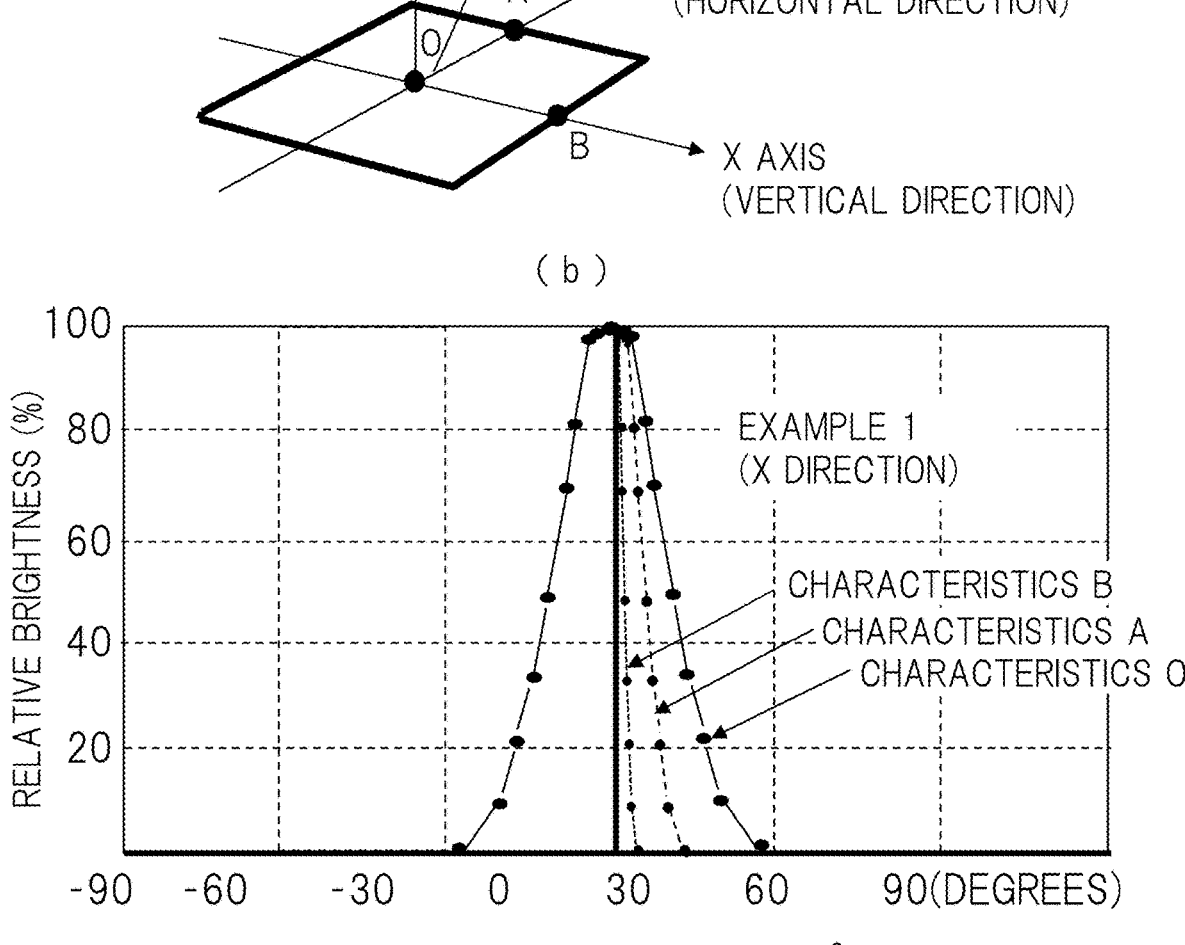
FIG. 31 is a diagram for describing diffusion characteristics of a video display apparatus.

FIG. 31 shows an example of the characteristics of the lenticular lens adopted in the present embodiment. In this example, in particular, the characteristics in the X direction (vertical direction) based on the Z axis are shown, and the characteristics O indicate vertically symmetrical brightness characteristics in which the peak in the light emission direction is at an angle of around 30 degrees upward from the vertical direction (0 degrees). Further, the plot curves of the characteristics A and B shown in the graph of FIG. 31 each indicate an example of characteristics in which video light above the peak brightness is condensed at around 30 degrees to increase the brightness (relative brightness). Therefore, in the characteristics A and B, the brightness (relative brightness) of light is sharply reduced in the region where the slope in the X direction from the Z axis (angle θ) exceeds 30 degrees (θ>30°) as can be seen from the comparison with the plot curve of the characteristics O.

Namely, in the optical system including the above-described lenticular lens, when the video light flux from the video display apparatus 1 is made to enter the retroreflector 2, the emission angle and the viewing angle of the video light aligned at a narrow angle by the light source apparatus 13 can be adjusted, and the degree of freedom of installation of the retroreflection sheet 2 can be significantly improved. As a result, it is possible to significantly improve the degree of freedom of the relationship of the imaging position of the air floating image which is formed at a desired position by the reflection or transmission at the window glass 105. As a result, light having a narrow diffusion angle (high straightness) and having only a specific polarized component can be obtained, and can be efficiently delivered to the eyes of a viewer outdoors or indoors. According to this, even if the intensity (brightness) of the video light from the video display apparatus 1 is reduced, the viewer can accurately recognize the video light and obtain information. In other words, by reducing the output of the video display apparatus 1, it is possible to realize an information display system with lower power consumption.

In the foregoing, various embodiments and examples (that is, specific examples) to which the present invention is applied have been described in detail. Meanwhile, the present invention is not limited only to the above-described embodiments (specific examples), and includes various modifications. For example, in the above-described embodiments, the entire system has been described in detail so as to make the present invention easily understood, and the present invention is not necessarily limited to that including all the configurations described above. Also, a part of the configuration of one embodiment may be replaced with the configuration of another embodiment, and the configuration of one embodiment may be added to the configuration of another embodiment. Furthermore, another configuration may be added to a part of the configuration of each embodiment, and a part of the configuration of each embodiment may be eliminated or replaced with another configuration.

The light source apparatus described above can be applied not only to the air floating video display apparatus but also to information display apparatus such as an HUD, a tablet, or a digital signage.

In the technique according to the present embodiment, by displaying the high-resolution and high-brightness video information as an air floating video in the state of floating in the air, for example, the user can operate without feeling anxious about contact infection of infectious diseases. If the technique according to the present embodiment is applied to a system used by an unspecified number of users, it will be possible to provide a non-contact user interface that can reduce the risk of contact infection of infectious diseases and can be used without the feeling of anxiety. According to the present invention that provide such a technique, it is possible to contribute to "Goal 3: Ensure healthy lives and promote well-being for all at all ages" in the Sustainable Development Goals (SDGs) advocated by the United Nations.

In addition, in the technique according to the present embodiment described above, only the normal reflected light is efficiently reflected with respect to the retroreflector by making the divergence angle of the emitted video light small and aligning the light into a specific polarized wave, and thus a bright and clear air floating video can be obtained with high light utilization efficiency. With the technique according to the present embodiment, it is possible to provide a highly usable non-contact user interface capable of significantly reducing power consumption. According to the present invention that provides such a technique, it is possible to contribute to "Goal 9: Build resilient infrastructure, promote inclusive and sustainable industrialization and foster innovation" and "Goal 11: Make cities and human settlements inclusive, safe, resilient and sustainable" in the Sustainable Development Goals (SDGs) advocated by the United Nations.

Further, in the technique according to the present embodiment described above, an air floating video by video light with high directivity (straightness) can be formed. With the technique according to the present embodiment, since the air floating video is displayed by the video light with high directivity, it is possible to provide the non-contact user interface capable of reducing the risk of someone other than the user looking into the air floating video even when displaying a video requiring high security at an ATM of a bank or a ticket vending machine of a station or a highly confidential video that is desired to be kept secret from a person facing the user. By providing the technique described above, the present invention contributes to "Goal 11: Make cities and human settlements inclusive, safe, resilient and sustainable" in the Sustainable Development Goals (SDGs) advocated by the United Nations.

REFERENCE SIGNS LIST

1 . . . video display apparatus, 2, 330 . . . retroreflector, 3 . . . space image (air floating video), 105 . . . window glass, 100 . . . transmissive plate, 13 . . . light source apparatus, 54 . . . light direction conversion panel, 102 . . . . LED Substrate, 203 . . . light guide, 205 . . . reflection sheet, 271 . . . reflection plate, 270 . . . λ/4 plate (retardation plate), 11 . . . liquid crystal display panel, 206 . . . diffusion plate, 21 . . . λ/4 plate (polarization conversion element), 300 . . . reflector, 213 . . . λ/2 plate, 306 . . . reflective light guide, 307 . . . reflection surface, 308 . . . sub-reflector, 331 . . . air floating video, 332 . . . ghost image, 333 . . . ghost image, 334 . . . video light control sheet, 336 . . . light transmitting portion, 337 . . . light absorbing portion, 340 . . . first ranging apparatus, 341 . . . second ranging apparatus, 350 . . . housing, 360 . . . light path turning mirror, 361 . . . capacitive touch panel, 362 . . . support member, 81 . . . optical element, 501 . . . polarization conversion element, 503 . . . unit, 507 . . . light shielding wall, 401, 402 . . . light shielding plate, 320 . . . base material, Ph . . . object

The invention claimed is:

1. An air floating video display system comprising:
a video display apparatus configured to display a video;
a light source apparatus; and
a retroreflector configured to reflect a video light from the video display apparatus to display an air floating video that is a real image in air by the reflected light,
wherein the light source apparatus includes:
an optical member configured to reduce a divergence angle of a light from a point or surface light source; and
a reflection surface configured to reflect the light from the light source to propagate it to the video display apparatus,
wherein a first ranging apparatus in which a plurality of TOF (Time of Flight) systems each having a light source and a light receiver are arranged in a matrix and with which a plurality of divided areas of a space including the air floating video are sensed by a light from the light source of each TOF system is provided,
wherein the light source light of the TOF system is emitted toward the air floating video,
wherein the system further comprisescomprising a three-dimensional ranging system,
wherein the three-dimensional ranging system includes a plurality of ranging apparatuses,
wherein the ranging apparatuses include the first ranging apparatus configured to capture space information including the air floating video and a second ranging apparatus configured to capture, by a two-dimensional image sensor, two-dimensional image information of a plane where the air floating video is formed, and
wherein the three-dimensional ranging system converts position information obtained from the plurality of ranging apparatuses controlled by a synchronization signal common in the ranging system into three-dimensional position information by performing arithmetic operations.

2. An air floating video display system comprising:
a video display apparatus configured to display a video;
a light source apparatus; and
a retroreflector configured to reflect a video light from the video display apparatus to display an air floating video that is a real image in air by the reflected light,
wherein the light source apparatus includes:
an optical member configured to reduce a divergence angle of a light from a point or surface light source; and
a reflection surface configured to reflect the light from the light source to propagate it to the video display apparatus,
wherein a first ranging apparatus in which a plurality of TOF (Time of Flight) systems each having a light source and a light receiver are arranged in a matrix and with which a plurality of divided areas of a space including the air floating video are sensed by a light from the light source of each TOF system is provided,
wherein the light source light of the TOF system is emitted toward the air floating video,
wherein the system further comprises a three-dimensional ranging system, and
wherein a wavelength of a light source light of the TOF system provided in a ranging apparatus constituting the three-dimensional ranging system is a long wavelength of 900 (nm) or more.

3. An air floating video display system comprising:

a video display apparatus configured to display a video;

a light source apparatus; and a retroreflector configured to reflect a video light from the video display apparatus to display an air floating video that is a real image in air by the reflected light, wherein the light source apparatus includes:

an optical member configured to reduce a divergence angle of a light from a point or surface light source; and a reflection surface configured to reflect the light from the light source to propagate it to the video display apparatus, wherein a first ranging apparatus in which a plurality of TOF (Time of Flight) systems each having a light source and a light receiver are arranged in a matrix and with which a plurality of divided areas of a space including the air floating video are sensed by a light from the light source of each TOF system is provided, wherein the light source light of the TOF system is emitted toward the air floating video, wherein the light source apparatus includes:

a point or surface light source;

a reflector configured to reflect the light from the light source; and a light guide configured to guide the light from the reflector toward a display panel, and wherein a reflection surface of the reflector has an asymmetrical shape with respect to an optical axis of the light emitted from the light source.

4. The air floating video display system according to claim 3, wherein the light guide is a reflective light guide configured to guide the light by reflection on a reflection surface on a surface of the light guide.

5. The air floating video display system according to claim 3, comprising:

a diffusion plate configured to diffuse the light from the light guide; and a side wall arranged to sandwich a space between the light guide and the diffusion plate.

6. The air floating video display system according to claim 3, wherein the reflector is made of a plastic material, a glass material, or a metal material.

* * * * *